United States Patent
Donlan et al.

(10) Patent No.: US 10,621,055 B2
(45) Date of Patent: Apr. 14, 2020

(54) ADAPTIVE DATA RECOVERY FOR CLUSTERED DATA DEVICES

(71) Applicant: Amazon Technologies, Inc., Seattle, WA (US)

(72) Inventors: Bryan James Donlan, Seattle, WA (US); Paul David Franklin, Seattle, WA (US); Colin Laird Lazier, Seattle, WA (US); Frank Charles Paterra, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 15/472,139

(22) Filed: Mar. 28, 2017

(65) Prior Publication Data

US 2018/0285219 A1    Oct. 4, 2018

(51) Int. Cl.
| | |
|---|---|
| *G06F 11/00* | (2006.01) |
| *G06F 11/16* | (2006.01) |
| *G06F 11/20* | (2006.01) |
| *G06F 3/06* | (2006.01) |

(52) U.S. Cl.
CPC ...... *G06F 11/1662* (2013.01); *G06F 11/2094* (2013.01); *G06F 3/065* (2013.01); *G06F 3/0619* (2013.01); *G06F 3/0673* (2013.01)

(58) Field of Classification Search
CPC .......... G06F 11/1662; G06F 11/1076; G06F 11/2094; G06F 11/108; G06F 11/1084; G06F 11/1088; G06F 11/1092; G06F 11/1658; G06F 11/2069; G06F 11/2089; G06F 11/2092; G06F 3/0619; G06F 3/065; G06F 3/0673; G06F 3/0614; G06F 3/0629; G06F 3/0646; G06F 3/067; G06F 3/0683

See application file for complete search history.

(56) References Cited

U.S. PATENT DOCUMENTS

| | | |
|---|---|---|
| 5,996,086 A | 11/1999 | Delaney et al. |
| 6,505,243 B1 | 1/2003 | Lortz |
| 7,206,836 B2 * | 4/2007 | Dinker ............... G06F 11/2069 709/214 |
| 7,716,180 B2 | 5/2010 | Vermeulen et al. |
| 7,739,677 B1 * | 6/2010 | Kekre ................... G06F 11/202 709/214 |
| 8,261,033 B1 | 9/2012 | Slik et al. |
| 8,483,094 B2 | 7/2013 | Arauz-Rosado |

(Continued)

OTHER PUBLICATIONS

International Search Report and Written Opinion dated Jul. 6, 2018, International Patent Application No. PCT/US2018/024026, filed Mar. 23, 2018, 12 pages.

*Primary Examiner* — Anthony J Amoroso

(74) *Attorney, Agent, or Firm* — Davis Wright Tremaine LLP

(57) ABSTRACT

A switching device is implemented in a network-attachable data transfer device to provide data storage access to other such devices. In some embodiments, network-attachable data transfer devices are arranged in a clustered configuration to provide various computational and storage services. When one or more devices of the cluster fails, various implementations associated with the switching device, via an external data interface, provide operational mitigation, optimized data recovery, and efficient reinstatement of normal operation of the cluster.

20 Claims, 24 Drawing Sheets

(56) References Cited

U.S. PATENT DOCUMENTS

| | | |
|---|---|---|
| 8,639,793 B2 | 1/2014 | Kapur et al. |
| 8,799,746 B2 | 8/2014 | Baker et al. |
| 8,806,296 B1 | 8/2014 | Lazier |
| 8,850,288 B1 | 9/2014 | Lazier et al. |
| 8,869,001 B1 | 10/2014 | Lazier |
| 8,935,221 B1 | 1/2015 | Lazier et al. |
| 8,959,067 B1 | 2/2015 | Patiejunas et al. |
| 9,002,805 B1 | 4/2015 | Barber et al. |
| 9,003,144 B1 | 4/2015 | Hayes et al. |
| 9,015,164 B2 | 4/2015 | Chan et al. |
| 9,021,198 B1 | 4/2015 | Vijayan et al. |
| 9,021,297 B1 | 4/2015 | Hayes et al. |
| 9,026,869 B1 | 5/2015 | Li et al. |
| 9,052,942 B1 | 6/2015 | Barber et al. |
| 9,077,579 B1 | 7/2015 | Chu et al. |
| 9,092,441 B1 | 7/2015 | Patiejunas et al. |
| 9,110,797 B1 | 8/2015 | Lazier |
| 9,141,823 B2 | 9/2015 | Dawson |
| 9,165,002 B1 | 10/2015 | Lazier |
| 9,213,485 B1 | 12/2015 | Hayes et al. |
| 9,213,709 B2 | 12/2015 | Patiejunas et al. |
| 9,223,789 B1 | 12/2015 | Seigle et al. |
| 9,225,675 B2 | 12/2015 | Patiejunas et al. |
| 9,250,811 B1 | 2/2016 | Patiejunas |
| 9,251,097 B1 | 2/2016 | Kumar et al. |
| 9,256,761 B1 | 2/2016 | Sahu et al. |
| 9,281,845 B1 | 3/2016 | Lazier |
| 9,354,683 B2 | 5/2016 | Patiejunas et al. |
| 9,367,243 B1 | 6/2016 | Hayes et al. |
| 9,448,614 B2 | 9/2016 | Slik |
| 9,459,959 B1 | 10/2016 | Franklin et al. |
| 9,495,249 B1 | 11/2016 | Franklin et al. |
| 9,513,820 B1 | 12/2016 | Shalev |
| 9,563,681 B1 | 2/2017 | Patiejunas et al. |
| 9,582,676 B2 | 2/2017 | Obligacion |
| 10,033,569 B1 | 7/2018 | Singh et al. |
| 2002/0083192 A1 | 6/2002 | Alisuag |
| 2004/0128470 A1 | 7/2004 | Hetzler et al. |
| 2004/0139222 A1 | 7/2004 | Slik et al. |
| 2004/0228493 A1 | 11/2004 | Ma |
| 2007/0110053 A1 | 5/2007 | Soni et al. |
| 2007/0156842 A1 | 7/2007 | Vermeulen et al. |
| 2007/0294457 A1 | 12/2007 | Gantman et al. |
| 2008/0126857 A1 | 5/2008 | Basham et al. |
| 2009/0094250 A1 | 4/2009 | Dhuse et al. |
| 2010/0017444 A1 | 1/2010 | Chatterjee et al. |
| 2010/0037056 A1 | 2/2010 | Follis et al. |
| 2010/0145814 A1 | 6/2010 | Meghani et al. |
| 2010/0161145 A1 | 6/2010 | Baeza-Yates et al. |
| 2010/0162036 A1* | 6/2010 | Linden .................. G06F 11/181 714/4.11 |
| 2011/0078277 A1 | 3/2011 | Baptist |
| 2011/0296195 A1 | 12/2011 | Nakagawa et al. |
| 2012/0011398 A1 | 1/2012 | Eckhardt et al. |
| 2012/0060010 A1 | 3/2012 | Shimozono et al. |
| 2012/0079189 A1 | 3/2012 | Colgrove et al. |
| 2012/0079190 A1 | 3/2012 | Colgrove et al. |
| 2012/0117383 A1 | 5/2012 | Kim |
| 2012/0166815 A1 | 6/2012 | Orsini et al. |
| 2012/0185437 A1 | 7/2012 | Pavlov et al. |
| 2013/0007511 A1 | 1/2013 | Gaertner et al. |
| 2013/0173930 A1 | 7/2013 | Obligacion |
| 2013/0208892 A1 | 8/2013 | Moriguchi et al. |
| 2013/0254117 A1 | 9/2013 | von Mueller et al. |
| 2013/0262651 A1 | 10/2013 | Shah et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0051432 A1 | 2/2014 | Gupta et al. |
| 2014/0068258 A1 | 3/2014 | Chao |
| 2014/0108352 A1 | 4/2014 | Ahrens et al. |
| 2014/0351632 A1 | 11/2014 | Grube et al. |
| 2014/0372383 A1 | 12/2014 | Sipek |
| 2015/0074055 A1 | 3/2015 | Jacoby et al. |
| 2015/0178170 A1 | 6/2015 | Zhang et al. |
| 2015/0227416 A1 | 8/2015 | Reinart |
| 2015/0236725 A1 | 8/2015 | Reinart |
| 2015/0278324 A1 | 10/2015 | Wong et al. |
| 2015/0355974 A1 | 12/2015 | Hayes et al. |
| 2015/0356005 A1* | 12/2015 | Hayes .................. G06F 12/0238 711/102 |
| 2016/0041868 A1 | 2/2016 | Davis et al. |
| 2016/0041878 A1 | 2/2016 | Davis et al. |
| 2016/0041887 A1* | 2/2016 | Davis .................. G06F 3/0619 714/6.2 |
| 2016/0085797 A1 | 3/2016 | Patiejunas et al. |
| 2016/0179824 A1 | 6/2016 | Donlan et al. |
| 2016/0350326 A1 | 12/2016 | Simonetti |
| 2017/0010940 A1 | 1/2017 | Lacasse et al. |
| 2017/0024281 A1 | 1/2017 | Franklin et al. |
| 2017/0060687 A1 | 3/2017 | Franklin et al. |
| 2017/0068462 A1 | 3/2017 | Vajravel et al. |
| 2017/0134343 A1 | 5/2017 | Virmani |
| 2017/0195348 A1 | 7/2017 | Haelion |

\* cited by examiner

ADAPTIVE DATA RECOVERY FOR CLUSTERED DATA DEVICES

CROSS-REFERENCE TO RELATED APPLICATIONS

This application incorporates by reference for all purposes the full disclosure of co-pending U.S. patent application Ser. No. 15/471,941, filed concurrently herewith, entitled "DATA ACCESS INTERFACE FOR CLUSTERED DEVICES", and co-pending U.S. patent application Ser. No. 15/472,058, filed concurrently herewith, entitled "EFFICIENT DEVICE PROVISION".

BACKGROUND

The growth of data storage capacity and demands of data users has far outpaced the increase of data transmission bandwidth capable of transferring large amounts of data. For example, the advent of "big data"—the collection and analysis of large data sets obtained from various sources—has further challenged the use of traditional data transmission mechanisms. The discrepancy between the growth of data storage needs and limited improvements in data transmission technologies is so great that transmitting data between one storage facility and another storage facility may be prohibitively costly (e.g., requiring costly system upgrades) or lengthy (e.g., transmission may take months or years). Physically moving storage media may leave the data on legacy hardware, which may be disadvantageous (e.g., legacy hardware may not have access to security updates).

Solutions that involve the transfer of data to portable storage devices (e.g., network-attachable data transfer devices) and shipping the portable storage device to another storage facility exist but face many challenges. The capacity of data storage devices is not limitless. When a single portable storage device has insufficient capacity, multiple portable storage devices may be used in concert, such as in a clustered configuration. However, even in scenarios where a cluster uses one or more redundancy codes to improve reliability, durability, availability, and/or access performance relating to data stored thereon, if a device of the cluster operates abnormally or is otherwise degraded, the cluster operation of the cluster itself is degraded until such time as the cluster is reconfigured (e.g., by provisioning of a replacement for the malfunctioning device). As this reprovisioning process can be complex, a customer may have challenges in performing and monitoring all the steps necessary in returning the cluster to a nominal operational mode.

BRIEF DESCRIPTION OF THE DRAWINGS

Various techniques will be described with reference to the drawings, in which.

DETAILED DESCRIPTION

Figure 1:
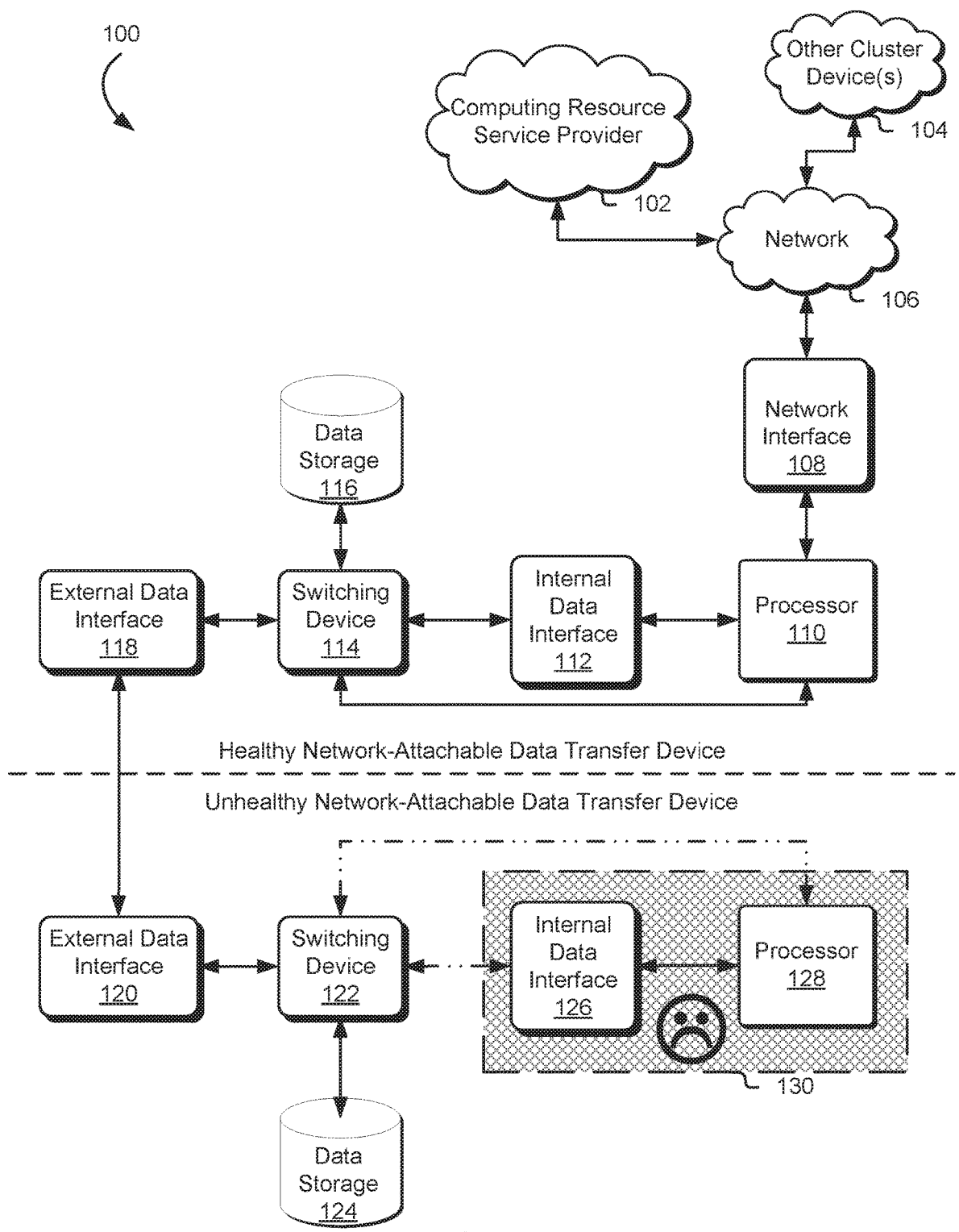
FIG. 1 illustrates an example environment in which a switching device and an external data interface are implemented to mitigate cluster degradation due to a data transfer device malfunction.

Various techniques and systems for improving functionality, recoverability, and restoration of operationally degraded network-attachable data transfer devices, interconnected clusters of such devices, data processed therewith, and data stored thereon are described. For example, a network-attachable data transfer device (interchangeably referred to herein as a "data transfer device," or, in certain contexts, simply a "device") implements one or more external data interfaces and switching devices that enable the data transfer device to provide access, for authorized external entities connecting through the external data interface, to data storage (and data stored thereon) of the data transfer device. Accordingly, techniques involving the implementation of such data interfaces and switching devices, e.g., in the context of providing data and data device access to an otherwise degraded, inoperable, or partially inoperable data transfer device, provide considerable technical improvements to the operation of, e.g., clusters of data transfer devices, the data transfer devices themselves, and downstream requisitioning and/or provisioning processes for such devices and clusters thereof, especially in scenarios where the data transfer devices and/or clusters thereof are operating in a degraded or otherwise non-nominal mode.

In some embodiments, a switching device is implemented in a data transfer device to control access to data storage of the data transfer device. For example, the switching device may be connected to both an internal data interface and an external data interface, where the internal data interface is used by the processor and other components of the data transfer device to transact data with data storage (e.g., one or more data storage devices, such as hard disk drives, solid state drives, and the like) during ordinary operation of the data storage device. Accordingly, the switching device, which also connects to the data storage, may generally behave transparently with respect to the internal data interface and the data storage. However, the switching device is capable of also providing alternative and/or simultaneous access to the data storage via either or both the external data interface and the internal data interface, such as in response to an external command to do so, and/or detection of an event, such as a connection attempt (e.g., via the external data interface), a failure event (e.g., of the processor, network interface, and/or internal data interface of the data transfer device), and the like.

The switching device may be controlled by, or at least accept and process commands from, one or both of the processor of the data transfer device and/or an auxiliary device capable of also providing such commands, such as a display device (having its own processor, data interfaces, etc.) integrated into the data transfer device. Either or both of such devices may provide such commands in connection with manual interaction (e.g., with the display device and/or as received by the processor), in connection with detection of an event, such as a connection event or a failure event, and the like. Depending on the desired access to the data storage, e.g., related to a diagnostic, recovery, or mitigation process, the switching device processes such commands to connect the data storage to either or both the external data interface and/or the internal data interface. In some embodiments, the switching device includes a processor and other components that allow it to make its own determination, in a similar fashion, of which interface(s) to connect to the data storage.

As may be contemplated, external access to data storage, such as via an external data interface, may be limited to authorized entities. Accordingly, the switching device or associated components of the data transfer device may perform an authentication process to confirm the authority of the entity attempting the connection. For example, a security module of the connecting entity (e.g., another data transfer device) provides, to the receiving device, cryptographic material as part of the connecting entity's connection process. The receiving device (e.g., the switching device) confirms the cryptographic material to determine whether it corresponds to a known authorized entity (e.g., confirmation of a shared secret) before providing further full or otherwise additional access, via the external data interface, to the data storage. In some embodiments, the receiving device providing access to its data storage confirms, e.g., using a cluster manifest associated with a cluster to which it belongs, whether the connecting device corresponds to, and can properly decrypt, an encrypted payload included thereon, before providing such access.

In some embodiments, a cluster manifest includes information relating to the operation of devices within a cluster including operation settings, configuration data, network information, executable code, cryptographic material (e.g., cryptographic keys), and more. A cluster manifest may include one or more encrypted payloads, one or more identifiers, and one or more encrypted data entries. A bijective mapping may exist between the identifiers and the encrypted data entries of a cluster manifest. In some embodiments, the cluster manifest includes, for at least a subset of the cluster devices, a corresponding encrypted payload, identifier, and encrypted data entry. An identifier may refer to information that may be used to identify a particular device of a cluster. Various examples of identifiers that may be used include a globally unique identifier (GUID), universally unique identifier (UUID), media access control address, serial number, and the like. However, it should be noted that the use of an identifier may be a technical optimization that improves performance, and there exist embodiments contemplated in the scope of this disclosure where a cluster manifest does not include identifiers and/or mappings associated with identifiers. An encrypted data entry may include data that is encrypted using various techniques. In some embodiments, an encrypted data entry includes two or more encrypted partitions, each encrypted partition being encrypted using a different cryptographic key of a different security module. An encrypted data entry, when decrypted, may encode cryptographic material such as a cryptographic key. The cryptographic key encoded in an encrypted data entry may be used to decrypt an associated encrypted payload.

As mentioned, the device associated with an encrypted data entry may be able to use the encrypted data entry to perform an authentication process and/or obtain data, such as data stored on the data storage of the data transfer device to which it is attempting to connect. The cluster manifest may include a list of encrypted payloads. Cryptographic material obtained from an encrypted data entry may be used to decrypt, authenticate, or perform other cryptographic operations in conjunction with a corresponding encrypted payload. Each encrypted payload may be encrypted under a different cryptographic key (e.g., a cryptographic key obtained from the corresponding encrypted data entry) and may be decryptable by a particular device of the cluster.

Utilizing a cluster to perform data storage has various advantages over using a single device to perform data storage—for example, using multiple devices in a cluster configuration may increase data throughput and capacity, may increase availability (e.g., if a single device of a cluster becomes defective, operations may be offloaded to other devices in the cluster), reliability (e.g., if a single device of the cluster becomes defective, data in other devices may be unaffected by such failures), and perform load distribution functions. For example, data is partitioned into shards across multiple devices of a cluster in such a manner that individual devices of a device can each be a source for a subset of a larger set of data. For example, data from a database may be sharded across multiple cluster devices by a horizontal partitioning of data such that cluster devices are configured to each store rows of a database—such a configuration may be used to improve performance, reliability, and availability of data.

In scenarios in which a cluster of data transfer devices is degraded, such as if a given device or devices of the cluster enters a degraded, partially operational, or non-operational state, an authorized, healthy device of the cluster may connect, as mentioned, to the data storage of the unhealthy device via their respective external data interfaces. In some embodiments, the connection may be of a similar type (e.g., using the same protocol), as used by a given device to interconnect its own data storage with its own processor (e.g., internal data interface). Accordingly, in some embodiments, a healthy data transfer device acts as a "host" for the data storage of the unhealthy device, wherein the data storage of the unhealthy device appears as local data storage of the healthy device. As the cluster may be aware of the specific data storage devices participating in the cluster (e.g., via device IDs), as the data storage connected in the fashion just mentioned involves data storage devices already known to the cluster, the healthy data transfer device provides access, via, the cluster, to the data storage of the unhealthy device with little or no further configuration, as it is merely acting as a "proxy" or temporary replacement for the unhealthy data transfer device.

In some embodiments, as such an arrangement can potentially result in twice the load on the healthy data transfer device when servicing, e.g., read and write requests, the cluster metadata, such as the cluster manifest, may be updated to reflect the topology of the cluster. Accordingly, the cluster may treat the data storage of the unhealthy data transfer device in a different fashion as data storage of other data transfer devices within the cluster. For example, the data storage devices of the unhealthy data transfer device may be marked as read-only, preferentially avoided in favor of other data storage storing or encoding the same data, or the like.

Additionally, a cluster operating in this manner may further adjust its operation with regard to both read and write requests and operation while the cluster is degraded. For example, as mentioned, data to be stored on devices of a cluster may be processed by one or more redundancy codes to generate redundancy coded shards, which in turn are distributed for storage on the various devices of the cluster. Data stored in this manner, as mentioned, is resistant to availability loss or actual loss, as fewer shards than the total number of shards generated for a given set of data are needed to retrieve the entirety of the data.

As may be appreciated, the redundancy coding scheme used may be associated with the number of active devices in a given cluster. For example, a cluster of five data transfer devices may implement a redundancy coding scheme generating five shards, one each per device, where three of the shards are sufficient to recover the entirety of the data represented. Accordingly, during nominal cluster operation, a read request may involve retrieval of shards from three devices of the cluster, while a write request would involve writing a shard to each of the five devices.

However, if, for example, one of the devices enters a degraded or otherwise abnormal state of operation, the two device (or shard) margin of error is reduced to one (i.e., only one more device can fail before any additional device failures would result in loss of data or accessibility thereto). To the extent that a degraded operating state of a device occurs as a result of other aspects of the data transfer device so as to allow the data storage of that device to continue to be capable of providing the data, the aforementioned external data interface-enabled connection of the data storage of a degraded device to a healthy data transfer device allows all previously stored shards to be available as normal (e.g., all five shards, in the provided example). Furthermore, if the data storage of the degraded data transfer device is reliable enough to store data, in some embodiments, data writes may continue to be committed to that data storage, e.g., if the cluster as a whole is short on storage space. In the aforementioned example, the redundancy coding scheme used to generate the shards may continue to generate five shards, with three devices storing one shard each and the device "hosting" the data storage of the unhealthy or offline device storing two shards, one on its own data storage, and one on the "external" data storage.

However, if the data storage of the degraded data transfer device cannot be verified as reliable for write operations, the cluster may implement a different redundancy coding scheme to account for the remaining devices and/or the degraded device, so as to retain a desired level of availability, durability, etc. For example, data writes occurring during degraded operation may involve only four shards, two of which are sufficient to recover the data represented thereby, where each of the four shards is stored on the data storage of the healthy devices of the cluster (and omitting the "hosted" data storage of the degraded device). As may be contemplated, other parameters, such as cluster load, individual data transfer device load, durability/availability requirements (e.g., of the implementing authority), and the like, may also factor into the determination of an appropriate redundancy coding scheme during degraded cluster operation.

Additionally, if the data storage of the degraded data transfer device is determined to be unreliable for read operations, the cluster may further retrieve requested data without participation of that data storage. As sharded data allows for a quorum quantity of shards, fewer than the total number of shards generated for a given data object, to be used to regenerate the data, data encoded under the assumption that all devices in a cluster are available may be regenerated from some or all of the remaining data transfer devices in the case that one or more of the cluster devices are unavailable, degraded, etc.

While such techniques are useful for improving the usability and functionality of a cluster afflicted by a degradation event, additional techniques described herein include improvements to cluster functionality and resilience that result in a decrease in the amount of time a cluster operates in a degraded state, once that degraded state is determined.

For example, an entity of the cluster, such as a healthy data transfer device that successfully authenticates with and connects to the data storage of an unhealthy data transfer device, submits information regarding the unhealthy data transfer device to a computing resource service provider that provisioned it (along with the other devices in the cluster). In some embodiments, a display device associated with the unhealthy data transfer device submits the information upon determining that the data transfer device is in a non-nominal operational mode. The information may include, for example, device identifiers, cryptographic information, cluster identifiers, and the like.

The computing resource service provider uses the information to provision a replacement data transfer device with a configuration that causes the device to perform a series of data recovery and cluster integration steps when joining the cluster. The replacement device may be configured with, for example, cryptographic material, stored in an entity of the computing resource service provider, specific to the degraded device, and reallocated to the replacement device. The cryptographic material may be used, upon an attempted joining of the replacement device to the cluster, to decrypt an encrypted payload specific to the degraded device. In some embodiments, the encrypted payload may be updated, either by the cluster or the computing resource service provider, to include executable instructions that cause the replacement device to perform additional data recovery actions with regard to the data stored on the degraded device to be replaced. Furthermore, in some embodiments, the cluster manifest containing the encrypted payload may be updated to reflect an identifier of the replacement device (in cases where the cluster manifest previously reflected an identifier of the replaced degraded device), as well as to include information regarding one or more components of the replacement device, such as data storage device identifiers, network interface media access control addresses, and the like.

Upon arrival and prior to joining the cluster, the replacement device may be in a locked state or an unlocked state. A locked device may have restricted functionality such that one or more features, functions, operations, requests, etc., are not accessible to a customer. In some embodiments, a customer receives a device in a locked state and unlocks the device. A locked device may include a locked cluster manifest (e.g., an encrypted cluster manifest). In some embodiments, a customer interacts with a human interface device (HID) to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition. The information provided by the customer may be used to unlock (e.g., decrypt) the locked cluster manifest and provide access to an unlocked cluster manifest. The cluster manifest may be updated, e.g., by the computing resource service provider, in the manner previously described, and after (or as a part of) joining the cluster, some or all of the updated cluster manifest may be distributed to other devices in the cluster to augment and/or replace the previous version of the cluster manifest.

In some embodiments, the cluster manifest may be provided by an existing, unlocked device of the cluster, e.g., in response to detecting that a device (such as a recently arrived replacement device) is in a locked state. The unlocked device may provide an unlocked cluster manifest to the locked device. The locked device may use the cluster manifest to perform an authentication. The locked device may receive the cluster manifest and parse the manifest to obtain an encrypted payload and an encrypted data entry associated with the device. The system parses the encrypted data entry that then is parsed into partitions and the partitions decrypted using one or more security modules accessible to the device. The decrypted partitions may then be used to assemble a cryptographic key that is used to decrypt an encrypted payload of the cluster manifest. The encrypted payload may include cryptographic material (e.g., a cryptographic payload key) that is usable to perform one or more features, functions, operations, requests, etc. The device may store the cryptographic material (e.g., cryptographic payload key) in volatile memory, provide an indication that the device has transitioned to an unlocked state, establish one or more connections with cluster devices, and perform data recovery actions. Cryptographic material included in the payload, such as the cryptographic payload key, may be used at least in part as of one or more processes for storing data in a secure manner (e.g., by storing the data in encrypted form).

In some embodiments, the aforementioned data recovery processes are performed to restore the data stored on the degraded device to the replacement device and, if applicable, redistribute data stored on the various devices of the cluster while it was operating in a degraded fashion. For example, the replacement data transfer device is connected, via its external data interface, to an external data interface of the degraded device it replaces, according to techniques previously mentioned. As part of the cluster joining process, the replacement device first attempts to verify the integrity and/or availability of data stored on the degraded transfer device, and, in some cases, checks the health of the degraded transfer device to determine whether it is reliable enough to copy all data stored thereon. If the degraded data transfer device is sufficiently capable, the replacement device copies the stored data (e.g., redundancy coded shards) from the data storage of the degraded device to its own data storage, terminates the external data interface connection with the degraded data transfer device, and in so doing, restores the cluster to normal operation.

If the data on the degraded data transfer device (or the device itself) is not sufficiently reliable or available, the data is regenerated from shards stored on the other devices of the cluster, then reprocessed into shards using the redundancy coding scheme previously used to generate the original shards. The subset of the shards previously associated with the degraded device are transferred to the replacement device for storage.

Additionally, any data stored on the cluster while it was operating in a degraded operational mode may be subject to partial or complete redistribution, including, at least in part, to the replacement device. For example, in the five-device cluster example previously provided, if data was being stored on four of those devices during degraded operation, at least some of the data represented by a set of four shards (e.g., some of the shards) may be relocated to the replacement device so as to more evenly distribute them, as any two shards of the set of four are usable to regenerate the data, and any four out of the five devices may be used to store the shards. In some embodiments, the data is regenerated and re-encoded using a redundancy coding scheme that accounts for the presence of the replacement device (e.g., all five devices being available), and the shards accordingly stored thereby.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 in which switching devices 114, 122 and external data interfaces 118, 120 are implemented in network-attachable data transfer devices to mitigate cluster degradation due to a data transfer device malfunction. The respective external data interfaces 118, 120 and switching devices 114, 122 enable respective data transfer device(s) in which they are implemented to provide access, for authorized external entities connecting through the external data interface, to data storage 116, 124 (and data stored thereon) of a given data transfer device, thereby allowing for implementation of various processes and techniques to provide data and data device access to an otherwise degraded, inoperable, or partially inoperable data transfer device. The techniques described provide considerable technical improvements to the operation of, e.g., clusters of data transfer devices, the data transfer devices themselves, and downstream requisitioning and/or provisioning processes for such devices and clusters thereof, especially in scenarios where the data transfer devices and/or clusters thereof are operating in a degraded or otherwise non-nominal mode.

As described in greater detail in connection with FIG. 2 below, a switching device 122 provides access, via either or both an external data interface 120 and/or an internal data interface 126, to data storage 124 of a data transfer device. In the case of an data transfer device operating normally, the switching device 114 provides access to the data storage 116 via at least the internal data interface 112 to various components of the data transfer device, such as a processor 110, so that the device may perform operations involving the data storage 116 in the course of its normal operation. In some embodiments, the switching device 114, during normal operation of the data transfer device, does not connect the external data interface 118 to the data storage unless instructed by a different entity, e.g., the processor 110, to do so. In some embodiments, the external data interface 118 remains active, even during normal operation, simultaneously with the internal data interface 112, and in some of such embodiments, the external data interface 118 is only active to the extent that the switching device 114 is able to detect attempts from external entities to establish a connection with the data storage 116 (and not provide such a connection unless the connection is authorized).

In some embodiments, an unhealthy data transfer device, e.g., one where some or all of the components 130 of the data transfer device are in an non-operational, partially operational, or abnormally operating state, provides access to its data storage 124 via a switching device 122 that has been configured to provide such access via an external data interface 120. For example, while the data storage 124 of an abnormally operating data transfer device may still be operational, the components 130 of the data transfer device, such as the internal data interface 126 and/or the processor 128, may not be able to communicate with the data storage 124 and/or the switching device 122. Upon detecting such a condition and/or receiving information, such as a command from a different entity, that causes it to provide access to the data storage 124 via the external data interface 120, the switching device connects the data storage 124 with the external data interface 120. In some embodiments, further substantive access to external entities, such as other cluster devices 104, is conditional upon authentication by the switching device 122 of the unhealthy device (or other device, such as a display device, associated therewith) to access the data storage 124.

Upon authenticating and successfully establishing the connection via respective external data interfaces 118, 120, the healthy network-attachable data transfer device accesses the data storage 124 and provides access to that data storage 124, via a network interface 108, to entities connecting to the healthy network-attachable data transfer device via a network 106, such as other devices in the cluster 104, entities of a computing resource service provider 102, client devices interacting with the cluster, and the like. In a sense, the healthy data transfer device acts as a surrogate host for the unhealthy data transfer device, and addresses the data storage 124 as local storage (e.g., on a similar level as its own data storage 116). In some embodiments, one or more processing capabilities of the unhealthy data transfer device is bypassed and provided, directly or indirectly, by the tethered healthy data transfer device. For example, the components 130 of the healthy data transfer device, such as the processor 128 and/or internal data interface 126, which the unhealthy device ordinarily uses to access and provide access to the data storage 124, are bypassed for data requests associated with the data storage 124, and instead provided by one or more capabilities of the healthy network attachable data transfer device (e.g., the internal data interface 112, processor 110, network interface 108, etc).

As discussed in further detail below, the data storage 124 of the unhealthy data transfer device may be addressed by the cluster to which the data transfer devices belong as if the unhealthy data transfer device was fully functional. In some embodiments, the data storage 124 of the unhealthy data transfer device has one or more restrictions placed on its use and/or access, such as being addressed as read-only, preferentially disfavored for reads and/or writes, and the like. Furthermore, the healthy network-attachable data transfer device may, in connection with successfully connecting with the data storage 124 of the unhealthy data transfer device, initiate one or more actions, such as submitting provisioning and/or requisitioning requests for a replacement data transfer device to the computing resource service provider 102.

A client device may connect via the network 106 to one or more services provided by the computing resource service provider 102 as well as one or more data transfer devices (such as in a cluster). In some embodiments, the computing resource service provider 102 may provide a distributed, virtualized and/or datacenter environment within which one or more applications, processes, services, virtual machines, and/or other such computer system entities may be executed.

The command or commands to connect to the computing resource service provider 102 and/or the various data transfer device(s) may originate from an outside computer system and/or server, such as the data transfer device(s), or may originate from an entity, user, or process on a remote network location, or may originate from an entity, user, or process within the computing resource service provider, or may originate from a user of the client device, or may originate as a result of an automatic process or may originate as a result of a combination of these and/or other such origin entities. In some embodiments, the command or commands to initiate the connection to the computing resource service provider 102 may be sent to the services implemented thereby, without the intervention of a user of the services. The command or commands to initiate the connection to the services may originate from the same origin as the command or commands to connect to the computing resource service provider 102 or may originate from another computer system and/or server, or may originate from a different entity, user, or process on the same or a different remote network location, or may originate from a different entity, user, or process within the computing resource service provider, or may originate from a different user of the client device, or may originate as a result of a combination of these and/or other such same and/or different entities.

The client device and/or data transfer device(s) may request connection to the computing resource service provider via one or more connections and, in some embodiments, via one or more networks and/or entities associated therewith, such as servers connected to the network, either directly or indirectly. The device that requests access to the services may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 106, also as previously discussed, may include, for example, a local network, an internal network, a public network such as the Internet, or other networks such as those listed or described herein. The network may also operate in accordance with various protocols such as those listed or described herein.

The computing resource service provider 102 may provide access to one or more host machines as well as provide access to services such as virtual machine (VM) instances, automatic scaling groups, or file-based database storage systems as may be operating thereon. The services may connect to or otherwise be associated with one or more storage services such as those described herein. The storage services may be configured to provide data storage for the services. In an embodiment, the computing resource service provider 102 may provide direct access to the one or more storage services for use by users and/or customers of the computing resource service provider 102. The storage services may manage storage of data on one or more block storage devices and/or may manage storage of data on one or more archival storage devices such as, for example, magnetic tapes, hard disk drives, solid state drives, and the like.

The computing resource service provider 102 may provide a variety of services to connecting devices such as the data transfer device(s) and/or client device(s), which may in turn communicate with the computing resource service provider via an interface, which may be a web service interface, application programming interface (API), user interface, or any other type of interface. The services provided by the computing resource service provider may include, but may not be limited to, a virtual computer system service, a block-level data storage service, a cryptography service, an on-demand data storage service, a notification service, an authentication service, a policy management service, an archival storage service, a durable data storage service, and/or other such services. Each of the services provided by the computing resource service provider 102 may include one or more web service interfaces that enable the customer device 702 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 102, and/or to access one or more block-level data storage devices provided by the block-level data storage service).

Figure 2:
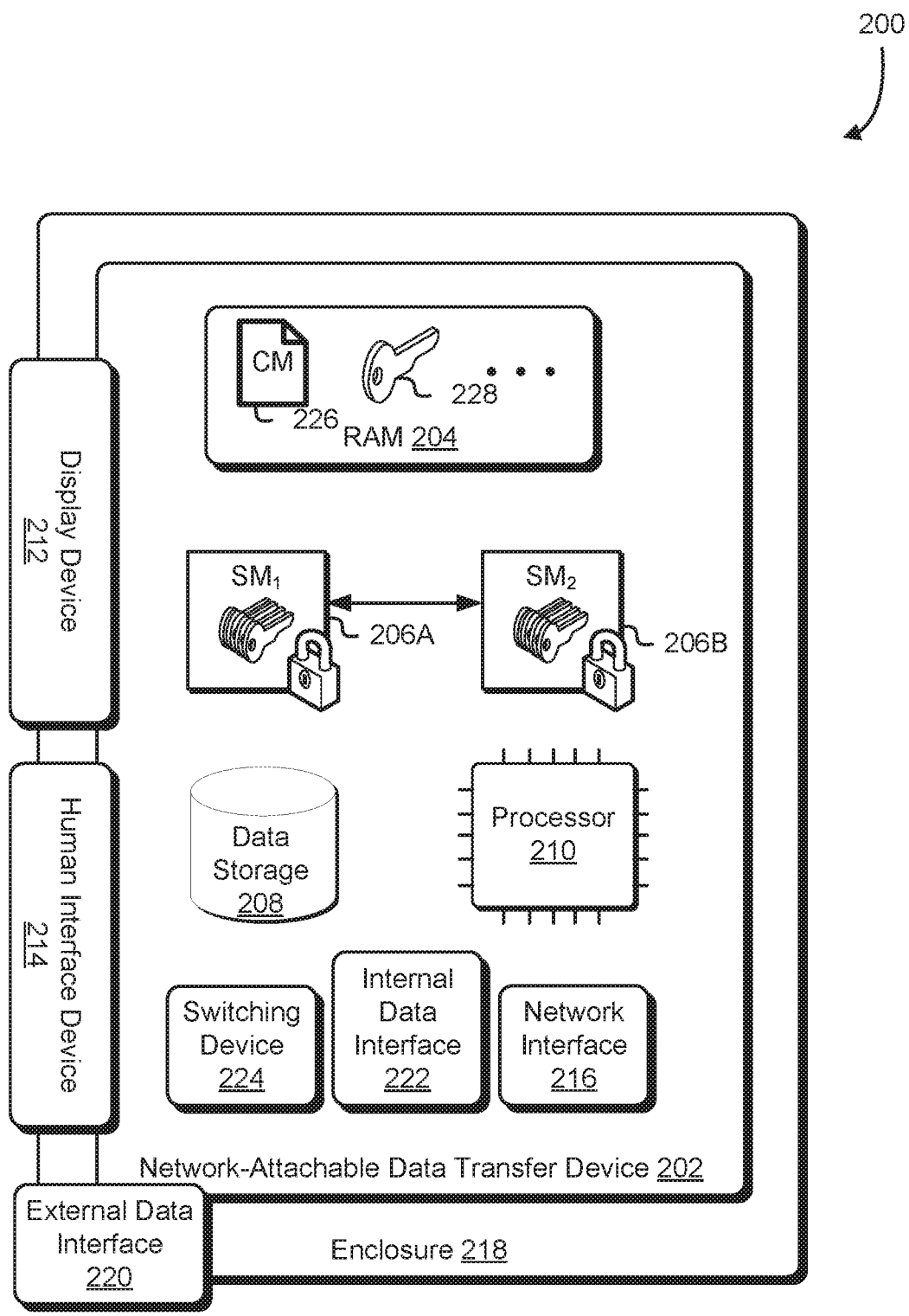
FIG. 2 illustrates an example schematic diagram of a network-attachable data transfer device, in accordance with some embodiments.

FIG. 2 illustrates an example schematic diagram 200 of a network-attachable data transfer device 202, in accordance with some embodiments. The diagram 200 illustrates various components and modules that may be included in a network-attachable data transfer device. However, data transfer device(s) including or omitting components are also contemplated as within scope of the present disclosure, and, in some embodiments, components and/or modules may be replaced by other suitable components and/or modules.

In some embodiments, as illustrated, the network-attachable data transfer device 202 includes volatile memory, such as random access memory (RAM) 204; one or more security modules 206A and 206B; persistent data storage 208; a processor 210; an electronic display device 212; a human interface device 214; a network interface 216, an external data interface 220, an internal data interface 222, and a switching device 224. The network-attachable data transfer device may be physically enclosed in a tamper-proof enclosure 218.

As mentioned, in some embodiments, the network-attachable data transfer device 202 includes volatile memory such as RAM 204. Any suitable form of volatile memory may be used in place of and/or in addition to RAM, such as registers, caches, and other types of temporary storage. In some embodiments, the contents stored in volatile memory such as RAM 204 are erased as a result of the network-attachable data transfer device 202 losing power (e.g., the device rebooting as a result of a loss of power, even temporary). Data stored in volatile memory may be maintained based at least in part on the device maintaining power—the data may be lost when the device loses power even, in some cases, as a result of temporary and/or intermittent power loss of the device. In an unlocked network-attachable data transfer device, the RAM may temporarily store a cluster manifest 226 and cryptographic material such as a cryptographic key 228 obtained, e.g. from an encrypted payload of the cluster manifest 226 using techniques described elsewhere herein. The cryptographic key 228 may be used by the network-attachable data transfer device 202 to perform one or more features, functions, operations, requests, and the like, according to techniques including those described in further detail elsewhere herein.

In some embodiments, the network-attachable data transfer device 202 is configured with one or more security modules such as the security modules 206A and 206B. A security module may be any cryptoprocessor capable of carrying out cryptographic operations, such as a trusted platform module (TPM), physically unclonable function (PUF), hardware security module (HSM), and the like. In some embodiments, a security module is a physical computing device that safeguards cryptographic keys by storing them within a tamper-resistant physical device. Security modules may be used for cryptographic key generation and storage, and to perform cryptographic operations for authorized clients of the security module. In general, the cryptographic keys are not exportable from the security module in an unprotected form. In some embodiments, a security module is configured to perform a cryptographic operation such that an input value and an output value have different fixed sizes. For example, where the cryptographic operation is an encryption operation, the input plaintext may be of a first fixed size (e.g., 254 bytes) and may generate an output ciphertext that is of a second fixed size (e.g., 312 bytes). Conversely, a decryption operation may accept an input ciphertext that is 312 bytes in size and generate a corresponding output plaintext that is 254 bytes in size. A security module may be configured to perform various types of cryptographic operations such as encrypting data, decrypting data, verifying authenticity of data, and more. Encryption and decryption operations may be extended to support authenticated encryption and authenticated decryption, respectively. A security module that has been tampered with or been subject to an attempted tampering may be unable to perform cryptographic operations.

In some embodiments, authenticity of a security module is verified by successfully decrypting a ciphertext. For example, a security module that was able to successfully decrypt a first encrypted partition of, e.g., an encrypted payload associated with a cluster manifest, attests to the authenticity of the security module and verifies that the security module was not tampered with and is in working condition. Security modules may have interconnects that allow the security modules of a network-attachable data transfer device to securely communicate with each other (e.g., the interconnect includes tamper-resistant capabilities such that measurement of signals such as electrical signals across the interconnect is not possible without detection). It should be noted that while FIG. 2 depicts an interconnect between security modules 206A and 206B connection, other connections between components may exist but have been omitted for clarity.

In some embodiments, the network-attachable data transfer device 202 includes one or more persistent data storage 208 components. Persistent data storage media may include non-volatile storage such as hard drives, tape drives, magnetic drives, non-volatile flash memory such as solid state drives, and the like. A persistent storage medium may be capable of storing large amounts of data, such as encrypted data (e.g., from a large data store such as a customer storage system) during shipment from one data facility to another data facility. In some embodiments, the network-attachable data transfer device 202 receives the data to be stored via a network connection accessible through the enclosure 218 via the network interface 216, and provides access to the persistent storage medium as a network-attached storage device. In some examples, the network-attachable data transfer device 202 receives the data to be store from another cluster device via a communication session such as a cryptographically protected communication session (e.g., TLS session).

In some embodiments, the persistent data storage 208 operates in connection with the persistent data storage of other network-attachable data transfer devices in a cluster. For example, in some embodiments, data is encoded according to a redundancy coding scheme, such as by use of one or more erasure codes, to generate a plurality of shards to be distributed amongst and stored across multiple media within and/or across multiple network-attachable data transfer devices of a cluster. Furthermore, the data storage 208 may include multiple data storage devices that store multiple data components for a given data object. For example, the multiple data storage devices of a given data transfer device 202 may store data encoded into shards according to one redundancy coding scheme and distributed amongst the data storage devices, and the data those shards represent may in turn be encoded into a different set of shards according to second redundancy coding scheme and distributed amongst data transfer devices of a cluster for storage. The redundancy coding scheme(s) used may be the same or different, and, as described in further detail below, the shards generated therefrom may be erasure coded (e.g., only generating derived shards), bundle encoded (into identity and derived shards), grid encoded (multiple intersecting bundles of bundle-encoded shards), duplicated relative to other generated shards, and/or generated according to any other suitable encoded. Furthermore, as may be contemplated, a given shard may be subject to multiple redundancy coding schemes, and/or a given redundancy coding scheme may include multiple types of encoding.

A network-attachable data transfer device 202 may have one or more processors 210 such as central processing units (CPUs) and/or graphics processing units (GPUs) that are capable of performing various computational operations, such as cryptographic operations. In some embodiments, a network-attachable data transfer device 202 has one or more motherboards that each include some or all of the components illustrated in FIG. 2, such as one or more processing units such as the processor 210. Furthermore, in some embodiments, each of the motherboards includes at least one security module (e.g., the security module 206A and the security module 206B reside on different motherboards of the data transfer device 202).

The network-attachable data transfer device 202 may also include a display device 212, which includes an outward-facing electronic display. The electronic display may be used to display a destination location (e.g., in lieu of a shipping label). The electronic display may incorporate various types of display technologies such as low-power electronic-ink (e-ink), organic light emitting diodes (OLED), liquid crystal display (LCD), active-matrix organic light-emitting diode (AMOLED), flexible displays, and other such technologies. The display may further be a touch-screen display that a customer may interact with using a finger, stylus, or other input device. The network-attachable data transfer device 202 may be configured with multiple displays using multiple display technologies. The display may be visible to a customer, postal employee, etc. through the protective exterior enclosure 218.

The display device 212 may further include other components, such as a processor, a cryptoprocessor, data storage, a network interface, and the like. The display device 212 may communicate with other components of the data transfer device 202 using its own components. For example, the display device may connect, via a Universal Serial Bus (USB) or other data connection, with the switching device 224 so as to issue commands to the switching device 224 as well as to provide feedback regarding the operation of the switching device (as well as that of the data transfer device 202 as a whole) via its electronic display. As another example, the display device 212 may have access to the security modules 206A, 206B so as to issue commands to and receive information back therefrom. As yet another example, the display device 212 may receive commands and/or other information from processor 210, so as to then translate such commands into actions (e.g., displaying certain information on its electronic display, issuing commands of its own in response to, e.g., the switching device, and the like). The display device 212 may include a network connection, such as a wireless network connection, so as to communicate with other network devices (e.g., other display devices of other data transfer devices, as well as with other devices or services over the Internet).

A human interface device (HID) 214 may also be included as part of a network-attachable data transfer device 202. The human interface device 214 may be used to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition using one or more sensors. Embodiments in accordance with this disclosure may use any combination of the techniques described herein as part of a process for unlocking a network-attachable data transfer device 202. A touchscreen display, such as the display of the display device 212, may be a human interface device. The human interface device 214 may be connected to the display device 212, another component of the data transfer device 202, or both. A locked network-attachable data transfer device may receive the verification data (password, PIN code, fingerprint data, etc.), perform an authentication process (e.g., verify that the provided password matches the user account associated with the device and/or unlock), and then unlock the device. The verification data may be used as part of a decryption process where an encrypted cluster manifest is decrypted and made available for use by the system.

The network-attachable data transfer device 202 may further include a network interface 216. The network interface may be used as an interface between an external network (e.g., a computer network or a service provider network) and the network-attachable data transfer device 202. In some embodiments, the network interface is used to communicate with other devices of a cluster in an ad-hoc manner—for example, various types of decentralized ad hoc networks. In some embodiments, the network interface uses a wireless interface such as a Wi-Fi network or a cellular network.

The network-attachable data transfer device 202 may have a tamper-resistant enclosure 218 that acts as an enclosure to protect the device from being physically tampered with. The enclosure may be used to physically deny access to various internal components and modules such as RAM, security modules, one or more persistent storage media, and processing units, network interfaces, data stored on any of the above components, and more. In some embodiments, the enclosure 218 is made of hardened materials and may be ruggedized in accordance with one or more military standards and/or electronics industry standards. The enclosure may prevent access to internal components while simultaneously allowing access to other components, such as a display, external data interface, and/or human interface device that a customer may interact with. The enclosure 218 may have sensors for detecting kinetics to detect physical treatment of the device, such as sensors for measuring force, accelerometers, gyroscopes, etc. The enclosure may further be equipped with processors and/or memory to monitor sensors. Conditions detected by the enclosure may cause the system to enter a locked state—for example, detection of the device being subject to strong forces may indicate an attempt to tamper with the device (e.g., by breaking open the enclosure to access internal components).

The data transfer device 202 may include an internal data interface 222 and an external data interface 220. The internal data interface 222 may reside on one or more motherboards of the network-attachable data transfer device 202, and provides a connection between the processor 210 and the data storage 208. Furthermore, the switching device 224 may be connected interstitially between the internal data interface 222 and the data storage 208. The internal data interface 222 may use one or more of any suitable data interface protocols, such as Serial Attached SCSI (SAS), Serial ATA (SATA), Small Computer System Interface (SCSI), Fibre Channel, and the like, to negotiate and establish a connection between the processor and the data storage 208, as well as with other devices, such as those connected through the external data interface 220. Similarly, the external data interface 220 may utilize one or more of the aforementioned protocols to negotiate and establish a connection between the processor 210, the internal data interface 222, and/or devices connected directly or indirectly to the external data interface 220. The protocol used to connect a device via an external data interface 220 may be the same or different than a protocol used by the internal data interface 222 to connect to the data storage 208.

The data transfer device 202 may include a switching device 224. The switching device may include a processor, volatile and non-volatile memory, data interface(s) for interacting with the internal data interface 222, the data storage 208, and/or the external data interface 220, a different data interface for interacting with, e.g., the processor 210 and/or the display device 212, and the like. In some embodiments, the switching device 224 includes a connection to the internal data interface 222, a connection to the external data interface 220, a connection to the data storage 208, and a connection to each of the display device 212 and the processor 210. However, other configurations for the switching device 224 are contemplated, such as a lack of a connection with the display device 212 and/or the processor 210, etc.

While various components of a network-attachable data transfer device have been illustrated in FIG. 2, the network-attachable data transfer device may be configured with various components added, removed, modified, or some combination thereof. For example, a network-attachable data transfer device may further include geolocation sensors such as a global positioning system (GPS) receiver that may be used as part of determining a shipping address to display. The GPS receiver may also be used to lock the device if it is determined the device is not in an expected geolocation or that the device is not within a prescribed distance from an expected path that the shipment of the device is expected to take.

In some embodiments, the network-attachable data transfer device includes ports and other peripheral connectors that may allow for additional functionality. For example, peripherals may be attached to the network-attachable data transfer device via a universal serial bus (USB) that may be accessible through the enclosure 218. In some embodiments, the system supports USB-pluggable security devices such as a portable hardware authentication device that may function as a security module. For example, in some cases, a portable hardware authentication device may be used to decrypt a partition of an encrypted data entry as part of the process for obtaining a cryptographic key encoded in the encrypted data entry. In this way, possession of a portable hardware authentication device may be required to obtain a cryptographic key from an encrypted data entry and/or obtain access to the decrypted contents of an encrypted payload.

Figure 3:
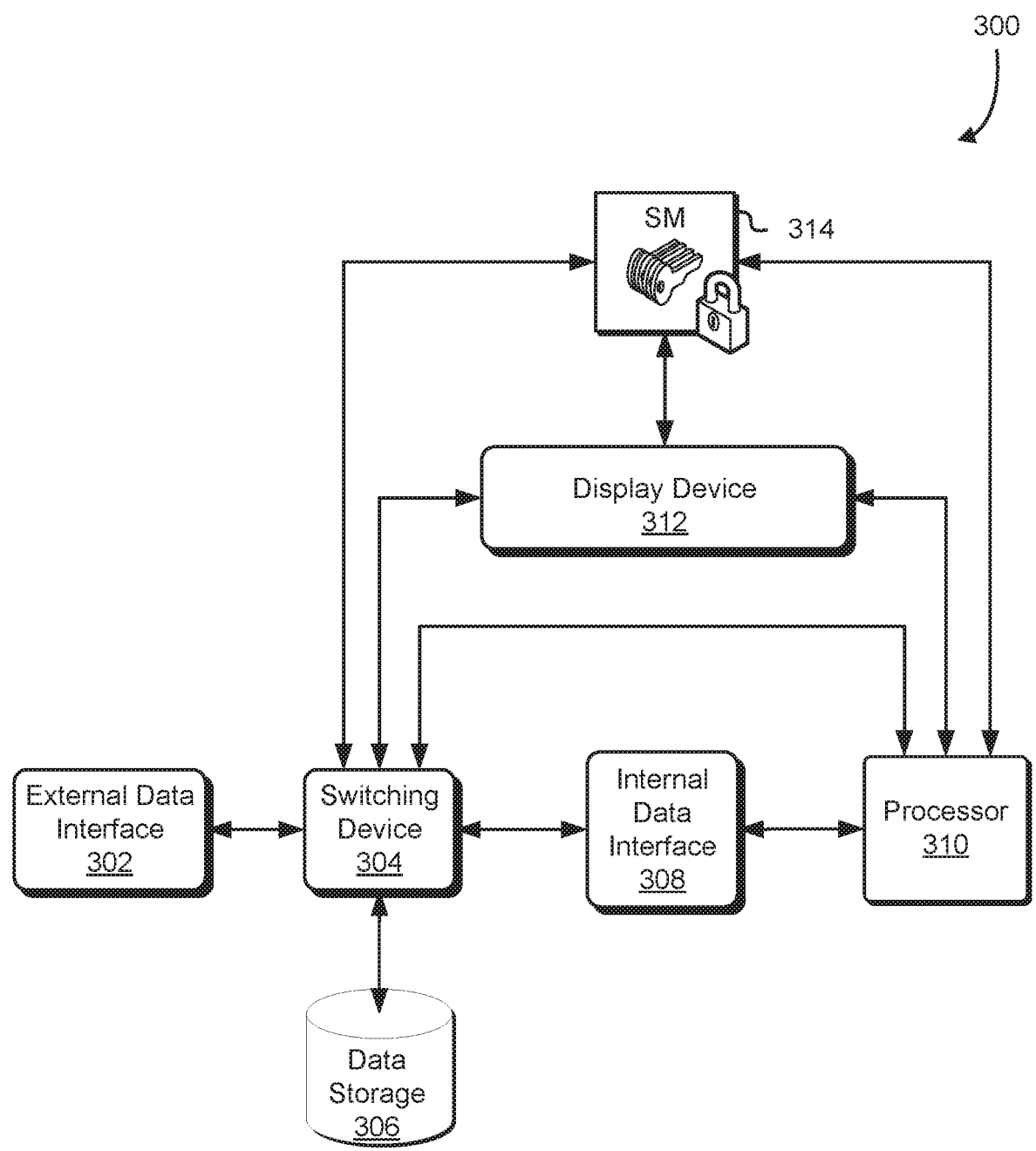
FIG. 3 illustrates an example schematic diagram of an integration of a switching device with a data transfer device, in accordance with some embodiments.

FIG. 3 illustrates an example schematic diagram 300 of an integration of a switching device 304 with a data transfer device, in accordance with some embodiments. In some embodiments, as previously mentioned, a switching device 304 is implemented in a data transfer device to control access to data storage 306 of the data transfer device. For example, the switching device 304 may be connected to both an internal data interface 308 and an external data interface 302, where the internal data interface 308 is used by the processor 310 and other components of the data transfer device to transact data with the data storage 306 (e.g., one or more data storage devices, such as hard disk drives, solid state drives, and the like) during ordinary operation of the data transfer device. Accordingly, the switching device 304, which also connects to the data storage, may generally behave transparently with respect to the internal data interface 308 and the data storage 306. In other words, the processor 310 may access the data storage 306 via the internal data interface 308 as if the switching device 304 was not interposed between the internal data interface 308 and the data storage 306, so long as the switching device 304 is in a corresponding mode.

In some embodiments, the switching device 304 is capable of also providing alternative and/or simultaneous access to the data storage 306, to varying degrees, via either or both the external data interface 302 and the internal data interface 308. For example, in the aforementioned normal operational mode of the data transfer device, the switching device 304 may provide full access between the processor 310, the internal data interface, and the data storage 306, and limited access to the data storage 306 via externally connected entities via the external data interface 302. As another example, the switching device 304 may not provide any access to the data storage 306 via the external data interface 302, but may listen for connection attempts on the external data interface 302.

The various modes of the switching device 304 may be switched via one or more commands by the processor 310 and/or the display device 312, or in response to detection of an event by the switching device 304. For example, the switching device 304 may detect or be provided information, such as by the display device 312 and/or the processor 310, a connection attempt (e.g., via the external data interface), a failure event (e.g., of the processor, network interface, and/or internal data interface of the data transfer device), a direct instruction to switch modes, and the like.

Command(s), as described throughout this disclosure, include any direction to perform an action. In some embodiments, a command conforms to a standard or protocol usable by a submitting entity to signal the desired action, and understandable by the receiving entity to perform that action. In some embodiments, the command does not conform to any standard or protocol and is submitted by a submitting entity to indicate, to a receiving entity, to perform a specific action (and the receiving entity interprets the form and/or content of the indication so as to perform the action in response). For example, a submitting and/or a receiving entity uses general-purpose input/output (GPIO) to issue and/or receive the command. In some embodiments, a single entity may both submit and receive a command. In some embodiments, a single entity may both submit and receive the same command (i.e., self-issue a command so as to cause itself to perform an action).

Furthermore, a given command may be a sub-command of a different command. For example, a command may include an action that results in one or more subactions, and thus include multiple implied commands. In some embodiments, commands are discrete. However, it is contemplated that, in some embodiments, some commands utilized in a given implementation are discrete commands, and other commands are subcommands, implied commands, etc. from a different command. As may be contemplated, commands may include simple, formless low-level electrical signaling (e.g., in certain implementations using GPIO), more complex forms (such as processor/instruction-set-level and/or protocol-level commands, such as SATA, SCSI, and/or USB commands), and/or high level indications (such as API and/or webservice calls), any of which may include and/or be part of commands of other types and/or levels of abstraction.

As mentioned, the commands and/or decisions to switch modes may be issued or determined in response to manual interaction (e.g., with the display device and/or as received by the processor), in connection with detection of an event, such as a connection event or a failure event, and the like. Depending on the desired access to the data storage, e.g., related to a diagnostic, recovery, or mitigation process, the switching device 304 processes such commands to connect the data storage to either or both the external data interface 302 and/or the internal data interface 308 in accordance with the command and/or determination.

As mentioned, in some embodiments, the switching device 304 includes a processor and other components that allow it to make its own determination, in a similar fashion, of which interface(s) to connect to the data storage 306, as well as access to one or more security modules 314. The security module(s) 314 may be the same security module(s) of the data transfer device as discussed above in connection with FIG. 2. In other words, in some embodiments, the switching device 304 has access to the security modules used by the data transfer device to encrypt and/or decrypt data, such as portions of the cluster manifest, the data to be stored on the data storage 306, and the like. In some embodiments, the security module 314 is a different security module than the main security module(s) of the data transfer device. In such embodiments, the security module 314 may be external to the data transfer device, integrated into the display device 312, and/or integrated into the switching device 304. The switching device 304 uses the security module 314, directly or indirectly, to authenticate the credentials of a device attempting to connect with the external data interface 302, according to techniques described in further detail in connection with at least FIG. 5 below.

Figure 4:
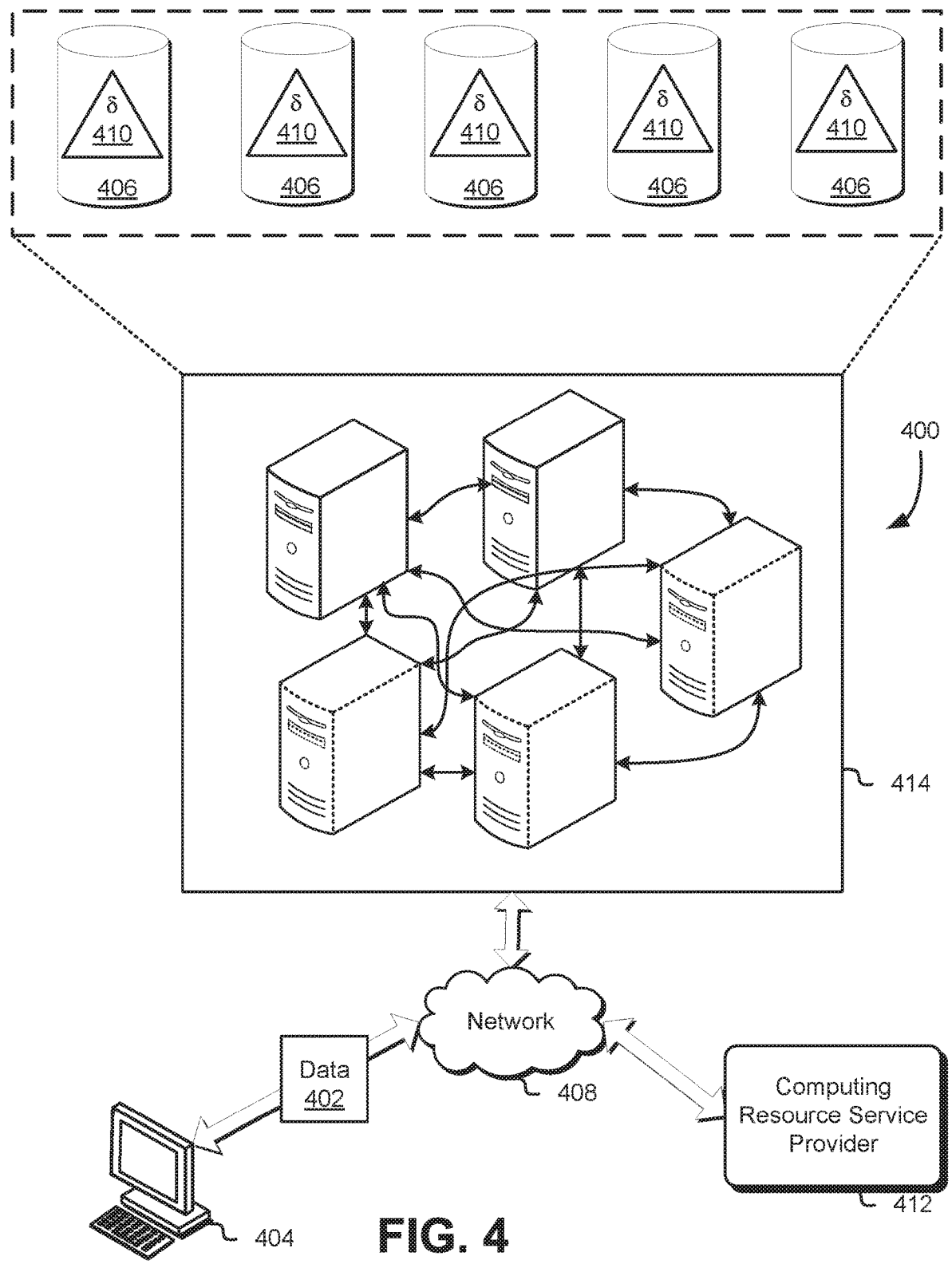
FIG. 4 illustrates an example environment in which a plurality of data transfer devices may be implemented as a cluster to provide scalable data services, in accordance with some embodiments.

FIG. 4 illustrates an example environment 400 in which a plurality of data transfer devices may be implemented to provide scalable data services, in accordance with some embodiments.

A plurality of data transfer devices, configured in a cluster 414, may be configured to mimic the operation of a service of the computing resource service provider 412 without relying on some or any capabilities of the computing resource service provider 412. For example, the cluster of data transfer devices 414 may provide a certain level of storage, durability, computational capability, and the like, that would otherwise be available by provisioning a similar level of capability directly from the computing resource service provider 212. Transfer of data (e.g., data 402) and provisioning of capabilities may be transparent, from the perspective of the connecting client device 404 interacting therewith, as between the clustered data transfer devices 414 and the computing resource service provider 412.

In some embodiments, the quantity of and/or capabilities delivered by the clustered data transfer devices may be scaled up or down on demand, such as by requisition of additional data transfer devices to add to the cluster, or by removal of one or more data transfer devices from the cluster. Such scaling requests may be made by the customer entity 404 and directed to the computing resource service provider 412, the cluster 414, or may be implied based on operational parameters of either the cluster 414 or the computing resource service provider 412.

The cluster may include a local version of interfaces exposed to the client device entity 404, such as application programming interfaces (APIs) or web service interfaces, that are similar to those provided by the computing resource service provider 412, and thus facilitate transparent and/or flexible conversion and/or extension between capabilities provided directly by the cluster 414 and those provided by the computing resource service provider 412 to which the cluster is associated. As an example, the client device 404 may provide, over a network 408, data 402 for archival or storage on durable and/or persistent storage 406 of the devices of the cluster 414, such as a bundle of redundancy coded shards 410. Depending on how and to what extent the cluster 414 has been provisioned to store the data and/or process the data with the redundancy code, the client device 404 may submit data 402 to either the cluster itself 414 or the computing resource service provider 412 via the network 408, and the data may be processed, transferred, and/or stored according to the level of provisioning, much as a computing resource service provider 412 with multiple regions and/or availability zones provides a unified interface and transparent functionality with respect to the specific regions or availability zones in which the data is processed is stored. Accordingly, in some embodiments, the cluster of data storage devices 414 behaves and is treated as simply another region or portion of the computing resource service provider 412, and may be scaled up and down according to request, demand, and the like.

The scaling of the capabilities of the cluster of data storage devices 414 may depend on the specific purpose or purposes provisioned from the cluster of data storage devices 414. For example, a customer associated with the client device 404 provisions (or requests, from the computing resource service provider 412, the provisioning of) the cluster of data storage devices 414 for a specific quantity of data storage space at a specified level of reliability and/or durability. As the customer's reliability, storage space, and/or durability requirements for the cluster changes, e.g., by a request of the customer via the client device 404, by a process of the cluster 414 itself (such as using a monitor or watch dog process that alerts the cluster 414, or the computing resource service provider 412, when the provisioned limits are being approached or if a level of usage drops below a specified proportion of the provisioned limits), and/or by a command or other process of the computing resource service provider 412 to which the cluster is associated, additional data transfer devices may be added to the cluster or unneeded capacity/capability may be removed from the cluster (e.g., by removing data transfer devices from the cluster, throttling the existing devices in the cluster, or remotely provisioning unneeded capability/capacity to other clusters, the computing resource service provider 412, or the like). In circumstances where additional capability/capacity is needed in the short term, the computing resource service provider 412 may directly provide the additional capability/capacity for a period of time, in some cases indefinitely, and/or until additional data transfer devices can be added to the cluster 414.

The cluster 414 may be configured to be addressable by an external entity—such as through its API, and by the client device 404, the computing resource service provider 412, or related processes, systems, or devices—such that any of the constituent data storage devices can serve as an external point of communication of the cluster 414 as a whole. For example, the cluster 414 may be configured as or in a similar fashion to that of a distributed hash ring. As another example, an external (or internal) load balancing method or system may be employed such that a unified external address identifier (e.g., an IP address or similar), can internally (or externally) be changeably directed to any of the constituent data transfer devices of the cluster to process the incoming request, or its eventual reply, for further processing (e.g., using the computational or other capabilities of the cluster).

As may be contemplated, the cluster 414 may be configured (and in some cases optimized) to provide one or more types of capability. Such capabilities may include one or more of the following: reliability, data storage capacity, physical size, computational capacity (e.g., as may be provided by graphics processors via OpenCL or GPGPU, central processing units, specialized ASICs or other specialized processors, network processors, cryptography processors, and the like), durability, throughput (either retrieval or storage), latency (either retrieval or storage), data bandwidth, electrical power consumption/efficiency, and the like. The cluster 414 may be optimized for one or more of these types of capabilities, but still be able to provide other types of capabilities for which it is not necessarily (or not primarily) optimized.

Figure 5:
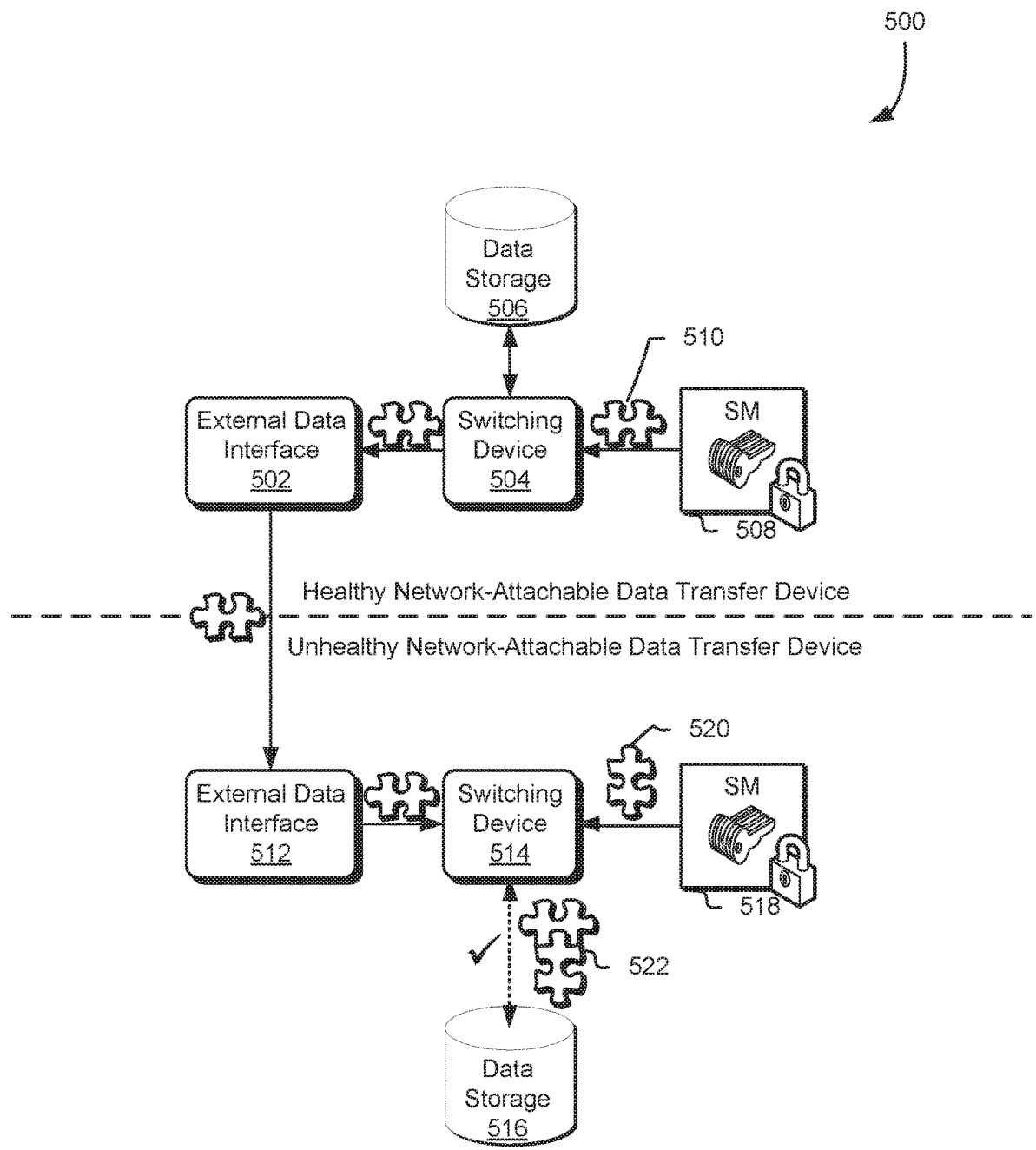
FIG. 5 illustrates an example environment in which an unhealthy data transfer device negotiates authentication information with a healthy data transfer device attempting to connect through an external data interface, in accordance with some embodiments.

FIG. 5 illustrates an example environment 500 in which an unhealthy data transfer device negotiates authentication information with a healthy data transfer device attempting to connect through an external data interface, in accordance with some embodiments.

As previously mentioned, external access to data storage of a data transfer device, such as via an external data interface, may be limited to authorized entities. For example, an unhealthy data transfer device, as previously discussed, includes a switching device 514 that allows conditional access to data storage 516. The access is conditional upon verifying credentials, such as a token, a certificate, or other cryptographic information, associated with the external access request. Some or all data transfer devices of a cluster may be configured as such; e.g., it may be contemplated that a healthy data transfer device having data storage 506 may, under certain circumstances, become unhealthy, and thus provide conditional access to data storage 506 in a similar fashion as described herein for the example unhealthy data transfer device and its corresponding data storage 516.

In the illustrated example, in response to an attempted connection by the healthy data transfer device, the switching device 514 of the unhealthy data transfer device performs an authentication process to confirm the authority of the healthy device attempting the connection. The security module 508 of the healthy device provides, to the receiving device either with the connection attempt/request or separately from it (e.g., in response to an authentication challenge of the unhealthy device), cryptographic material 510. The cryptographic material 510 may be sourced from the security module 508 and passed through the switching device 504 to external data interface 502, which then submits it to the corresponding external data interface 512 of the unhealthy device.

Continuing the example, the external data interface 512 passes the received cryptographic material to the switching device 514, which then utilizes the security module 518 to confirm the authenticity of the request by processing the received cryptographic material. In some embodiments, the cryptographic material may be a shared secret between the healthy and unhealthy device. In some embodiments, the submitted cryptographic material 510 may be ciphertext that is encrypted with a public key of a public/private cryptographic pair, and the corresponding private key is held in the security module 518 and is necessary to decrypt and verify the ciphertext. However, other examples of two-party authentication are contemplated hereby, including the various techniques discussed in connection with, e.g., FIGS. 1 and 2 above.

To the extent that the switching device 514 determines or receives information that the cryptographic material 510 corresponds to cryptographic material 520 (e.g., in the shared secret and/or public/private pair examples just provided), the switching device 514 then provides further full or otherwise additional access, via the external data interface 512, to the data storage 516. In some embodiments, the device providing access to its data storage 516 confirms, e.g., using a cluster manifest associated with a cluster to which it belongs, whether the connecting device corresponds to, and can properly decrypt, an encrypted payload included thereon, before providing such access. In some embodiments, the security modules 508, 518 may simply be "dummy" or "dongle" devices attached to the respective switching device 504, 514, that provide basic cryptographic processing so as to provide for the authentication process just mentioned.

Figure 6:
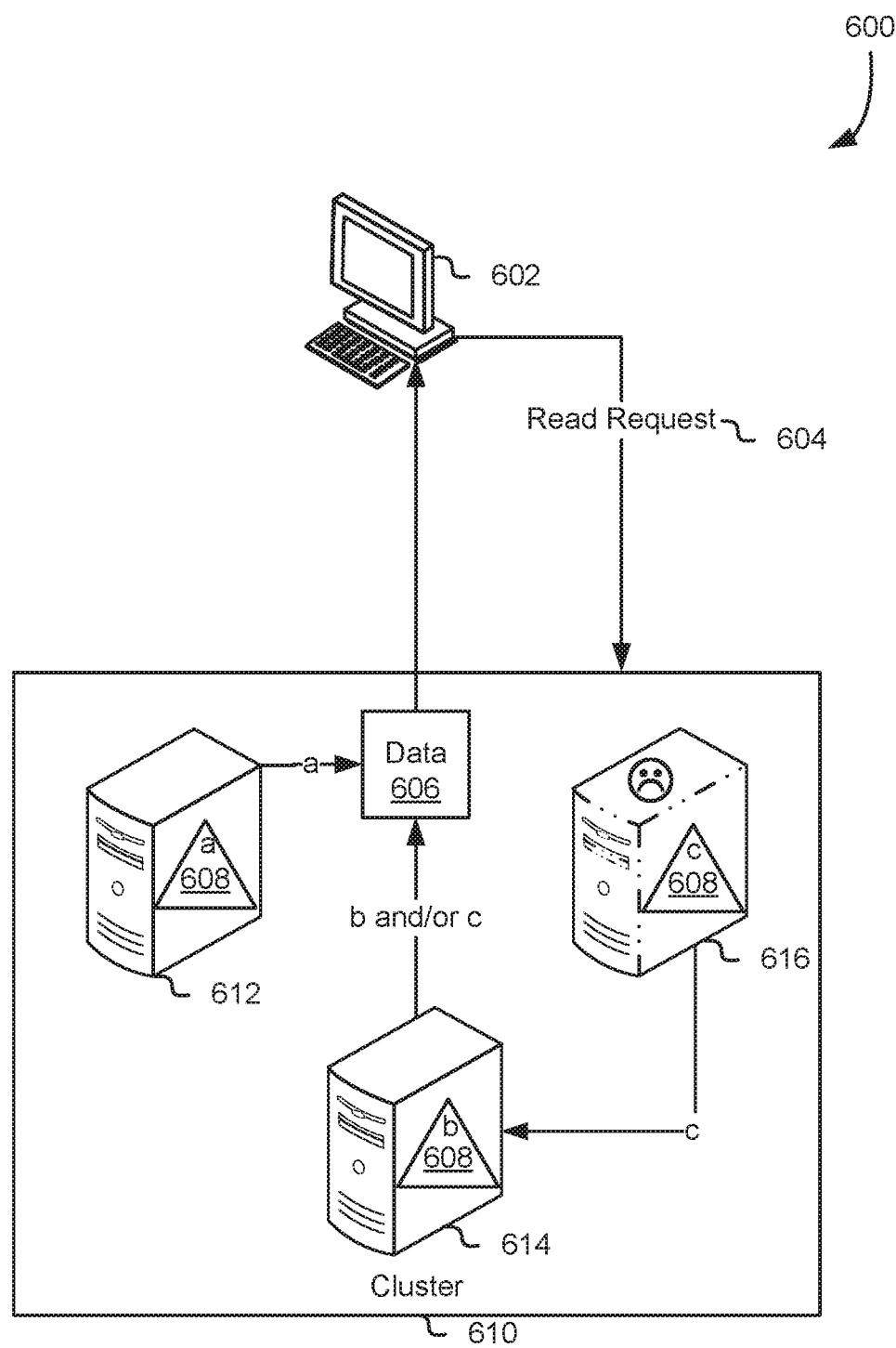
FIG. 6 illustrates an example environment in which a degraded cluster uses an abnormally operating data transfer device to provide data stored thereon in response to read requests, in accordance with some embodiments.

FIG. 6 illustrates an example environment 600 in which a degraded cluster 610 uses an abnormally operating data transfer device 616 to provide data 608c stored thereon in response to read requests 604, such as from a client device 602, in accordance with some embodiments.

In some embodiments, after an unhealthy data transfer device 616 has successfully connected with a healthy device 614 to serve as a "host" or "surrogate" for its data storage, the now degraded cluster 610 continues to process read and write requests for data 606. In the illustrated example, a client device 602 issues a read request 604 for data 606 stored on the cluster 610. As mentioned, data to be stored on devices of a cluster may be processed by one or more redundancy codes to generate redundancy coded shards, which in turn are distributed for storage on the various devices of the cluster. Data stored in this manner, as mentioned, is resistant to availability loss or actual loss, as fewer shards than the total number of shards generated for a given set of data are needed to retrieve the entirety of the data. As may be appreciated, the redundancy coding scheme used may be associated with the number of active devices in a given cluster.

For example, the cluster 610 of three data transfer devices 612, 614, 616 may implement a redundancy coding scheme generating three shards, one each per device, where two of the shards are sufficient to recover the entirety of the data represented. Accordingly, during nominal cluster operation, a read request may involve retrieval of shards from two or three devices of the cluster, while a write request would involve writing a shard to each of the three devices.

As illustrated, the data 606 is sharded into a set of encoded shards 608a, 608b, 608c, distributed respectively to healthy devices 612, 614, and unhealthy device 616. As may be contemplated, an arrangement where a given healthy device 614 must respond to requests for both data components 608b and 608c can potentially result in twice the load on the healthy data transfer device 614 when servicing requests for data 606. In some embodiments, therefore, cluster metadata, such as the cluster manifest associated with the cluster 610, is updated to reflect the temporary topology of the degraded cluster. Accordingly, the cluster 610 may treat the data storage of the unhealthy data transfer device 616 in a different fashion as data storage of other data transfer devices 612, 614 within the cluster 610 during the period of time over which the cluster is operating in a degraded fashion.

For example, the data storage devices of the unhealthy data transfer device 616 may be marked as read-only, and preferentially avoided in favor of other data storage (e.g., of healthy devices 612, 614) storing or encoding the same data. In the illustrated example, the data 606 is represented, as mentioned, by three encoded shards 608a, 608b, 608c, any two of which are sufficient to regenerate the data 606. Thus, in the event that one or more operational parameters associated with one or more of the data storage devices 612, 614, 616, or more generally, the cluster 610 indicate that regenerating the data from only shards 608a and 608b would be sufficient to meet a performance requirement associated with the read request 604 (or the cluster 610), the cluster 610 may collectively decide to perform the regeneration of data 606 without using shard 608c stored on the unhealthy device 616. The operational parameters include, but are not limited to, system load, network traffic level, available data storage space, data durability/availability, maximum input/output operations per unit time (such as TOPS), read/write/request latency, throughput, reliability indicia of the data transfer device 612, 614, 616 and/or the components respectively associated therewith, service-level agreement (SLA) response and/or request fulfillment times, and the like. The performance requirement may involve similar parameters.

Conversely, a cluster 610 operating in this manner may further adjust its operation with regard to both read and write requests and operation while the cluster is degraded and one or more of the performance requirements and/or operational parameters justifies the use, even if preferentially avoided, of data stored on an unhealthy data transfer device 616. In the illustrated example, the one device (or shard) margin of error is reduced to zero (i.e., any additional device failures would result in loss of data or accessibility thereto). To the extent that a degraded operating state of the device 616 occurs as a result of other aspects of the data transfer device 616 so as to allow the data storage of that device to continue to be capable of providing the data, the aforementioned external data interface-enabled connection of the data storage of the degraded device 616 to a healthy data transfer device 614 allows the shard 608c to be available as necessary. Accordingly, the data 606 can still be recovered if healthy device 612 also fails, as device 614 provides the requisite two shards 608b, 608c sufficient to regenerate the data 606. The use of the shard 608c may, as mentioned, be warranted under other conditions, such as a requirement for additional throughput for the data 606, or to provide the data 606 within an SLA associated with the read request 604 (e.g., as set by the computing resource service provider and/or a customer thereof).

Figure 7:
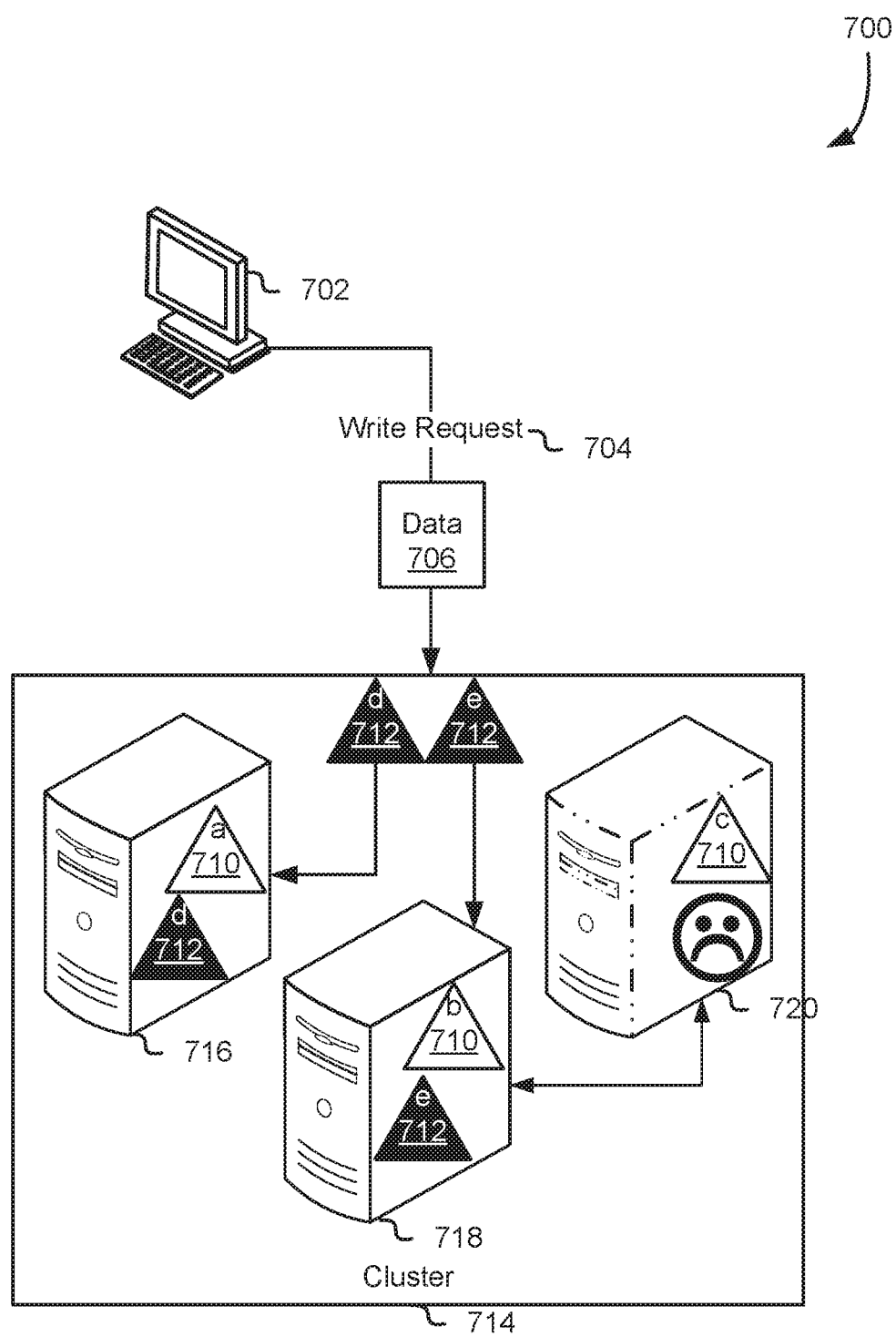
FIG. 7 illustrates an example environment in which a degraded cluster stores data on other devices than a partially available data transfer device during a period of degraded operation, in accordance with some embodiments.

FIG. 7 illustrates an example environment 700 in which a degraded cluster 714 stores data components on other devices than a partially available data transfer device 720 during a period of degraded operation, in accordance with some embodiments.

Further to FIG. 6, if the data storage of the degraded data transfer device 720 is reliable enough to store data, in some embodiments, data writes may continue to be committed to that data storage if the performance requirements and/or operational parameters so justifies, e.g., if the cluster as a whole is short on storage space. In such an example, the redundancy coding scheme, which generates three shards for a given data object and is used to generate the shards 710a, 710b, 710c, may continue to generate sets of three shards for additional incoming data objects, with one device 716 storing one shard and the device 718 "hosting" the data storage of the unhealthy or offline device 720 storing two shards, one on its own data storage, and one on the "external" data storage.

However, if the data storage of the degraded data transfer device cannot be verified as reliable for write operations, or if other performance requirements and/or operational parameters do not justify a countervailing preference to avoid storage of further data on the degraded device 720, the cluster 714 may implement a different redundancy coding scheme to account for the remaining devices and/or the degraded device, so as to retain a desired level of availability, durability, etc. In the illustrated example, a client device 702 issues a write request 704 for data 706 while the cluster 714 is in a degraded operational state. Rather than using the redundancy coding scheme to generate three shards therefrom as normal, the cluster may implement a different redundancy coding scheme that generates only two shards 712*d*, 712*e*, so as to store one shard a piece on the health devices 716, 718, where only one of the shards is sufficient to retrieve all of the data 706 upon request, and omitting the data storage of the "tethered" device 720.

As may be contemplated, in some embodiments where shards (e.g., 712*d*, 712*e*) are generated, these shards may be duplicates of each other (i.e., the redundancy coding scheme used generates an additional copy of the data and stores each copy as an individual shards). In scenarios where the redundancy coding scheme generates one or more shards containing original data (or encoded data constituting that original data), such as the case where the redundancy coding scheme uses replication in full or in part, bundle encoding and/or grid encoding (e.g., generating one or more identity shards), a corresponding read of the data so encoded may be performed using a single shard containing such data. As such, a given device storing the shard can, in some embodiments, provide that data, e.g., in response to a request to read that data, without participation of other shards and/or other devices in the cluster.

Figure 8:
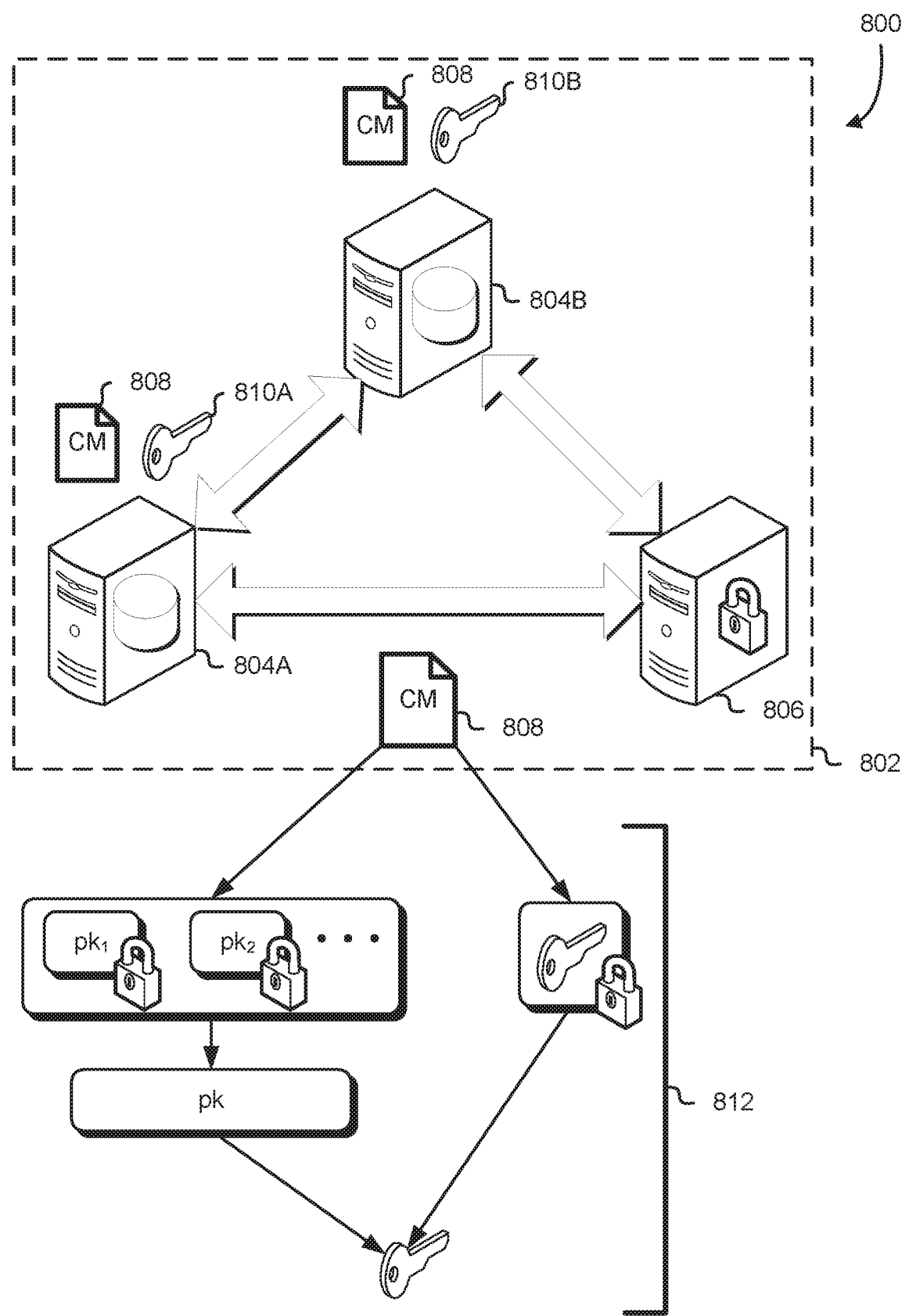
FIG. 8 illustrates an example environment in which a cluster manifest is implemented by a cluster to administer and maintain members of the cluster, in accordance with some embodiments.

FIG. 8 illustrates an example environment 800 in which a cluster manifest is implemented by a cluster to administer and maintain members of the cluster, in accordance with some embodiments. In some embodiments, a cluster 802 of network-attachable data transfer devices communicate with each other, e.g., via a network. A network-attachable data transfer device of a cluster may be in a locked or unlocked state. For example, FIG. 8 illustrates two cluster devices 804A and 804B that are in an unlocked state and a third cluster device 806 that is in a locked state (e.g., a new or replacement data transfer device). FIG. 8 further illustrates steps that may be performed, in connection with a cluster manifest, as part of a process to unlock a cluster device 806 in a locked state.

A cluster 802 of network-attachable data transfer devices may refer to one or more network-attachable data transfer devices that are configured to operate together. For example, as discussed elsewhere herein (e.g., in connection with FIG. 4), a cluster 802 may be used to provide expanded data storage and/or processing capabilities beyond what a single device is capable of providing. Individual network-attachable data transfer devices may be configured to operate individually (e.g., without coordination with other devices) or may be configured to operate as a cluster (e.g., through coordinating storage of data and metadata in a structured manner between multiple devices of a cluster). When configured to operate as a cluster, data and metadata may be distributed between devices in a cluster. For example, devices of a cluster may include a cluster manifest 808 associated with the cluster that includes information related to operation of the device within the cluster, including operation settings, configuration data, and network information. A cluster manifest in accordance with various embodiments is described in more detail below in FIG. 9.

As previously mentioned, utilizing a cluster to perform data storage has various advantages over using a single device to perform data storage—for example, using multiple devices in a cluster configuration may increase data throughput and capacity, may increase availability (e.g., if a single network-attachable data transfer device of a cluster becomes defective, operations may be offloaded to other devices in the cluster), reliability (e.g., if a single network-attachable data transfer device of the cluster becomes defective, data in other network-attachable data transfer devices may be unaffected by such failures), and perform load distribution functions. For example, data may be partitioned into shards across multiple network-attachable data transfer devices of a cluster in such a manner that individual devices of a network-attachable data transfer device may each be a source for a subset of a larger set of data. For example, data from a database may be sharded across multiple cluster devices by a horizontal partitioning of data such that cluster devices are configured to each store rows of a database—such a configuration may be used to improve performance, reliability, and availability of data.

Individual network-attachable data transfer devices may be in a locked state or an unlocked state. A locked network-attachable data transfer device such as the network-attachable data transfer device 806 illustrated in FIG. 8 may have restricted functionality such that one or more features, functions, operations, requests, etc., are not accessible via a locked network-attachable data transfer device which are accessible via an unlocked network-attachable data transfer device. In some embodiments, a customer may receive a network-attachable data transfer device in a locked state and unlock the device. A locked network-attachable data transfer device may include a locked cluster manifest. In some embodiments, a customer interacts with a human interface device (HID) to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition. Embodiments in accordance with this disclosure may use any combination of the techniques described herein as part of a process for unlocking a network-attachable data transfer device. A locked network-attachable data transfer device may receive the verification data (password, PIN code, fingerprint data, etc.), perform an authentication process (e.g., verify that that the provided password matches the user account associated with the device and/or unlock), and then unlock the device. The verification data may be used as part of a decryption process where an encrypted cluster manifest is decrypted and made available for use by the system.

A cluster manifest may include an encrypted payload and encrypted data that, when decrypted, encodes a cryptographic key. The encrypted payload and the encrypted data may be associated with a particular network-attachable data transfer device of the cluster, for example, through a data structure and/or mapping. The structure of cluster manifests in accordance with various embodiments contemplated in the scope of this disclosure is described below in greater detail in connection with FIG. 9.

The encrypted data associated with a network-attachable data transfer device may be decryptable using one or more security modules of the network-attachable data transfer device. In some embodiments, a first portion of the encrypted data may be decryptable by a first security module of a network-attachable data transfer device, a second portion of the encrypted data may be decryptable by a second security module of a network-attachable data transfer device, and so on, such that each portion of the encrypted data may be decrypted using a particular security module of the network-attachable data transfer device. Furthermore, in some embodiments, such as those described above, each individual security module of a network-attachable data transfer device may individually lack access to sufficient cryptographic material to obtain the cryptographic key from the encrypted data. For example, in an embodiment, a cryptographic key is partitioned into two halves, the first half is encrypted using a first security module, and the second half is encrypted using a second security module. The two encrypted halves may correspond to the encrypted data described above and may be stored in a cluster manifest as the encrypted data described above. In some embodiments, the cryptographic key is partitioned into N-parts where the number of parts is equal to the number of on-board security modules for a particular network-attachable data transfer device, and each security module is used to encrypt a corresponding partition of the cryptographic key.

The cryptographic key may be re-assembled from the encrypted data by parsing the encrypted data to obtain the individual encrypted partitions, using each of the security modules to decrypt the corresponding encrypted partition and combining each of the decrypted partitions to form the cryptographic key. The cryptographic key may be used to decrypt an encrypted payload. The encrypted payload may include executable code, data, additional cryptographic material such as digital certificates and cryptographic keys, or some combination thereof. The payload, when decrypted, may be usable by the network-attachable data transfer device to perform one or more features, functions, operations, requests, and the like. In some embodiments, the decrypted payload may be required by the system to make one or more features, functions, operations, requests, etc., accessible to a customer, user, or subsystem (e.g., customer applications installed on the network-attachable data transfer device). In some embodiments, a cluster manifest may, for each network-attachable data transfer device of the cluster, include: an identifier; an encrypted payload; and encrypted data that, when decrypted, encodes a cryptographic key that may be used to decrypt the encrypted payload associated with the particular network-attachable data transfer device.

The illustrated cluster 802 shows, as an example, two unlocked network-attachable data transfer devices 804A and 804B. In some embodiments, a first network-attachable data transfer device 804A has a locked cluster manifest that a customer unlocks by providing a PIN code. Upon authenticating the PIN code, the cluster manifest 808 may be obtained by the first network-attachable data transfer device 804A. The network-attachable data transfer device 804A may query the cluster manifest using its identifier to obtain an encrypted payload and encrypted data that, when decrypted, encodes a cryptographic key that may be used to decrypt the encrypted payload. The network-attachable data transfer device 804A may use one or more security modules to decrypt the encrypted data and obtain the cryptographic key that may subsequently be used to decrypt the payload. The network-attachable data transfer device 804A may then extract, from the payload associated with the network-attachable data transfer device 804A, a first cryptographic key 810A that may be used to make one or more features, functions, operations, requests, etc., accessible (e.g., to a customer). The network-attachable data transfer device 804A may then indicate that it is in an unlocked state. The network-attachable data transfer device 804A may also optionally perform steps to join a cluster network, such as detecting the existence of other cluster devices on a network and connecting to those devices using a cryptographically protected communications session such as a Transport Layer Security (TLS) session.

A second network-attachable data transfer device 804B may also have a locked cluster manifest that the customer similarly unlocks—for example, using the same PIN code. However, note that in some embodiments, each network-attachable data transfer device may have a unique PIN code such that a different PIN code may be used to authenticate different devices of a cluster. The second network-attachable data transfer device 804B may query the cluster manifest for an encrypted payload and encrypted data associated with the second network-attachable data transfer device 804B, which may be separate and distinct from those obtained by the first network-attachable data transfer device 804A. Likewise, the second network-attachable data transfer device 804B may use its security modules to decrypt the encrypted data to obtain a cryptographic key using techniques described herein and obtain a cryptographic key that may be used to decrypt the encrypted payload associated with the second network-attachable data transfer device 804B. Note that the security modules of the first network-attachable data transfer device 804A may not have access to sufficient (or correct) cryptographic material (e.g., cryptographic keys) to decrypt the encrypted data associated with the second network-attachable data transfer device 804B. The cryptographic key associated with the second network-attachable data transfer device 804B may be used to decrypt the encrypted payload associated with the second network-attachable data transfer device 804B and obtain a second cryptographic key 810B associated with the second network-attachable data transfer device 804B that may be used to make one or more features, functions, operations, requests, etc., accessible (e.g., to a customer).

Note that different network-attachable data transfer devices of a cluster may support different features—for example, the first network-attachable data transfer device 804A may support encryption under one set of cryptographic algorithms whereas the second network-attachable data transfer device 804B may support encryption under a second, different, set of cryptographic algorithms. It should be further noted that while the cluster manifest 808 may be shared among network-attachable data transfer devices of a cluster, in some embodiments, each network-attachable data transfer device of the cluster may maintain its own cryptographic material which is not shared with other devices of the cluster. For example, the first network-attachable data transfer device 804A may keep its cryptographic key 810A internally and not share it with other devices of the cluster (or other external devices outside of the network).

Furthermore, to the extent that the cluster manifest 808 is updated (e.g., an encrypted payload is updated, such as in connection with provision of a new or replacement device), the cluster manifest may be propagated either by a newly joining/joined device, or provided by a computing resource service provider. For example, as part of being provisioned by a computing resource service provider, a replacement device may be delivered to customer premises to be added to the cluster 802, as locked device 806. The locked device 806 may include an updated cluster manifest, which may include an updated encrypted payload that includes data recovery instructions and further may include an updated mapping between payloads in the cluster manifest and identifiers of devices to which they are intended to apply (e.g., including a reference to the replacement device replacing a reference to the device being replaced). The payload, upon being decrypted, may be executed by the replacement device to perform various data recovery actions related to the replacement process, such as copying and/or regenerating data previously stored on the device being replaced. The replacement device may then propagate the some or all of the updated cluster manifest to other devices of the cluster, e.g., to reflect the updated reference as mentioned.

In some embodiments, a customer may receive a network-attachable data transfer device and begin using the network-attachable data transfer device individually (i.e., not in a clustered mode of operation). The customer may determine, for various reasons, that an individual network-attachable data transfer device is appropriate under the circumstances—for example, the customer may determine that the data storage capacity of a single network-attachable data transfer device is sufficient for the expected use case or that under certain non-technical constraints (e.g., lack of money to order additional network-attachable data transfer devices) a network-attachable data transfer device is sufficient for the customer's needs. The customer may begin to transfer and/or collect data on the network-attachable data transfer device operating individually. At a later point in time, the customer may determine that it is appropriate to use additional network-attachable data transfer devices—for example, the data storage capacity needed for the use case exceeds the expected storage needs as well as the data storage capacity of a single network-attachable data transfer device. A customer may acquire additional network-attachable data transfer devices and provision the network-attachable data transfer devices (including the initial network-attachable data transfer device) to operate in a cluster mode while still retaining the data and analysis previously performed by the initial network-attachable data transfer device in a single-device mode of operation (i.e., operating individually as opposed to as part of a cluster).

It should be noted that in some embodiments a network-attachable data transfer device will be a member of multiple clusters. For example, a network-attachable data transfer device such as the network-attachable data transfer device 804B shown in FIG. 8 can be part of a first cluster 802 and ingest data as part of the first cluster 802 (e.g., in a first data storage partition) and simultaneously be part of a second cluster (not illustrated in FIG. 8) that includes a second set of network-attachable data transfer devices. Network-attachable data transfer devices and/or clusters may have configuration data related to the use of a device in multiple clusters. For example, a network-attachable data transfer device may be configured such that it allows or prohibits the particular device to join or be a member of multiple clusters. Likewise, a cluster may be configured (e.g., via metadata stored in the cluster manifest) to allow or prohibit devices of the particular cluster to join or be a member of another cluster. In some embodiments, a network-attachable data transfer device is configured such that, as part of joining a cluster such as the cluster 802 illustrated in FIG. 8, the network-attachable data transfer device is provisioned for use on the cluster. The provisioning of the device for use on the cluster may include erasing, deleting, reformatting, resetting, copying and/or regeneration of data, and/or performing other operations such that traces of previous usages of the device (e.g., programs, applications, data) from a previous use are removed.

FIG. 8 further illustrates an example cluster having a locked network-attachable data transfer device 806. In some embodiments, a customer receives a network-attachable data transfer device from a provider in a locked state. The network-attachable data transfer device may be shipped to the customer in a locked state so as to prevent the network-attachable data transfer device from being tampered with. For example, a locked network-attachable data transfer device may be limited in its functionality and not be operable to run executable code, load data, or perform other functions/features that would otherwise be possible to perform with an unlocked network-attachable data transfer device. As a result, a malicious party that may intercept the network-attachable data transfer device during shipment to the customer will be prevented from loading and running executable code such as malware (e.g., software that damages the computer system) or spyware (e.g., software that eavesdrops on the activities of a computer system on behalf of another party) on the network-attachable data transfer device. Furthermore, a customer that receives a network-attachable data transfer device in a locked state may have the opportunity to inspect the system both physically and programmatically prior to unlocking the network-attachable data transfer device and joining it to a cluster network.

In accordance with various embodiments, the locked network-attachable data transfer device 806 of the cluster 802 may perform an authentication process with information provided from an unlocked network-attachable data transfer device of the cluster 802. The result of a successful authentication process may verify that hardware of the network-attachable data transfer device (e.g., security modules) has not been tampered with and may further serve to unlock the network-attachable data transfer device (i.e., transition the network-attachable data transfer device from a locked state to an unlocked state). FIG. 8 illustrates an unlocked network-attachable data transfer device 804A providing a cluster manifest 808 to the locked network-attachable data transfer device 806 and steps that may be performed by the locked network-attachable data transfer device 806 as part of an unlocking process.

In some cases, a customer may manually unlock each network-attachable data transfer device of a cluster such as in the manner described above. However, management of a cluster may become difficult as the number of devices in a cluster grows. Furthermore, a customer may not always be available to unlock a network-attachable data transfer device—for example, if a device loses power outside of normal business hours and as a result of the power outage enters an unlocked state, it may not be feasible and/or practical for a customer to perform a manual unlock process, and waiting until the customer is able to perform the manual unlock process may be undesirable. Therefore, it may be advantageous to be able to perform an automated authentication process that may be used to unlock a locked device of a cluster.

In an embodiment, a device of the cluster in a locked state receives a cluster manifest from another device of the cluster and is able to programmatically perform an unlock process that results in the device transitioning from a locked state to an unlocked state (i.e., performed without steps that require interaction with a human customer). Furthermore, in such an embodiment, the cluster manifest is configured such that an encrypted payload associated with the locked device is only accessible (e.g., via decryption) by the particular locked device and that no other device of the cluster has access to cryptographic material sufficient to decrypt the encrypted payload. In such an embodiment, content stored in the payload is distributed to other devices of the cluster but is still kept secret from those devices. As mentioned, in some embodiments, the cluster manifest (updated, in some cases) is included with the locked device 806, and portions thereof are propagated to other devices of the cluster once the locked device has been unlocked and joined to the cluster.

FIG. 8 illustrates steps for performing an automated authentication 812 using devices of a cluster 802, an authentication being able to unlock a locked network-attachable data transfer device of the cluster. As part of an automated authentication 812, a device of the cluster such as the network-attachable data transfer device 804A shown in FIG. 8 may detect that another device of the cluster such as the network-attachable data transfer device 806 should be authenticated. In some cases, a local power failure may affect one system and cause it to reboot and enter a locked state. An unlocked device of the cluster such as the network-attachable data transfer device 804A may, in response, provide an unlocked cluster manifest 808 to the locked network-attachable data transfer device 806. The locked network-attachable data transfer device 806 may use the cluster manifest 808 to perform an authentication 812.

The locked network-attachable data transfer device may process the cluster manifest 808 and parse the manifest to obtain an encrypted payload and encrypted data associated with the device. The association may be stored in the manifest or may be calculated from information available to the system. The encrypted data may then be parsed and decrypted using one or more security modules of the network-attachable data transfer device 806, and the decryption results may be used to assemble a cryptographic key that the network-attachable data transfer device 806 uses to decrypt an encrypted payload. The encrypted payload may include cryptographic material (e.g., a cryptographic key) that is usable to perform one or more features, functions, operations, requests, etc. The network-attachable data transfer device 806 may store the cryptographic material in volatile memory, provide an indication that the device has transitioned to an unlocked state, establish one or more connections with cluster devices, or some combination thereof.

Cryptographic material included in the payload, such as a cryptographic payload key, may be used part as of one or more processes for storing data. As discussed in greater detail above in connection with FIG. 2, a network-attachable data transfer device may include one or more persistent storage media. Data that is stored in a persistent storage medium may be subject to cryptographic operations using the cryptographic payload key. For example, in some embodiments a system performs authenticated encryption on all data that is to be stored on a network-attachable data transfer device—i.e., a request by a customer to store "123" may result in an encrypted form of the data "123" being stored in addition to a corresponding authentication tag. Of course, other cryptographic operations such as encryption-without-authentication, authentication-without-encryption, and more, may be performed in connection with the cryptographic payload key. In some embodiments, data stored on a network-attachable data transfer device is authenticated but not encrypted—for example, in some systems, data may be stored in plaintext with a corresponding message authentication code (MAC) or tag. The data may be viewable to other entities but cannot be modified without detection as the authentication tag of the modified data will not match the original data. In this way, other entities may verify that the data, which may be in plaintext, was generated by a network-attachable data transfer device having access to the cryptographic payload key. Such systems may have performance (e.g., throughput and latency) advantages over other systems as encryption operations are, generally, computationally expensive.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

In various embodiments, data objects such as the cluster manifest, the encrypted payload(s) included therein, tokens and/or certificates exchanged between cluster devices and/or between entities attempting to authenticate for use of external data interface(s) of other data transfer devices, data (e.g., customer data) encrypted, processed, and/or stored in data storage, etc., may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security.

The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Example cryptographic algorithms used to perform cryptographic operations described herein include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode.

Figure 9:
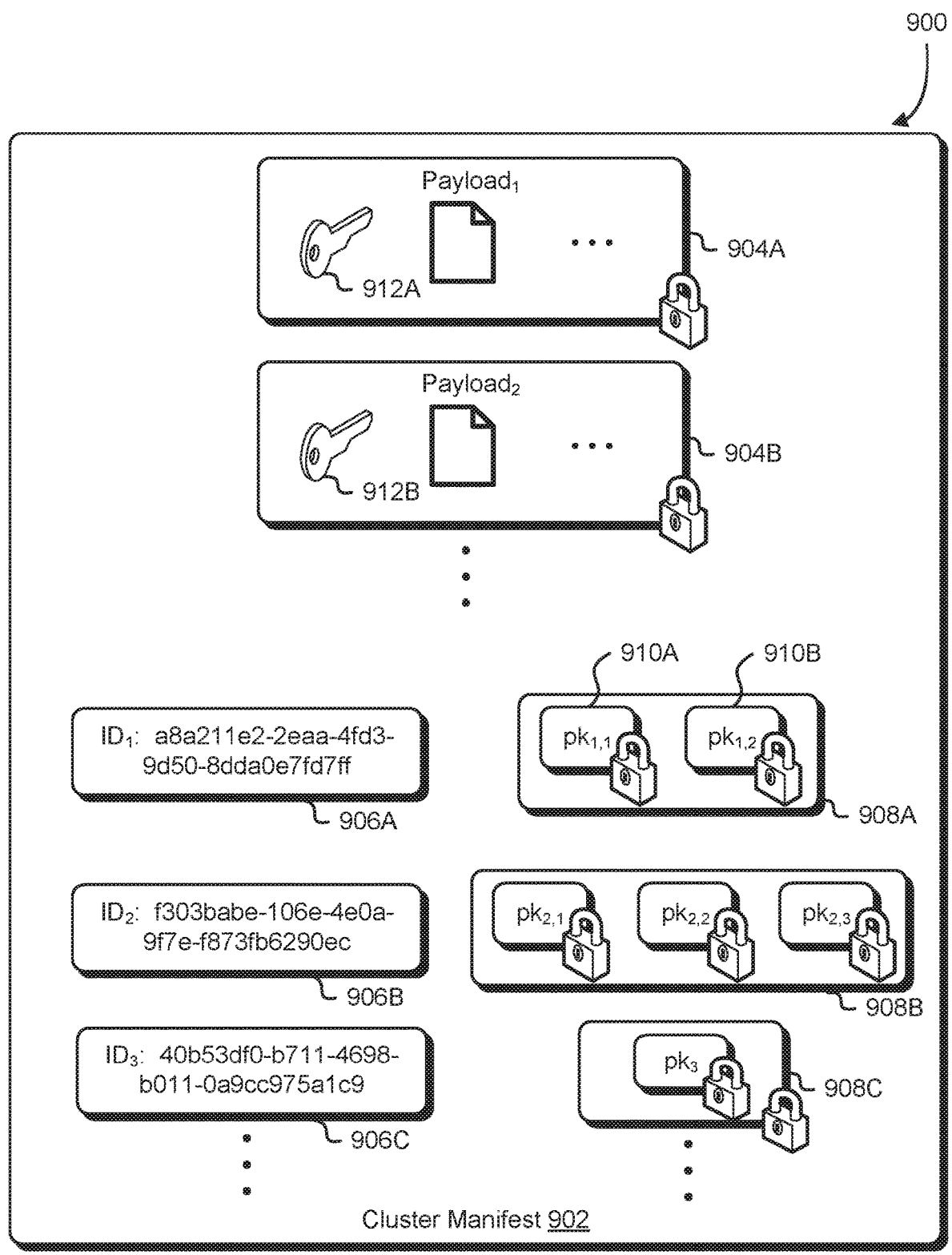
FIG. 9 illustrates an example schematic diagram of a cluster manifest, in accordance with some embodiments.

FIG. 9 illustrates an example schematic diagram 900 of a cluster manifest 902, in accordance with some embodiments. The cluster manifest 902 may be a cluster manifest in accordance with those described above in connection with FIG. 8. A cluster manifest 902 may be information that is used by a cluster of devices to coordinate operations, share information, and the like. The clusters may be in accordance with clusters described above in connection with FIG. 9 and elsewhere in this disclosure. Furthermore, a cluster manifest may be used to distribute and protect secrets among devices in a cluster. A cluster manifest may include; one or more encrypted payloads 904A and 904B; one or more identifiers 906A and 906B; and one or more entries of encrypted data 908A and 908B.

An identifier may refer to information that may be used to identify a particular network-attachable data transfer device of a cluster. For example, the cluster manifest 902 shown in FIG. 9 includes a first identifier 906A and a second identifier 906B that identify different devices of the network. Various examples of identifiers that may be used include a globally unique identifier (GUID), universally unique identifier (UUID), media access control address, serial number, and the like. However, identifiers need not be unique. For example, a counter may be used to assign identifiers for devices as they join the cluster (e.g., first device of the cluster has an ID of 1, the second device has an ID of 2, and so on) and each device persists the identifier assigned to it upon being added to the cluster. In some embodiments, even if the identifier is not persisted or is lost, a device can still determine its identifier by attempting to sequentially decrypt each encrypted data entry until it successfully decrypts an entry. It should be noted in some embodiments, the manifest does not include identifiers for any devices of a cluster, includes identifiers for a strict subset of devices in a cluster, or includes identifiers for all devices in a cluster. In some embodiments, a device that was unable to locate its associated identifier walks the entire list of encrypted data entries and attempts to decrypt each entry to assemble a valid cryptographic key until it is successful.

In some embodiments, one or more entries of encrypted data are stored in a cluster manifest. In the example embodiment illustrated in FIG. 9, the cluster manifest 902 includes a mapping of an identifier to an encrypted data entry. For example, the first identifier 906A may be mapped to the first encrypted data entry 908A and the second identifier 906B may be mapped to a second encrypted data entry 908B. The mapping may be done in various ways, such as by using a data type, a data structure, and the like. For example, a C-style data structure, associative array (i.e., map), linked list, or various combinations thereof may be used to implement the mapping between an identifier and an encrypted data entry. In some embodiments, the identifiers are locally unique (e.g., each identifier is used by at most one device of a cluster) or globally unique (e.g., each identifier is unique such that one device and another device will not have the same identifier). An encrypted data entry may include one or more encrypted partitions. An encrypted data entry, when decrypted, may encode cryptographic material such as cryptographic keys, digital certificates, and more. For example, the first encrypted data entry 908A shown in FIG. 9 includes two partitions 910A and 910B. In some embodiments, the partitions of a data entry are a fixed size. In some embodiments, the partitions of all data entries in a cluster manifest are of a same fixed size. The device may be a network-attachable data transfer device in accordance with those described elsewhere in this disclosure.

The device associated with an identifier corresponding to an encrypted data entry may be able to use the encrypted data entry to perform an authentication process and/or obtain data. For example, consider the first encrypted data entry 908A shown in FIG. 9—in an embodiment, a device associated with the first identifier 906A may read the first encrypted data entry 908A and parse the encrypted data entry 908A into two partitions 910A and 910B. A first security module of the device may be used to decrypt the first partition 910A and a second security module of the device may be used to decrypt the second partition 910B. The security modules may be configured such that cryptographic operations will fail if the device has been tampered with. As a result, successfully decrypting both partitions 910A and 910B may be used to authenticate that the first security module and the second security module described in the above example are valid and that no tampering has occurred. In some embodiments, authenticated encryption may is employed such that each encrypted partition has a corresponding authentication tag.

When each partition of an encrypted data entry is decrypted, the decrypted partitions may be used to assemble cryptographic material such as a cryptographic key. The cryptographic key may be assembled by concatenating the decrypted partitions together. In some embodiments the order and/or manner in which the decrypted partitions are to be combined conform to a predetermined format (e.g., concatenated in the same order in which the encrypted partitions are ordered), in other embodiments the partitions encodes information that is used to determine how to combine the decrypted partitions (e.g., the first byte of each decrypted partition indicates an ordering), and so on. Of course, it is contemplated that the decrypted partitions may be combined in any suitable manner to encode an output (e.g., cryptographic material such as a cryptographic key).

In some embodiments, encrypted data entries have a different number of partitions and/or the sizes of partitions are different. For example, in FIG. 9, the first encrypted data entry 908A has two partitions, the second encrypted data entry 908B has three partitions, and the third encrypted data entry 908C has a single partition. In some embodiments, two or more security modules are needed in concert (i.e., used in conjunction with each other) to obtain the cryptographic material encoded in an encrypted data entry and/or partition. As an example, consider the third encrypted data entry 908C which is double-encrypted (i.e., a data input is encrypted a first time and the output of the first encryption is used as the input to a second encryption)—as part of obtaining the encoded cryptographic material $pk_3$, the device associated with the identifier 906C associated with the encrypted data entry 908C may perform a first decryption on the double-encrypted ciphertext using a first security module to obtain a first output (i.e., a single-encrypted ciphertext in this example) and then perform a second decryption on the single-encrypted ciphertext using a second security module to obtain, as the second output, the encoded cryptographic material.

The cluster manifest may include a list of encrypted payloads. Cryptographic material obtained from an encrypted data entry may be used to decrypt, authenticate, or perform other cryptographic operations in conjunction with a corresponding encrypted payload. Each encrypted payload may be encrypted under a different cryptographic key (e.g., a cryptographic key obtained from the corresponding encrypted data entry) and may be decryptable by a particular device of the cluster. For example, the first encrypted payload 904A shown in FIG. 9 may be decryptable by a first device of the cluster that obtains a cryptographic key from a corresponding encrypted data entry 908A and the second encrypted payload 904B shown in FIG. 9 may be decryptable by a second (i.e., different) device of the cluster that obtains a cryptographic key from a corresponding encrypted data entry 908B. An encrypted payload may include various types of data, such as executable code, cryptographic material (e.g., cryptographic keys, digital certificates), data, and the like. In some embodiments, an encrypted payload includes a cryptographic key that is used by a network-attachable data transfer device (such as those described above in connection with FIG. 2) to perform various operations. A network-attachable data transfer device may be unlocked when it obtains the cryptographic key included in the payload.

Figure 10:
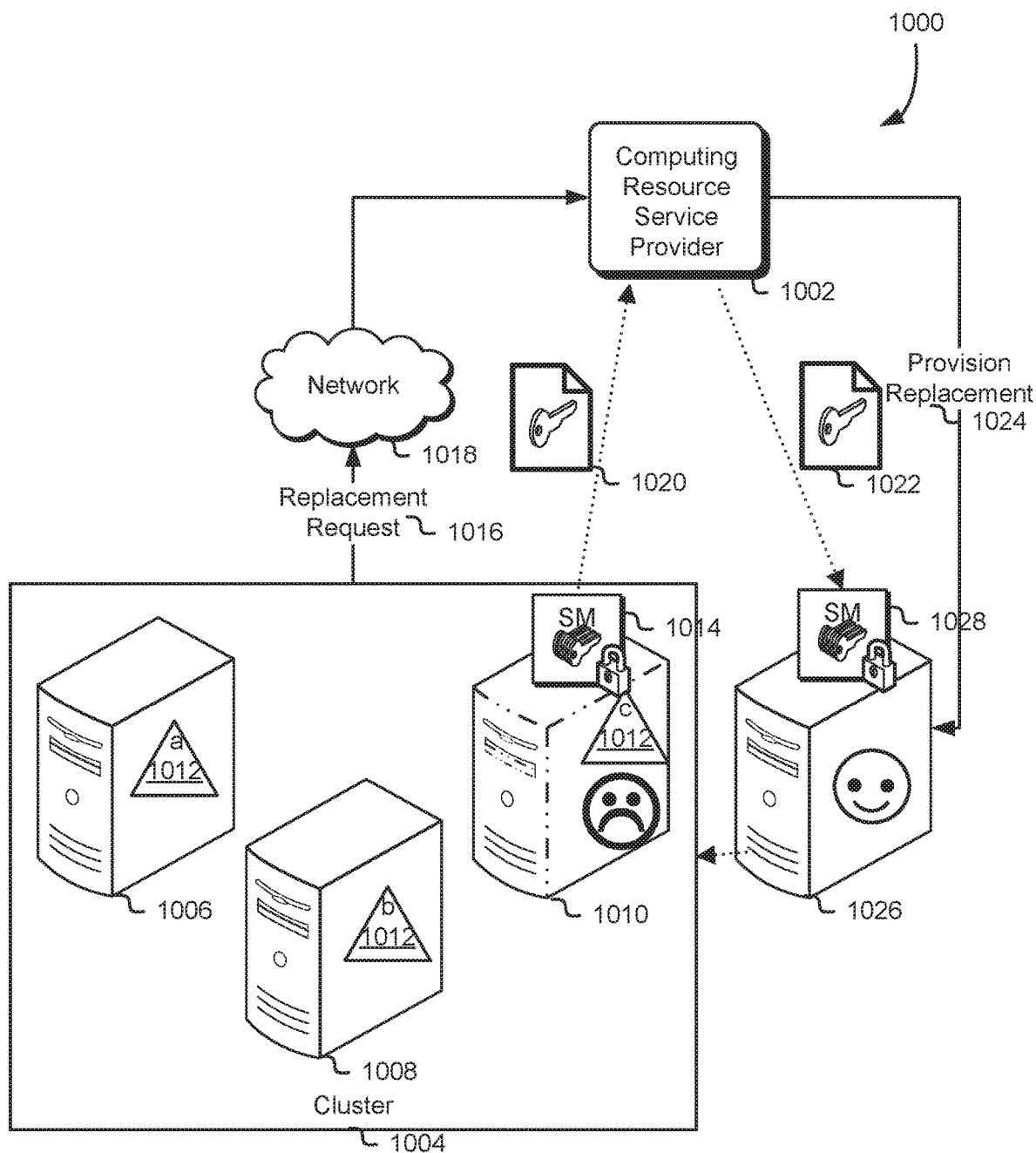
FIG. 10 illustrates an example environment in which a degraded cluster issues, and a receiving computing resource service provider processes, a request to provision a replacement data transfer device, in accordance with some embodiments.

FIG. 10 illustrates an example environment 1000 in which a degraded cluster 1004 issues, and a receiving computing resource service provider processes, a request 1016 to provision a replacement data transfer device 1026, in accordance with some embodiments.

To decrease the amount of time a cluster operates in a degraded state, an entity of a cluster, such as any device of the cluster 1004 and/or one of the components associated therewith (e.g., a display device of one of the cluster devices 1006, 1008, 1010) issues a replacement request 1016 via network 1018 to the computing resource service provider 1002 in response to determining the cluster's degraded state. For example, a healthy data transfer device 1006, 1008 that successfully authenticates with and connects to the data storage of an unhealthy data transfer device 1010, generates information 1020 regarding the unhealthy data transfer device 1010, directly or indirectly, to the computing resource service provider 1002 that provisioned it (along with the other devices in the cluster). In some embodiments, a display device associated with the unhealthy data transfer device 1010 submits the information 1020 upon determining that the data transfer device 1010 is in a non-nominal operational mode. The information may include, for example, a device identifier of the device, cryptographic information associated with the device (e.g., a public key associated with a private key held by the security module 1014 of the device 1010, or information associated with a shared secret associated with the device 1010), a cluster identifier, component identifiers for one or more of the components of the device 1010 (e.g., data storage identifiers), and the like.

In some embodiments, the computing resource service provider receives information regarding the health, performance, and/or functionality of some or all of the devices of a cluster, and based on this information, may determine that a replacement request is necessary. In such embodiments, the computing resource service provider may provide an indication of this determination to one or more devices of the cluster, so as to cause an available (e.g., healthy) device thereof to submit the replacement request 1016. In some embodiments, the computing resource service provider 1002 makes the determination and internally generates the replacement request 1016 without further intervention from the cluster 1004.

The computing resource service provider uses the information to provision 1024 a replacement data transfer device 1026 with a configuration 1022 that causes the device to perform a series of data recovery and cluster integration steps when joining the cluster 1004. The replacement device 1026 may be configured with, for example, cryptographic material, stored in an entity of the computing resource service provider, specific to the degraded device 1010, and reallocated to the replacement device 1026. As another example, a public key associated with the information 1022 and/or the degraded device is in turn associated with the replacement device, e.g., using the information 1022. Such information 1022 may be associated with one or more security modules 1028 of the replacement device 1026.

The information 1022 may be used, directly or indirectly, by the replacement device 1026 upon attempting to join the cluster 1004, to decrypt an encrypted payload specific to the degraded device 1010. In some embodiments, the encrypted payload may be updated, either by the cluster 1004 or the computing resource service provider 1002, to include executable instructions that cause the replacement device 1026 to perform additional data recovery actions with regard to the data represented on the cluster (e.g., as shards 1012a, 1012b, 1012c) and/or the portion thereof as stored on the degraded device to be replaced, as discussed in further detail below in connection with FIGS. 11-13. Furthermore, in some embodiments, the cluster manifest containing the encrypted payload may be updated to reflect an identifier of the replacement device 1026 (in cases where the cluster manifest previously reflected an identifier of the replaced degraded device 1010), as well as to include information regarding one or more components of the replacement device 1026, such as data storage device identifiers, network interface media access control addresses, and the like.

Figure 11:
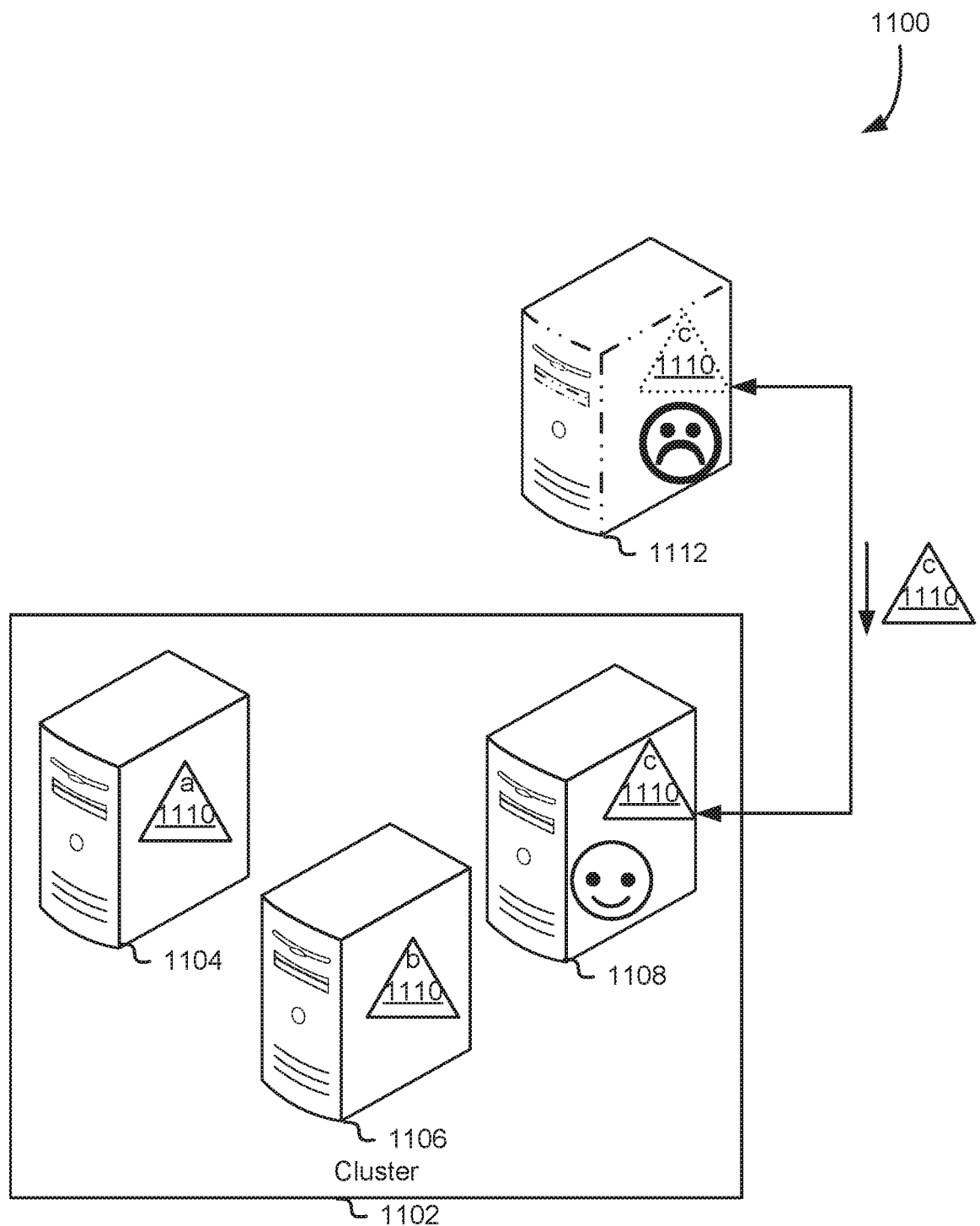
FIG. 11 illustrates an example environment in which a replacement device is integrated into a previously degraded cluster by at least copying data from an outgoing device, in accordance with some embodiments.

FIG. 11 illustrates an example environment 1100 in which a replacement device 1108 is integrated into a previously degraded cluster 1102 by performing data recovery actions, including copying data from a degraded device 1112 formerly part of the cluster, in accordance with some embodiments.

In some embodiments, the aforementioned data recovery processes are, as mentioned, encoded in a cluster manifest payload and are performed in connection with joining the cluster to restore the data stored on an outgoing degraded device 1112 to the replacement device 1108 and, if applicable, redistribute data stored on the various devices of the cluster while it was operating in a degraded fashion. In some embodiments, the data recovery process(es) are initiated manually, e.g., via a command or in response to a prompt or other inquiry provided to, e.g., a display device, a client device, etc.

In the illustrated example, a replacement data transfer device 1108 is connected, via its external data interface, to an external data interface of the degraded device 1112 it replaces, according to techniques previously mentioned. As part of the cluster joining process, the replacement device 1108 first attempts to verify the integrity and/or availability of data stored on the degraded transfer device 1112, and, in some embodiments, checks one or more performance and/or operational parameters of the degraded transfer device 112 to determine whether it is reliable enough to copy all data stored thereon. If the degraded data transfer device 1112 is sufficiently capable, the replacement device 1108 copies the stored data (e.g., redundancy coded shard 1110*c*) from the data storage of the degraded device 1112 to its own data storage, terminates the external data interface connection with the degraded data transfer device 1112, and in so doing, restores the cluster to normal operation (e.g., all three shards 1110*a*, 1110*b*, 1110*c* of a set are available on respective devices 1104, 1106, 1108, and access thereto is otherwise unrestricted by operational issues).

Figure 12:
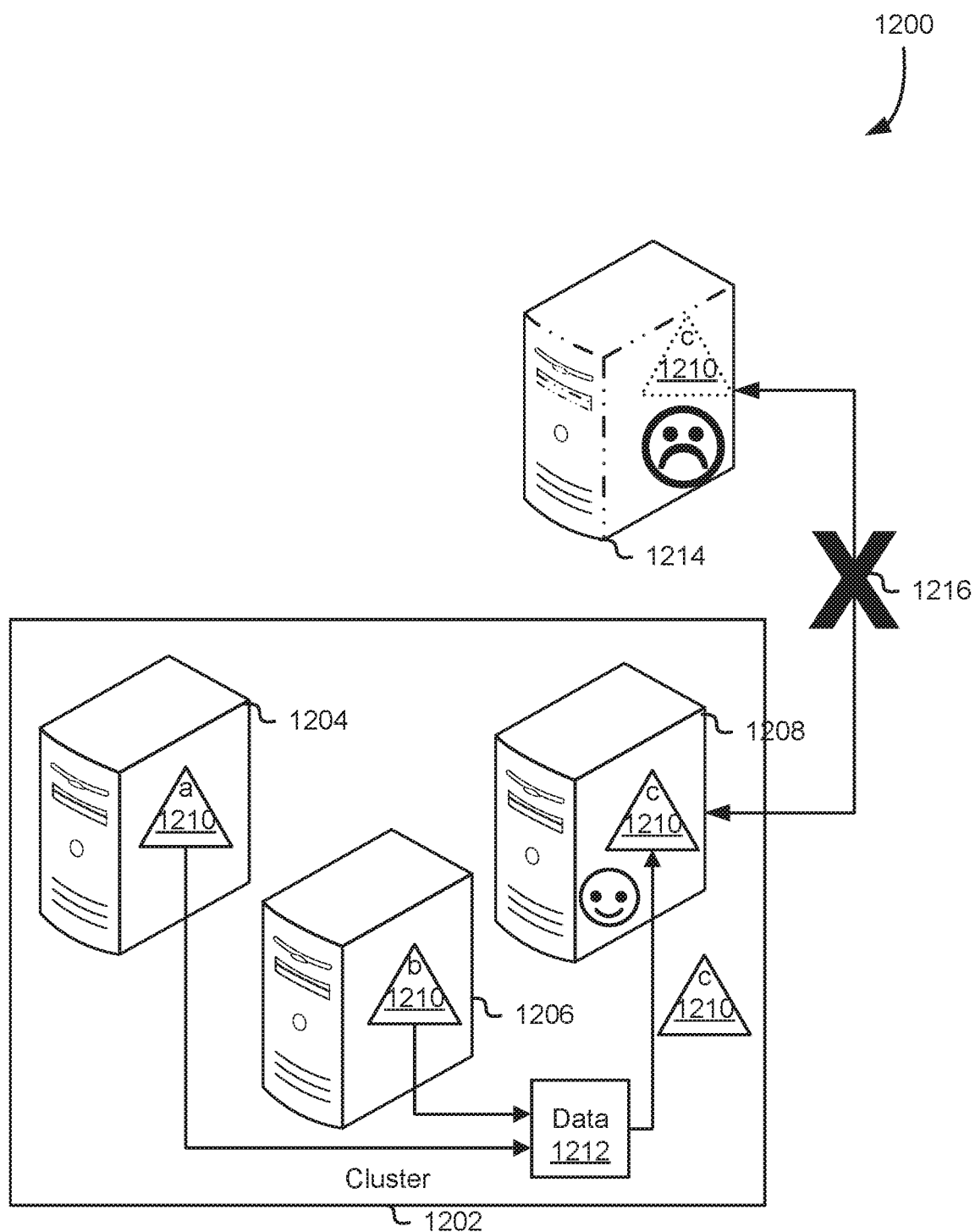
FIG. 12 illustrates an example environment in which a cluster regenerates data originally associated with a malfunctioning data transfer device as part of provisioning a functional replacement data transfer device, in accordance with some embodiments.

FIG. 12 illustrates an example environment 1200 in which a cluster 1202 regenerates data originally associated with a malfunctioning data transfer device 1216 as part of provisioning a functional replacement data transfer device 1208, in accordance with some embodiments.

Further to FIG. 11, as illustrated in FIG. 12, if the data on the degraded data transfer device 1214, or the device itself, is not sufficiently reliable or available for access 1216 for a period of time needed to finish copying it, the data 1212 is regenerated from shards 1210*a*, 1210*b* stored on the other devices 1204, 1206 of the cluster 1202. In the illustrated example, the shards 1210*a*, 1210*b*, 1210*c* comprise a set of shards representing a data object after having been generated using a redundancy coding scheme, where any two of the three shards are sufficient to regenerate the data 1212. Accordingly, in the illustrated example, only shards 1210*a* and 1210*b* are needed to regenerate data 1212.

The data 1212 is then reprocessed using the redundancy coding scheme previously used to generate the original shards 1210*a*, 1210*b*, 1210*c*. In some embodiments, only the desired shard—e.g., the shard 1210*c* originally associated with the degraded device—is generated. In some embodiments, the full set of shards is regenerated, and the shards other than the desired shard 1210*c* are discarded. In some embodiments, the original data 1212 is regenerated from, e.g., 1210*a* and 1210*b*, and some or all of the shards (e.g., 1210*a*, 1210*b*, 1210*c*) are generated therefrom (e.g., only the shard 1210*c*, or all three shards 1210*a*, 1210*b*, 1210*c*). In some embodiments, the shard 1210*c* is generated directly from one or more of the shards 1210*a*, 1210*b*, e.g., without first generating the original data 1212. After regeneration, the shard 1210*c* is stored on the replacement device 1208, and the cluster 1202 beings normal operation.

Figure 13:
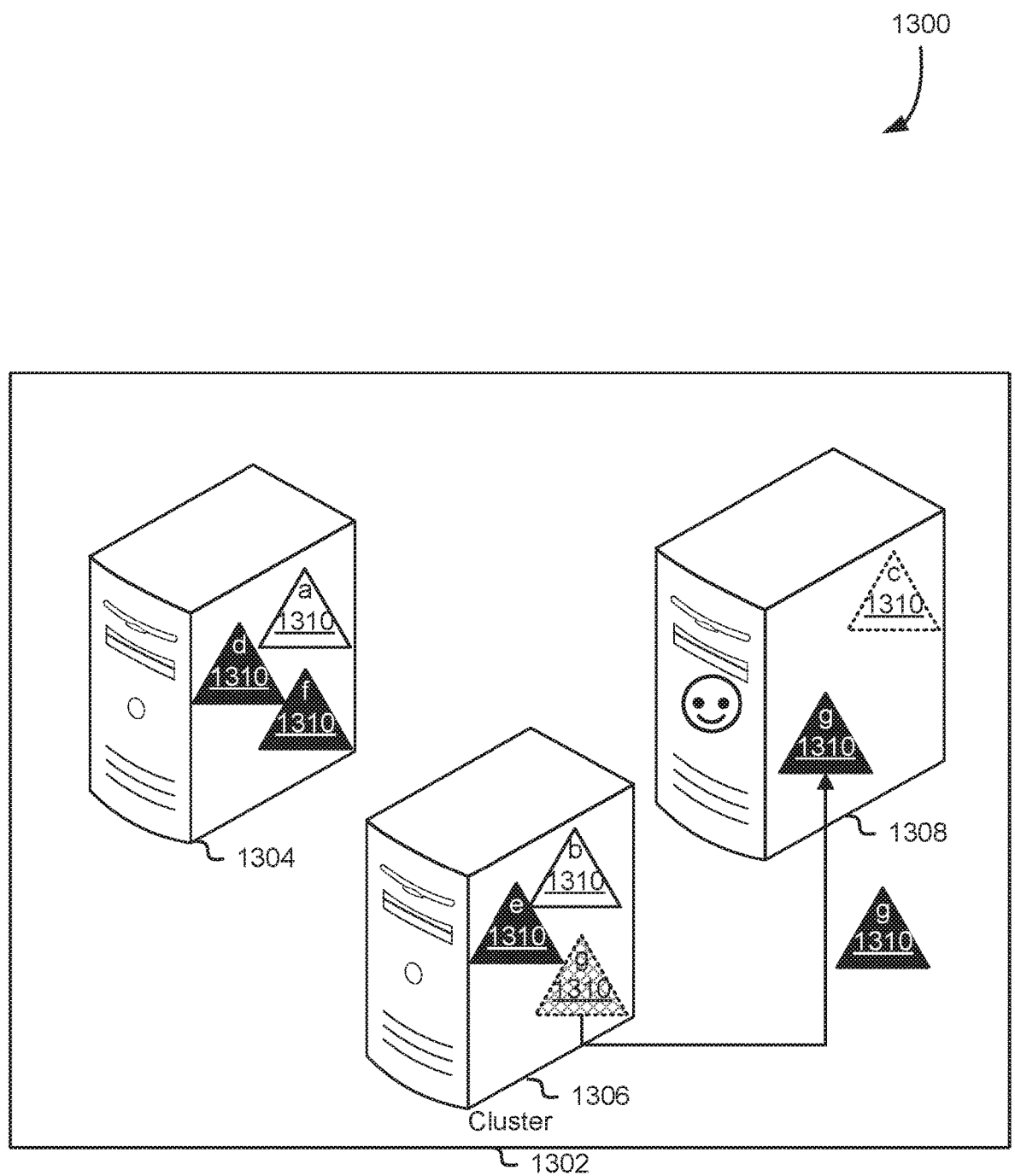
FIG. 13 illustrates an example environment in which a cluster load balances data stored on the cluster during a period of degraded operation, in accordance with some embodiments.

FIG. 13 illustrates an example environment 1300 in which a cluster 1302 load balances data stored on the cluster during a period of degraded operation, in accordance with some embodiments.

Further to FIGS. 11 and 12, any data stored on the cluster while it was operating in a degraded operational mode may be subject to partial or complete redistribution, including, at least in part, to a replacement device. In the illustrated example, the cluster 1302 includes three data transfer devices 1304, 1306, 1308, where the replacement device is device 1308. As illustrated, before degraded operation of the cluster 1302, a set of three shards 1310*a*, 1310*b*, 1310*c*, generated using a first redundancy coding scheme accounting for three functional devices, were stored. During the degraded operation of the cluster 1302, two sets of two shards, 1310*d*, 1310*e* and 1310*f*, 1310*g*, respectively, were stored on devices 1304 and 1306, according to a second redundancy coding scheme accounting for only those two devices being functional.

Upon integration of the replacement device 1308, the shard 1310*c* is copied to or regenerated (from shards 1310*a* and 1310*b*) and subsequently stored on the replacement device 1308 according to techniques mentioned in connection with FIGS. 11 and 12 above. As may be contemplated, this leaves three shards 1310*a*, 1310*d*, 1310*f* on device 1304, three shards 1310*b*, 1310*e*, 1310*g* on device 1306, and only one shard 1310*c* on device 1308. To even out access load and/or storage space availability on the devices of the cluster 1302, one or more shards may be reallocated to the replacement device 1308, such as shard 1310*g* from device 1306. The initiation and/or priority with which this load balancing reallocation occurs may be performed in connection with one or more performance metrics and/or operational parameters as previously discussed. Additionally, in some embodiments, the specific shard(s) moved may be selected according to not just storage space and/or system load considerations, but any performance requirements and/or operational parameters as previously discussed. Accordingly, a load balancing strategy to optimize or account for one requirement or parameter may intentionally appear to unbalance potential load according to a different requirement or parameter.

Figure 14:
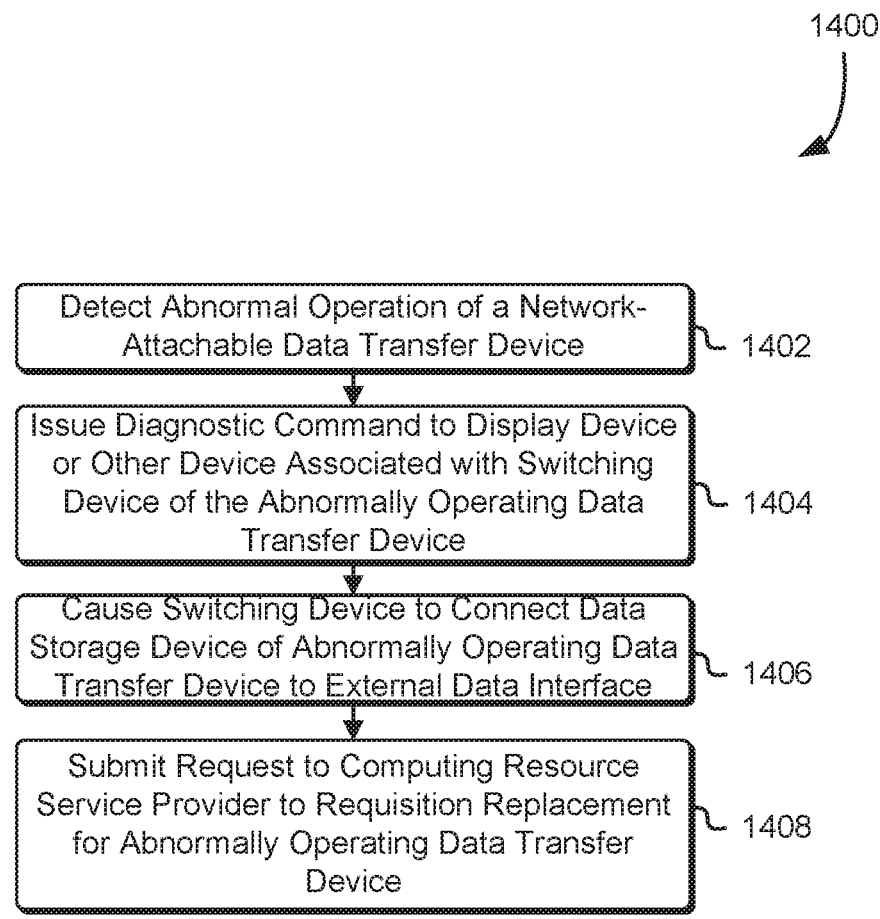
FIG. 14 illustrates an example process for initiating a cluster remediation routine upon detecting abnormal operation of a device of the cluster, in accordance with some embodiments.

FIG. 14 illustrates an example process 1400 for initiating a cluster remediation routine upon detecting abnormal operation of a device of the cluster, in accordance with some embodiments.

At step 1402, an entity, such a component (e.g., a display device) of one or more data transfer devices of a cluster implementing the process and/or a computing resource service provider, detects or otherwise determines that a network-attachable data transfer device of the cluster is an abnormal or otherwise non-nominal operational state. For example, the determination may be made directly (e.g., by directly monitoring and/or polling the various devices to determine whether and how they are operational), indirectly (e.g., as a result of detecting that an external device has successfully connected through an external data interface to take control of the degraded device's data storage), or some combination thereof.

At step 1404, the entity, or some other associated entity (which may be different than the component detecting the abnormal operation in step 1402), issues a diagnostic command to a device associated with the abnormally operating data transfer device. For example, the diagnostic command may cause a display device of the operating data transfer device to display diagnostic information, further instructions to a human user to perform specific tasks (e.g., instructing the user to physically connect a data and/or power cable between an external data interface thereof and a different, healthy data transfer device in the cluster).

At step 1406, in connection with the command of step 1404 (either directly or indirectly), a component, such as the device receiving the diagnostic command or, in some embodiments, the switching device itself, causes the switching device to connect the data storage of the degraded data transfer device to the external data interface. As described elsewhere herein, any external device connecting to the external data interface may be subject to authentication prior to being afforded partial or full access to the data storage. Also as described elsewhere herein, the switching device may perform the connection upon detecting an attempt by an external device to connect thereto, without intervention from a different component (e.g., display device).

At step 1408, a component associated with one of the devices of the cluster submits a request, such as over a network (e.g., the Internet), to the computing resource service provider to requisition and/or provision a replacement for the abnormally operating data transfer device. This request may be made automatically upon completion of one or more of steps 1402-1406, or manually in connection with detecting an external action (e.g., a user input authorizing and/or directing the provisioning request for the replacement device). As mentioned elsewhere herein, the component may be the same component as or a different component than that which issues the diagnostic command in step 1404, detects the abnormal operation at step 1402, and/or causes the switching device to connect the data storage device at step 1406. For example, in some embodiments, the display device issues the request on behalf of the abnormal device into which it is integrated. In some embodiments, a different, healthy device of the cluster sends the request. In some embodiments, the abnormal device itself submits the request via its network interface.

Figure 15:
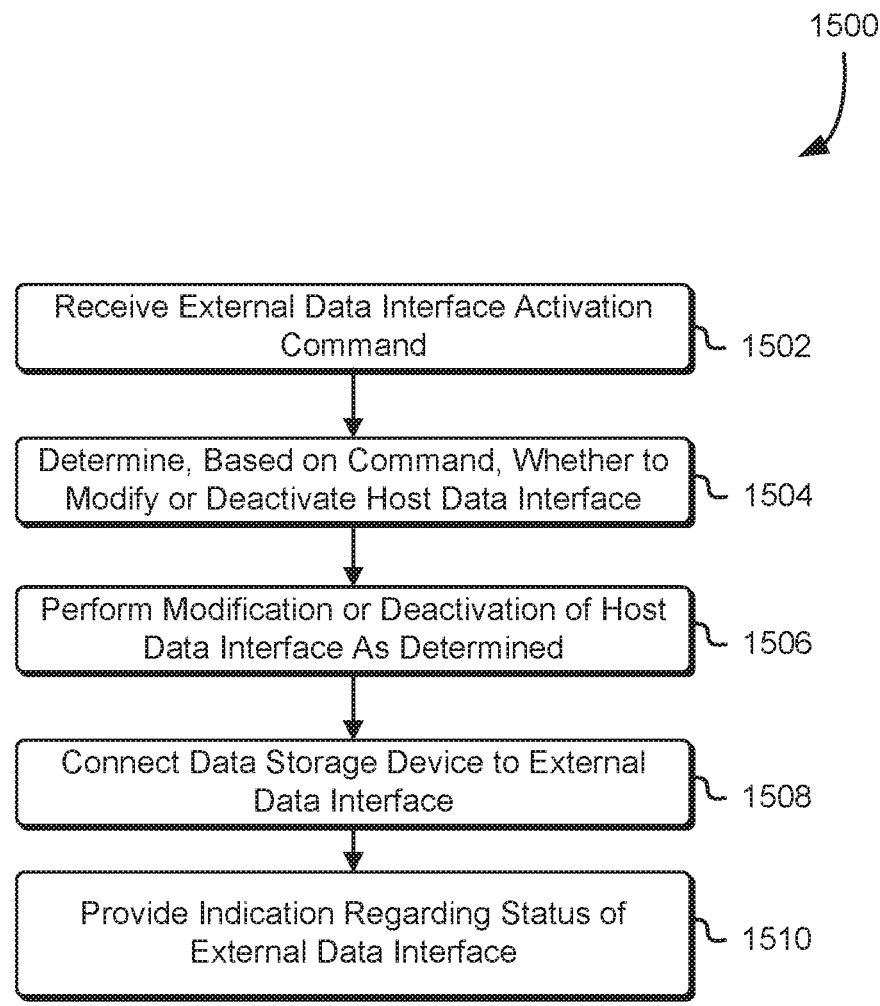
FIG. 15 illustrates an example process for utilizing a switching device to activate an external data interface of a data transfer device, such as for cluster remediation purposes, in accordance with some embodiments.

FIG. 15 illustrates an example process 1500 for utilizing a switching device to activate an external data interface of a data transfer device, such as for cluster remediation purposes, in accordance with some embodiments.

At step 1502, a component of a data transfer device, such as a switching device as described elsewhere herein, receives a command or makes a determination to activate an external data interface so as to allow for access, by a connecting external entity, to data storage of the data transfer device. The command and/or determination may be performed according to, e.g., process 1400 described above.

At step 1504, the component receiving the command or making the determination in step 1502 further determines whether to modify and/or deactivate the internal data interface of the host into which it is integrated. The determination may be made in connection with one or more configurations of the implementing host, as well as the nature of the command/determination of step 1502. For example, if the command/determination of 1502 indicates that access to other components, such as the internal data interface, is warranted (e.g., for diagnostic purposes), the switching device may determine to leave the internal data interface connected, thereby allowing access to such components via the external data interface. As another example, the switching data interface may determine that the internal data interface or other components than the data storage need not remain active, and may determine to disable them. As yet another example, the switching data interface may determine to provide partial or conditional access to such components.

At step 1506, the modification and/or determination made in step 1504 is executed by, e.g., the switching device, and at step 1508, the switching device connects the data storage to the external data interface. As previously mentioned elsewhere, further access to, e.g., the data storage via the external data interface, may, in some cases, be conditional upon proper authentication of the connecting entity by the device implementing the switching device. To the extent that step 1508 is successful, optionally, at step 1510, one or more indications or other information related to the status of the external data interface is provided to, e.g., a diagnosing client device or user via a programmatic response to a command that initiated the command at step 1502, a display device of the device implementing the switching device, etc.

Figure 16:
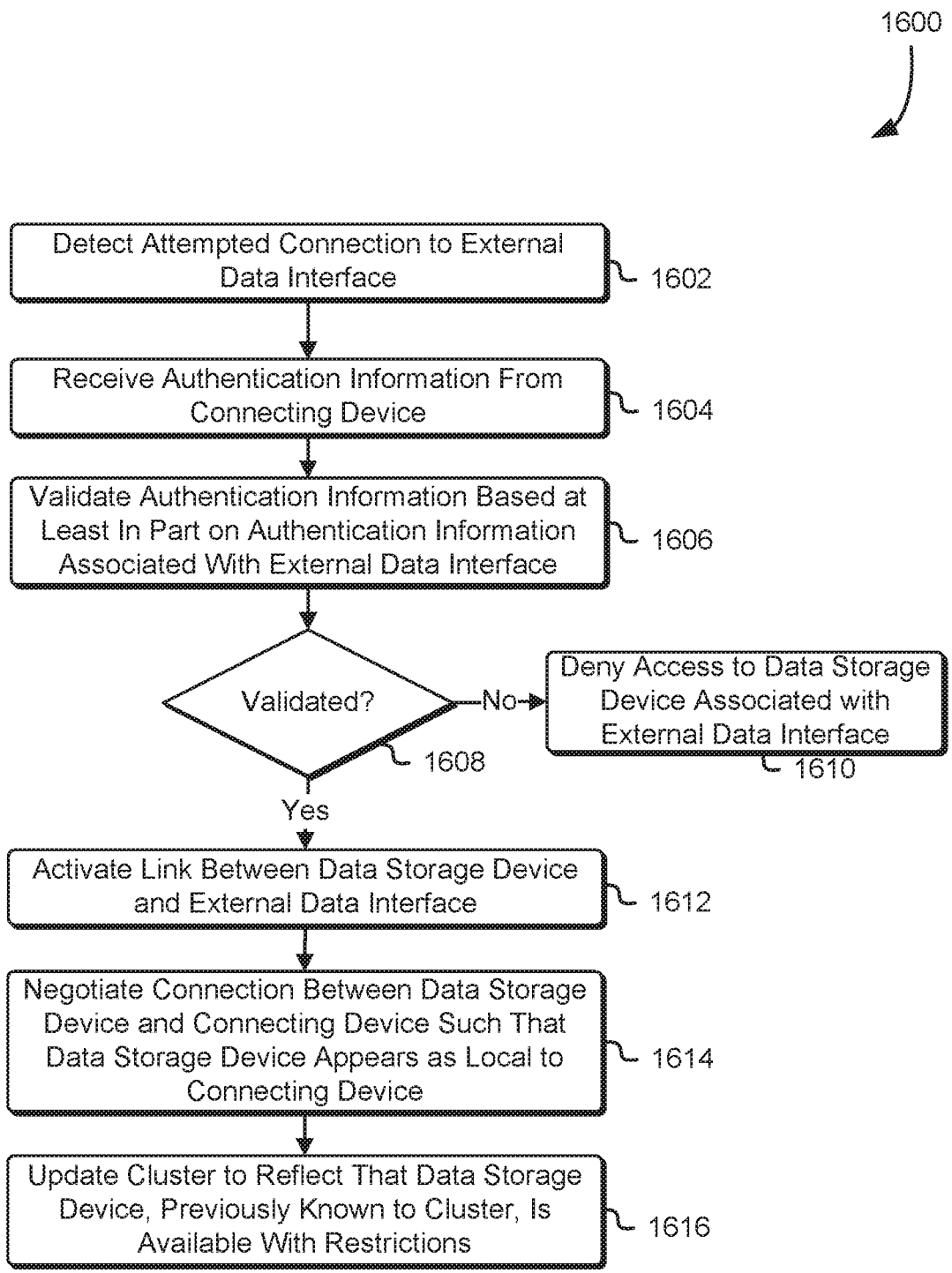
FIG. 16 illustrates an example workflow for controlling access to an activated external data interface of a data storage device, in accordance with some embodiments.

FIG. 16 illustrates an example workflow 1600 for controlling access to an activated external data interface of a data storage device, in accordance with some embodiments.

At step 1602, an entity, such as a switching device as described elsewhere herein, detects an attempted connection to the external data interface, also described in detail elsewhere herein. The detection may be physical (e.g., using sensors to determine whether a physical or electrical connection is being made) and/or determinative (e.g., receiving a connection request via the external data interface for, e.g., data storage connected thereto via the switching device).

At step 1604, the external data interface receives authentication information, such as certificates, tokens, cryptographic keys and/or other material, from the externally connecting entity, either in parallel with the attempted connection (e.g., part of the initial connection request) and/or separately therefrom (e.g., in response to an authentication challenge by a device on the "safe" side of the external data interface, such as the switching device).

At step 1606, the authentication information received in step 1604 is validated, such as by the switching device (e.g., using a connected or integrated security module), to determine whether the authentication information correlates with further authentication information associated with the external data interface, such as for the data transfer device and/or data storage to which the connection is intended. As mentioned, the validation may involve confirmation of correctly matching shared secrets, cryptographic verification of a data object (e.g., ciphertext encrypted using a public key, where the private key is held by a security device of the authenticating entity), and the like.

At decision point 1608, to the extent that the authentication information cannot be validated, access to the data storage device via the external data interface is denied at step 1610. However, if the authentication information is validated, at step 1612, the switching device activates the link between the data storage and the external data interface so as to provide access to the data storage by the connecting entity.

At step 1614, the connecting entity, which may be a different, healthy data transfer device of a cluster, negotiates a connection with the now accessible data storage of, e.g., the degraded data transfer device, so as to cause the data storage to appear locally relative to the connecting data transfer device (e.g., addressed at the same or similar level, or using a similar or same protocol, as the connecting data transfer device uses for its own data storage). At step 1616, with the data storage now accessible to the cluster via the "surrogate" or "host" device via the external data interface (s), the cluster is updated to reflect that the data storage is available. As the data storage was previously known to the cluster by virtue of having been associated with the now degraded data transfer device, the extent to which the cluster is updated may, for example, involve restrictions on access (e.g., read and/or write access), preferential avoidance of the device when others are available, and the like. Such an update may be performed by updating, e.g., a cluster manifest and/or cluster operational metadata, as described elsewhere herein.

Figure 17:
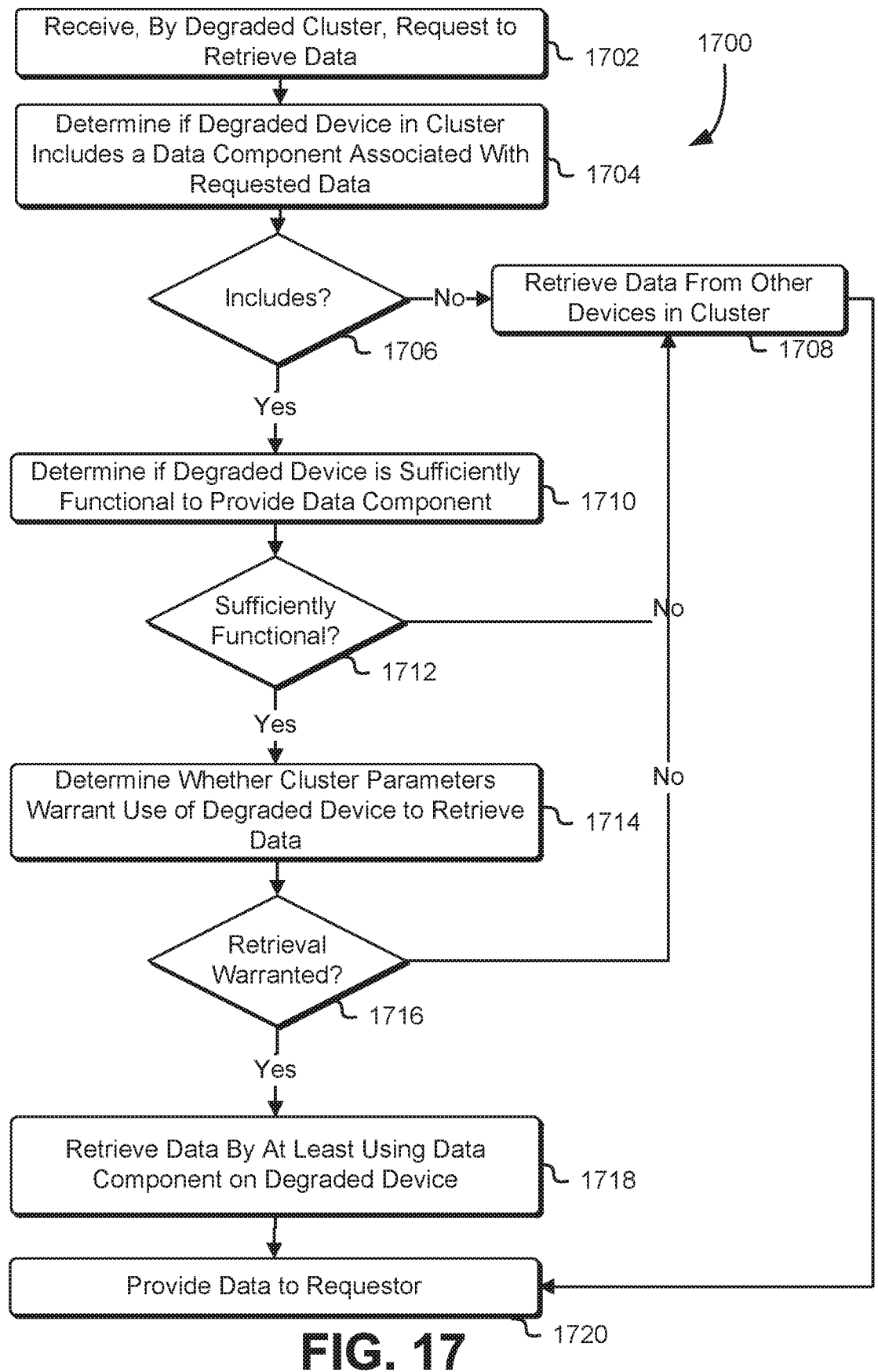
FIG. 17 illustrates an example workflow for responding to retrieval requests by a degraded cluster where a malfunctioning data transfer device is configured for at least partial access via an external data interface, in accordance with some embodiments.

FIG. 17 illustrates an example workflow 1700 for responding to retrieval requests by a degraded cluster where a malfunctioning data transfer device is configured for at least partial access via an external data interface, in accordance with some embodiments.

At step 1702, a degraded cluster receives, via one of the devices in the cluster, a read request for data stored or otherwise represented on the cluster. As previously mentioned, the data may be redundancy coded into shards, a subset of which can be used to regenerate the entirety of the data. The cluster, for purposes of this example workflow 1700, includes at least one healthy data transfer device to which a degraded data transfer device has been connected so as to allow the healthy data transfer device access to its data storage, in accordance with techniques described elsewhere throughout this disclosure. The data request may, for example, be a programmatic or graphical interface-initiated request of a client device connected to the cluster to retrieve the data.

At step 1704, the cluster device (e.g., the one receiving the request) determines whether the degraded device's data storage includes a data component (e.g., shard) associated with the requested data. At decision point 1706, to the extent that the data component exists on the degraded device's data storage, at step 1710, the cluster device determines, either by active testing thereof, or by passively relying on the degraded device's own determination, whether the degraded device has sufficient functionality to retrieve the data component (e.g., reliable for the length of time needed for the device to produce the component in its entirety and without errors). If at decision point 1712 the degraded device's data storage is determined to be sufficiently functional to provide the data component, at step 1714, the cluster device determines whether one or more operational parameters and/or performance requirements associated with the retrieval warrant the use of the data storage of the degraded device in performing the retrieval. As previously mentioned, there may, in some embodiments, be one or more restrictions or biases imposed by the cluster on the use of the data storage, such as a level of bias toward using other devices than the data storage unless one or more of the operational parameters and/or the performance requirements dictate it.

At decision point 1716, if the use of the data storage of the degraded device is warranted for servicing the retrieval, at step 1718, the data component is retrieved from the degraded device so as to generate and/or provide the requested data to the requestor at step 1720. However, if, at any of decision points 1706, 1712, and 1716, the determination is in the negative, at step 1708, the degraded device and data storage thereof is omitted, and data components are retrieved from the other devices of the cluster and, subsequently, provided to the requestor at step 1720.

Figure 18:
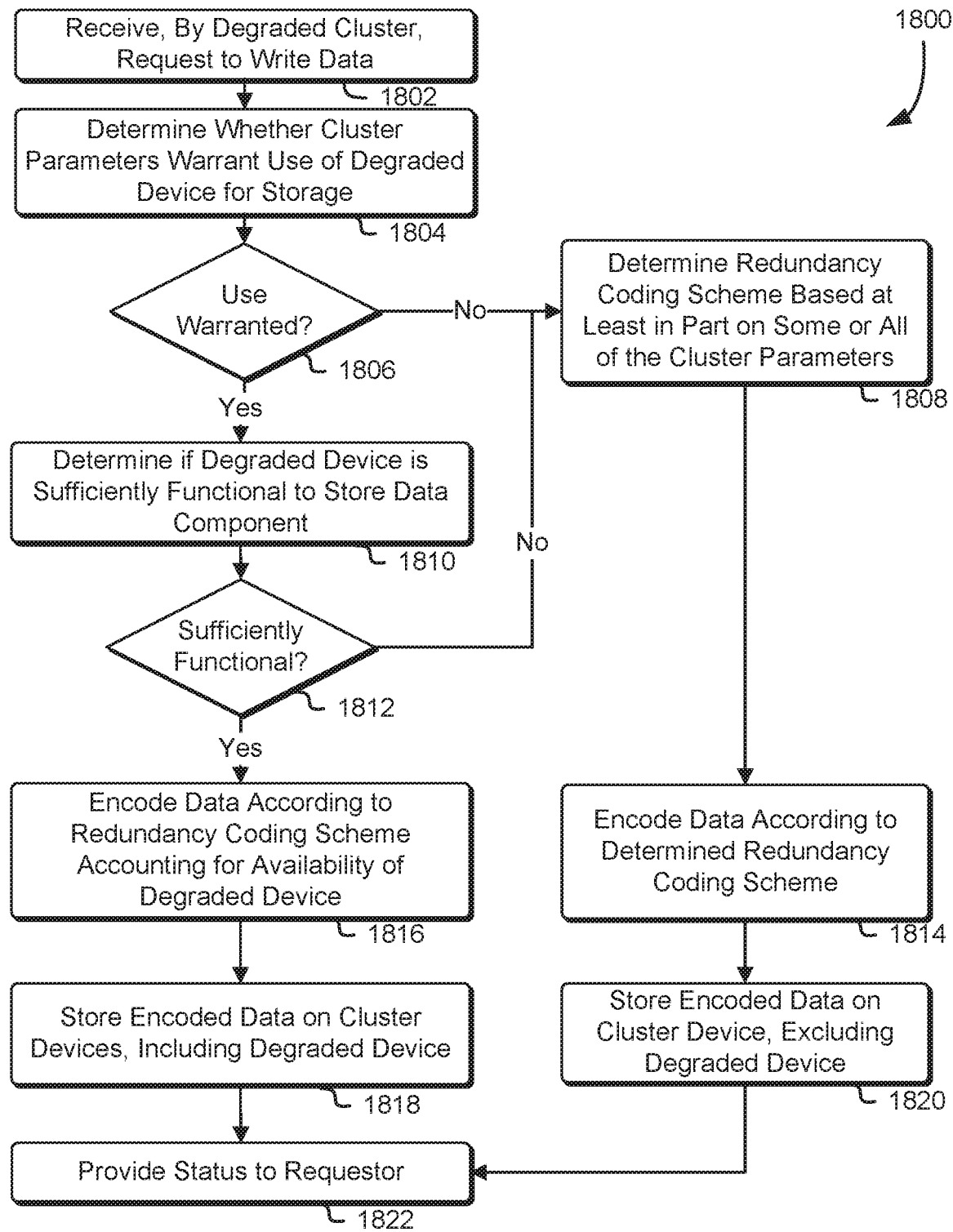
FIG. 18 illustrates an example workflow for responding to data write requests by a degraded cluster having a malfunctioning data transfer device, in accordance with some embodiments.

FIG. 18 illustrates an example workflow 1800 for responding to data write requests by a degraded cluster having a malfunctioning data transfer device, in accordance with some embodiments.

At step 1802, a degraded cluster receives, via one of the devices in the cluster, a write request for data to be stored or otherwise represented on the cluster. As previously mentioned, in nominal operation, the data may be redundancy coded using a first redundancy coding scheme (which may take into account a nominal quantity of functional devices in the cluster) into shards, a subset of which can be used to regenerate the entirety of the data. The cluster, for purposes of this example workflow 1800, includes at least one healthy data transfer device to which a degraded data transfer device has been connected so as to allow the healthy data transfer device access to its data storage, in accordance with techniques described elsewhere throughout this disclosure. The data request may, for example, be a programmatic or graphical interface-initiated request of a client device connected to the cluster to store the data.

At step 1804, the cluster device determines whether one or more operational parameters and/or performance requirements associated with the storage request and/or the devices of the cluster warrant the use of the data storage of the degraded device in performing the storage operation. As previously mentioned, there may, in some embodiments, be one or more restrictions or biases imposed by the cluster on the use of the data storage, such as a level of bias toward using other devices than the data storage unless one or more of the operational parameters and/or the performance requirements dictate it.

At decision point 1806, if the use of the data storage of the degraded device is warranted for servicing the request, at step 1810, the cluster device determines, either by active testing thereof, or by passively relying on the degraded device's own determination, whether the degraded device has sufficient functionality to reliably store the data component (e.g., reliable for the length of time needed for the device to store the component in its entirety and without errors over an expected lifetime of the data object, or at least until the device can be replaced with a fully functional one). If at decision point 1812 the degraded device's data storage is determined to be sufficiently functional to store the data component, at step 1816, the data is encoded according to the first redundancy coding scheme (the scheme used as if all devices of the cluster were operating normally) to generate a series of shard to represent the data, and at step 1818, such shards are stored on the devices of the cluster, including on the data storage of the degraded data transfer device. Then, at step 1822, status and/or confirmation of the successful (or unsuccessful) execution of the write request is provided to the requestor.

However, if the determinations at decision points either 1806 or 1812 are in the negative, at step 1808, one or more of the cluster devices determines a different redundancy coding scheme that takes into account one or more of the performance requirements and/or operational parameters associated with the data, the request, and/or the devices of the cluster. For example, the cluster may determine the redundancy coding scheme based at least in part on the unavailability of the data storage of the degraded device, and therefore encode a number of shards corresponding to the number of healthy devices remaining in the cluster and, in some cases, leave the failure margin associated with the original redundancy coding scheme intact (e.g., if the original redundancy coding scheme encoded five shards, of which three were sufficient to recover all of the data, the updated redundancy coding scheme may encode four shards of which two are sufficient to recover all of the data).

At step 1814, one or more of the cluster devices encodes the data requested for storage with the determined redundancy coding scheme of step 1808, and the resultant data components are stored on the devices of the cluster, but omitting the degrading device. At step 1822, status of the write request, as well as, in some cases, undated information related to the encoding and/or durability/availability information associated therewith, is provided to the requestor.

Figure 19:
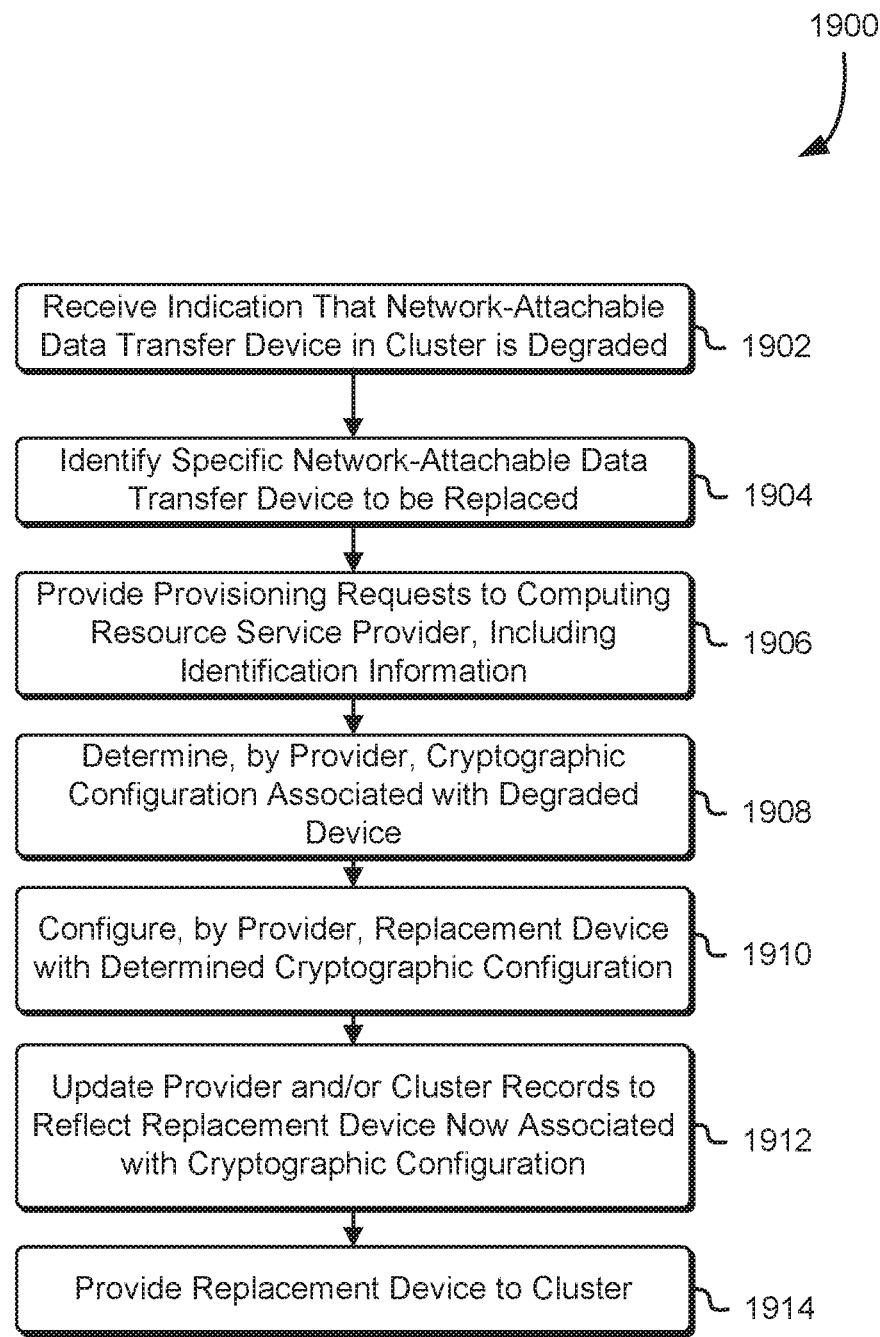
FIG. 19 illustrates an example process for provisioning and configuring a replacement data transfer device for a degraded cluster, in accordance with some embodiments.

FIG. 19 illustrates an example process 1900 for provisioning and configuring a replacement data transfer device for a degraded cluster, in accordance with some embodiments.

At step 1902, an entity, such as a healthy data transfer device of a cluster, receives an indication that a data transfer device of the cluster is degraded in some way (e.g., partially or entirely nonoperational). In some embodiments, the entity may be a process or component monitoring the unhealthy device, such as a process or component implemented by a computing resource service provider, or that of the unhealthy device itself.

At step 1904, the degraded device is identified, such as using one or more identifiers or other metadata associated with the degraded device or one or more of the components thereof (e.g., a security module or data storage associated therewith), and at step 1906, the submitting cluster device generates and submits, to the computing resource service provider a provisioning request for a replacement device using and/or including this identification information. The request may, as previously mentioned, be automated or manually initiated, depending on specific implementation.

At step 1908, the computing resource service provider determines cryptographic information with which to configure the replacement device, based at least in part on the received identification information. For example, the computing resource service provider may generate new cryptographic information using the received identification information, where the new cryptographic information is capable of being used in lieu of the cryptographic information of the device being replaced without updating other cryptographic information associated with other devices of the cluster. As another example, the computing resource service provider may keep a record of the cryptographic information assigned to each device of the cluster, and when a given device is to be replaced, based at least in part on the received information, the computing resource provider may reprovision the cryptographic information from the old device to the replacement device.

At step 1910, the computing resource service provider configures the replacement device with the cryptographic information determined in step 1908, such as by configuring, updating, installing, or replacing one or more security modules associated with the replacement device. Furthermore, at step 1912, the computing resource service provider updates records, such as internal records indexing the cryptographic information, cluster manifest(s) or portions thereof (such as executable payloads associated with the old device), and the like, to reflect the replacement device as being associated with the cryptographic configuration. As previously mentioned elsewhere herein, the various records, such as the cluster manifest, may be propagated directly by the computing resource service provider to the cluster, such as through a network, and/or stored on the replacement device, which, when provisioned by the cluster, causes propagation thereof to the other devices of the cluster, thereby updating those devices with the updated information.

At step 1914, the replacement device is provided by the computing resource service provider to the cluster for further provision according to techniques discussed elsewhere herein. For example, the computing resource service provider may physically ship the replacement device to the customer premises for integration into the cluster, where the configuration just mentioned partially or entirely automates the integration and/or data recovery process(es) associated with replacing the degraded the device.

Figure 20:
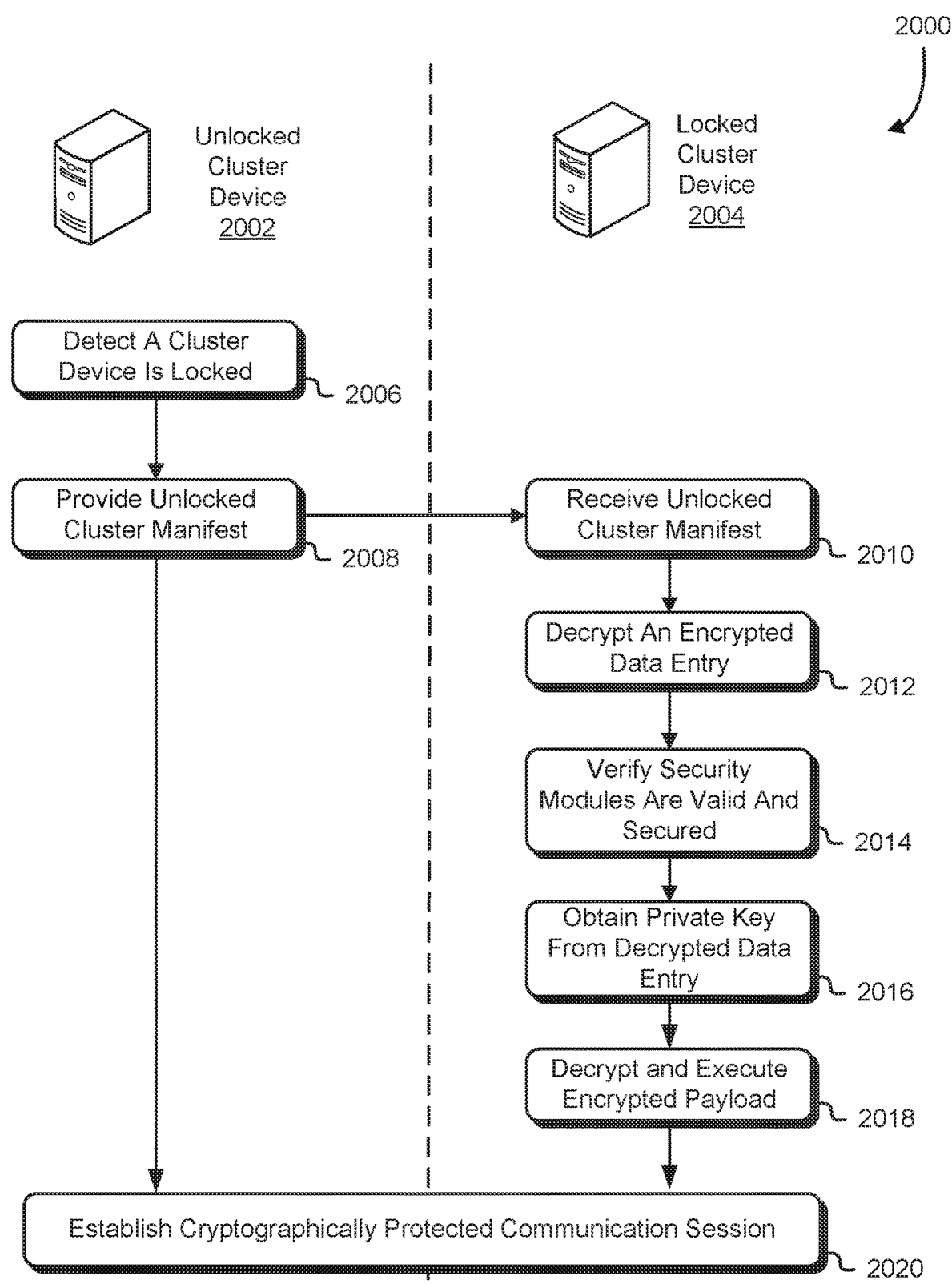
FIG. 20 illustrates an example workflow for interaction between an unlocked cluster device and a locked cluster device, in accordance with some embodiments.

FIG. 20 illustrates an example workflow 2000 for interaction between an unlocked cluster device 2002 and a locked cluster device 2004, in accordance with some embodiments. The cluster devices may be those in accordance with embodiments described elsewhere in the disclosure. An unlocked cluster device 2002 such as those described in accordance with embodiments described elsewhere herein may detect 2006 that another device of the cluster is in a locked state. The detection may occur through a periodic polling mechanism, through detecting that an ongoing communication session between the devices has been interrupted, or any other suitable manner. As a result of detecting the cluster device is locked, the unlocked cluster device 2002 may provide 2008 an unlocked cluster manifest to the locked cluster device 2004. In some embodiments, the cluster manifest is retained by the unlocked cluster device 2002 in volatile memory such as RAM which may be erased or lost if the device loses power. In some embodiments, the unlocked cluster manifest is provided to the unlocked cluster device 2002 by a computing resource service provider provisioning the locked cluster device 2004 (e.g., as a replacement cluster device), and the cluster manifest may be updated according to the purpose of the locked cluster device 2004 (e.g., as a replacement for a different cluster device of the cluster). The manifest may be provided to the locked cluster device 2004 in any suitable manner, including transmission across a network.

The locked cluster device 2004 may receive 2010 the unlocked cluster manifest and perform one or more steps in connection with unlocking the device and/or authenticating the device. These steps may be performed in accordance with techniques described in connection with other figures of this disclosure. For example, the locked cluster device may obtain, from the cluster manifest, encrypted data that, when decrypted 2012, encodes cryptographic material such as a cryptographic key. The encrypted data may have one or more partitions such that each partition is decryptable using a security module of the locked cluster device 2004. The system may decrypt the partitions and assemble a cryptographic key using techniques described elsewhere herein. In some embodiments, an authenticated encryption mode is used such that the decryption includes performing an authentication using a ciphertext and authentication tag, which may be supplied via a partition.

The system may verify 2014 the security modules are valid and secured, for example, by checking that the security modules are each operable to perform cryptographic operations. It should be noted that verification that the security modules are valid and secured does not necessarily imply that the cryptographic operations complete without error. For example, in a case where authenticated encryption is used and a decryption operation supplies an input ciphertext and an authentication tag that does not match the input ciphertext, an error may be returned—such an error may indicate that the security module is secured and operating correctly because the security module was able to perform cryptographic operations in making the determination that the ciphertext and tag do not match, thereby returning an error.

In some embodiments, a cryptographic key is assembled 2016 from the decrypted partitions of the encrypted data. The cryptographic key may be assembled as described elsewhere herein. The system may then decrypt 2018 an encrypted payload, such as an encrypted payload included in the manifest that is associated with the particular device, and may use at least part of the decrypted payload to establish 2020 a cryptographically protected communication session with the unlocked cluster device 2002. The establishing of the session may be a part of the process for the locked cluster device to re-join the cluster. In some embodiments, communication sessions is established with other devices of the cluster in place of and/or in addition to any communication sessions established with the unlocked cluster device 2002. As previously mentioned, the payload may be executed to perform various actions, such as those related to data recovery, as described in further detail elsewhere herein.

Figure 21:
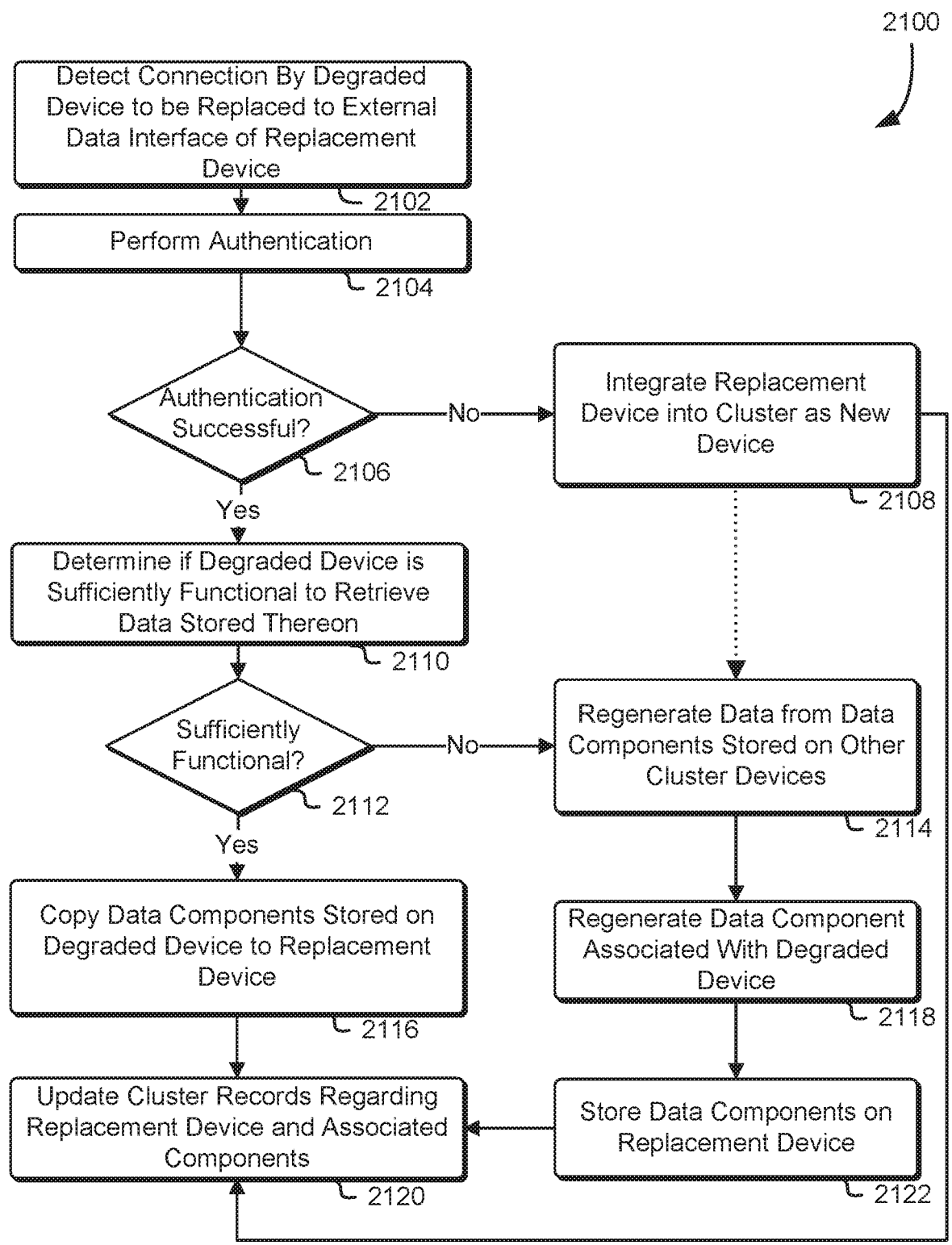
FIG. 21 illustrates an example workflow for initializing a replacement cluster device, in accordance with some embodiments.

FIG. 21 illustrates an example workflow 2100 for initializing a replacement cluster device, in accordance with some embodiments.

At step 2102, a degraded data transfer device associated with, but disconnected from, a cluster in favor of a replacement device provisioned by a computing resource service provider according to techniques discussed elsewhere herein, detects a connection by the replacement device with its external data interface. At step 2104, the replacement device attempts to authenticate with the degraded device, and at decision point 2106, if the authentication is unsuccessful, at step 2108, the replacement device integrates into the cluster as a new device, rather than attempting to determine and/or restore data stored on the degraded device. As may be contemplated, in some embodiments, other processes of the cluster (e.g., of other cluster devices), may attempt to regenerate and/or move data onto the new device (e.g., at steps 2114, 2118, and 2112, described below), rather than leaving the new cluster device substantially empty for new data to the cluster. Then at step 2120, the cluster records, such as the cluster manifest and/or other cluster metadata, are updated by a device of the cluster to reflect the addition of the new device.

However, if at decision point 2106, the authentication is successful, the replacement (host) device determines, either directly or indirectly, whether the degraded device is sufficiently functional to retrieve and/or provide the data stored thereon. If at decision point 2112 the degraded device is determined to be sufficiently functional, the data components stored on the data storage of the degraded device are copied from the degraded device to the data storage of the replacement device at step 2116, and the cluster records are updated at step 2120 as previously described.

If, at decision point 2112, the degraded device is not determined to be functional enough to reliably provide the data, at step 2114, the other devices of the cluster regenerate the original data associated with the data components stored thereon, then at step 2118, the data components associated with the degraded are regenerated from the data generated in step 2114. At step 2122, these data components are stored on the replacement device, and at step 2120, the cluster records are updated.

Figure 22:
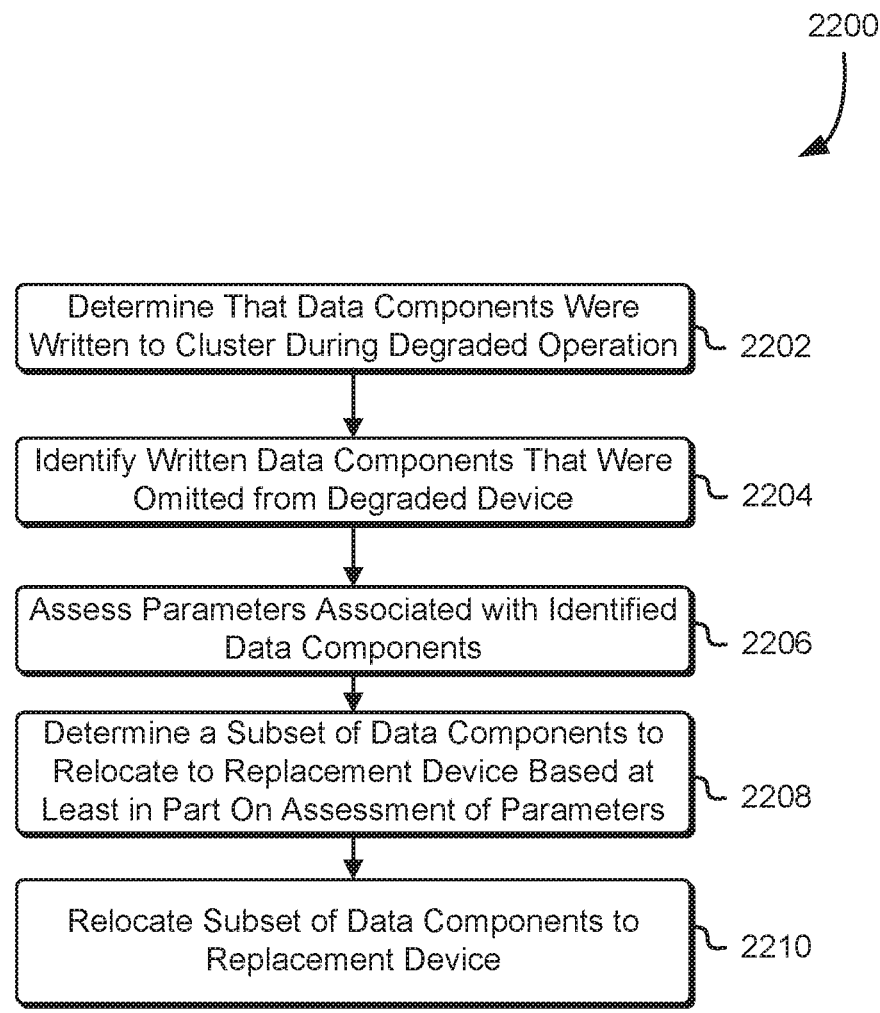
FIG. 22 illustrates an example process for load balancing data stored during degraded operation of a cluster using at least a replacement device integrated into the cluster, in accordance with some embodiments.

FIG. 22 illustrates an example process 2200 for load balancing data stored during degraded operation of a cluster using at least a replacement device integrated into the cluster, in accordance with some embodiments.

At step 2202, a device of a cluster, such as a healthy data transfer device or a degraded (unhealthy) data transfer device, determines, e.g., in connection with integration of a replacement device for the unhealthy device to the cluster, whether data components were written to the cluster during a period of time in which the cluster was degraded (e.g., as a result of one or more of the data transfer devices being unhealthy). At step 2204, those data components are identified and further processed by the data transfer device to determine a subset that was omitted from storage on the degraded device (e.g., having been generated using a temporary, different redundancy coding scheme so as to generate fewer shards on account of the degraded device being marked as incapable of storing data or preferentially avoided for further storage).

At step 2206, the device assesses one or more performance requirements and/or operational parameters associated with the data components, the cluster, and/or the device(s) themselves, so as to determine at step 2208 a subset of the data components identified in step 2204 to be relocated from a healthy device of the cluster to the replacement device, so as to balance load or other considerations in light of the assessed performance requirements and/or operational parameters. At step 2210, the data components determined in step 2208 are then moved from their source device to the replacement device.

Figure 23:
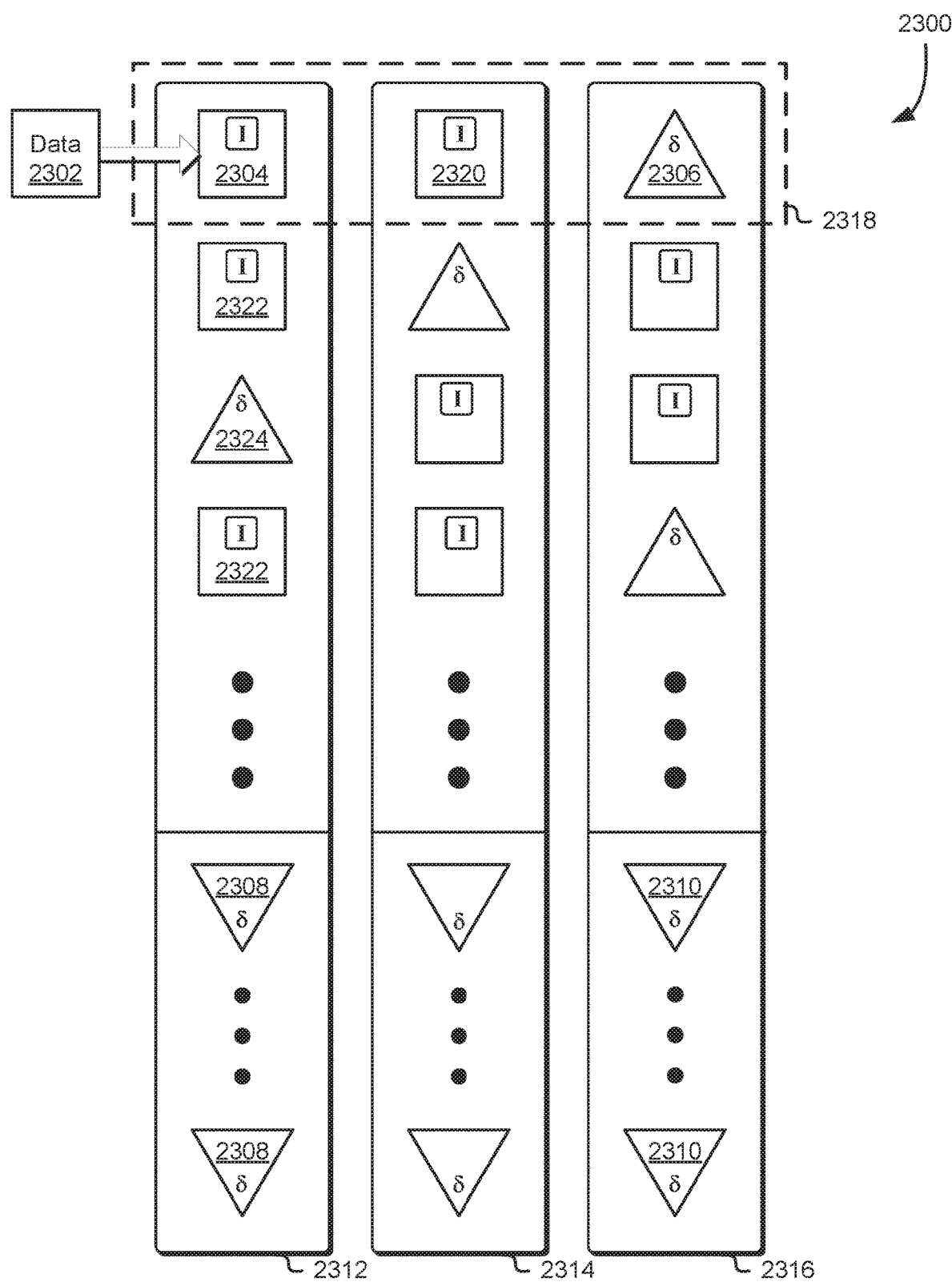
FIG. 23 illustrates an example environment where a redundancy encoding technique is applied to data stored in durable storage, in accordance with some embodiments.

FIG. 23 illustrates an example environment 2300 where a redundancy encoding technique or scheme is applied to data stored in durable storage, in accordance with some embodiments. Redundancy coding schemes may involve, as previously mentioned, erasure coding techniques that generate a series of encoded (derived) shards, bundle encoding techniques that generate a set of shards, some of which include unaltered data (data shards or identity shards) along with derived shards, and grid encoding techniques. The redundancy encoding technique illustrated in FIG. 23 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 23, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR", which is incorporated by reference herein.

In the example illustrated in FIG. 23, data 2302 from preliminary storage is provided for storage in durable storage using a redundancy encoding technique with both horizontal derived shards and vertical derived shards. In the example illustrated in FIG. 23, a first storage entity 2312 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first storage entity 2312. A second storage entity 2314, which may be geographically/physically and/or logically separate from the first storage entity 2312, may also contain data shards, horizontal derived shards, and/or vertical derived shards. A third storage entity 2316, which may be geographically/physically and/or logically separate from the first storage entity 2312 and from the second storage entity 2314, may also contain data shards, horizontal derived shards, and/or vertical derived shards. As illustrated in FIG. 23, each of the three storage entities may be a single vertical bundle. In an embodiment, each of the storage entities can include multiple vertical bundles. As may be contemplated, the number of storage entities illustrated in FIG. 23 and/or the composition of the storage entities illustrated in FIG. 23 are merely illustrative examples and other numbers and/or compositions of datacenters may be considered as within the scope of the present disclosure. The storage entities may be co-located or may be located in one or more separate physical locations.

In the example illustrated in FIG. 23, the data 2302 may be copied to a data shard 2304 and, as a result of the change to the data in the data shard 2304, a horizontal derived shard 2306 associated with the data shard 2304 may be updated so that the horizontal derived shard 2306 may be used to reconstruct the data shard 2304 in the event of a loss of the data shard 2304. In the example illustrated in FIG. 23, the three shards enclosed by the dotted line (e.g., the data shard 2304, the data shard 2320, and the horizontal derived shard 2306) are a horizontal bundle 2318. In this example, the data shard 2320 is not affected by the changes to the data shard 2304 but the horizontal derived shard 2306 may need to be updated as a result of the changes to the data shard 2304.

Also as a result of the change to the data in the data shard 2304, one or more vertical derived shards 2308 related to the data shard 2304 may also be updated so that the vertical derived shards 2308 may be used to reconstruct the data shard 2304 in the event of a loss of the data shard 2304 and the horizontal derived shard 2306. In the example illustrated in FIG. 23, the shards in storage entity 2312 form a vertical bundle. In this example, the other data shards 2322 in the vertical bundle and/or the horizontal derived shards 2324 in the vertical bundle are not affected by the changes to the data shard 2304 but the vertical derived shards 2308 may need to be updated as a result of the changes to the data shard 2304. Finally, as a result of the change to the horizontal derived shard 2306, one or more vertical derived shards 2310 related to the horizontal derived shard 2306 in the vertical bundle in storage entity 2316 may also be updated so that the vertical derived shards 2310 may be used to reconstruct the horizontal derived shard 2306 in the event of a loss of the horizontal derived shard 2306 and the data shard 2304.

Figure 24:
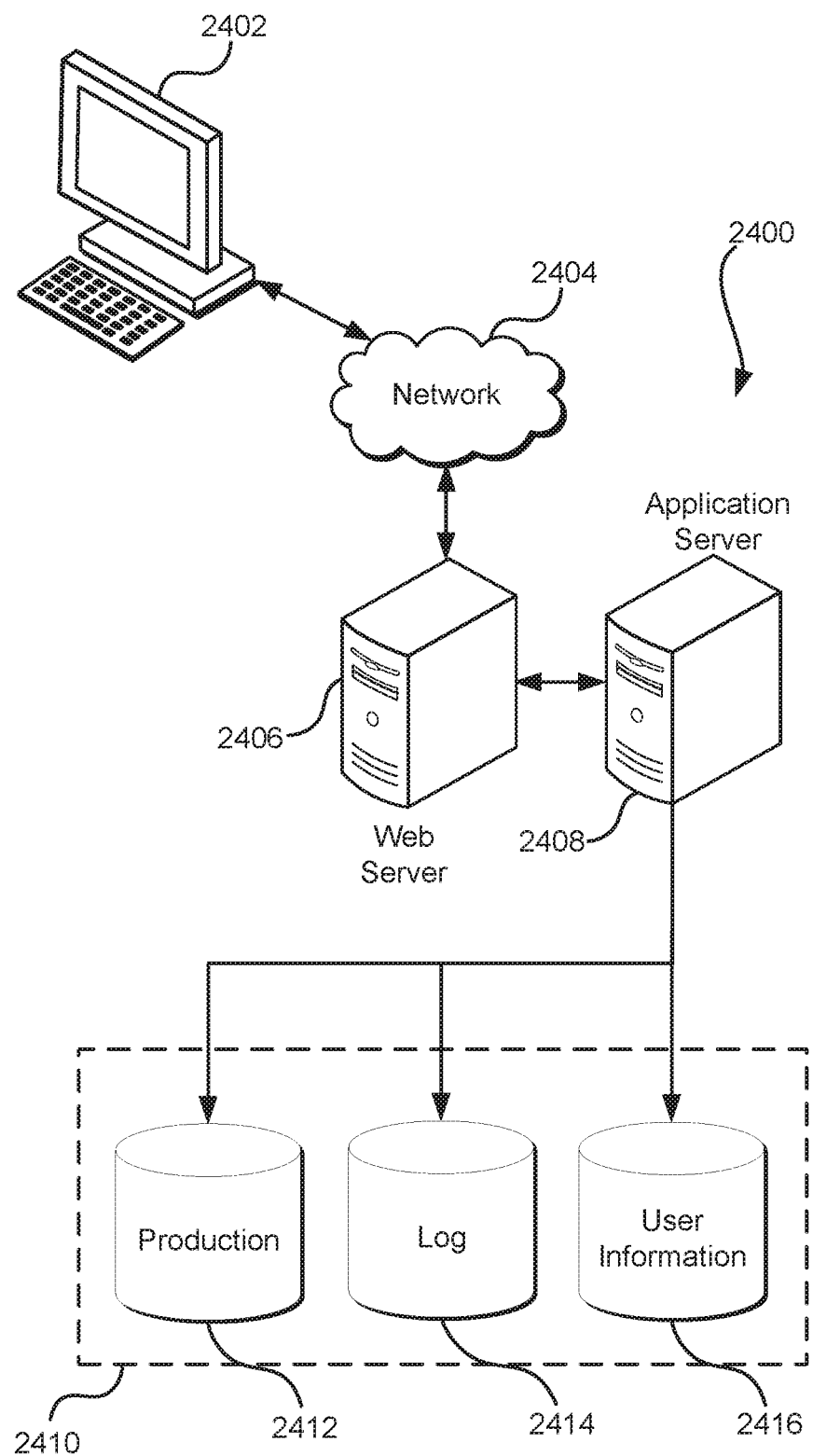
FIG. 24 illustrates an environment in which various embodiments can be implemented.

FIG. 24 illustrates aspects of an example environment 2400 for implementing aspects in accordance with various embodiments. As will be appreciated, although a web-based environment is used for purposes of explanation, different environments may be used, as appropriate, to implement various embodiments. The environment includes an electronic client device 2402, which can include any appropriate device operable to send and/or receive requests, messages, or information over an appropriate network 2404 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 2406 for receiving requests and serving content in response thereto, although for other networks an alternative device serving a similar purpose could be used as would be apparent to one of ordinary skill in the art.

The illustrative environment includes at least one application server 2408 and a data store 2410. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 2402 and the application server 2408, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2410 can include several separate data tables, databases, data documents, dynamic data storage schemes and/or other data storage mechanisms and media for storing data relating to a particular aspect of the present disclosure. For example, the data store illustrated may include mechanisms for storing production data 2412 and user information 2416, which can be used to serve content for the production side. The data store also is shown to include a mechanism for storing log data 2414, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2410. The data store 2410 is operable, through logic associated therewith, to receive instructions from the application server 2408 and obtain, update or otherwise process data in response thereto. The application server 2408 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2402. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depiction of the system 2400 in FIG. 24 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    updating a cluster configuration after a time period of degraded operation by at least:
        configuring a first network-attachable data transfer device to join the cluster, so as to replace a malfunctioning second network-attachable data transfer device in the cluster;
        determining that the malfunctioning second network-attachable data transfer device stores and is capable of providing a first set of redundancy coded data components encoded from a first data object using a first redundancy coding scheme that accounts for the second network-attachable data transfer device and at least one other device of the cluster;
        verifying, by the first network-attachable data transfer device, integrity and availability of data stored on the malfunctioning second network-attachable data transfer device;
        copying the first set of redundancy coded data components from the second network-attachable data transfer device to the first network-attachable data transfer device;
        determining that a third network-attachable data transfer device stores a second set of redundancy coded data components encoded from a second data object using a second redundancy coding scheme that accounts for a third network-attachable data transfer device but omits the malfunctioning second network-attachable data transfer device, wherein the second data object is received for storage by the cluster during the time period of degraded operation;
        determining, based on at least one operational parameter associated with the cluster and the second redundancy coding scheme, a subset of the second set of redundancy coded data components; and
        moving the subset from the third network-attachable data transfer device to the first network-attachable data transfer device.

2. The computer-implemented method of claim 1, wherein the first set of redundancy coded data components is copied via respective external data interfaces of the second network-attachable data transfer device and the first network-attachable data transfer device.

3. The computer-implemented method of claim 1, wherein the at least one operational parameter is associated with system load of at least a subset of members of the cluster.

4. The computer-implemented method of claim 1, further comprising detaching the second network-attachable data transfer device from the cluster after copying the first set of data components.

5. A system, comprising:
    one or more processors;
    a storage device; and
    memory storing computer-executable instructions that, when executed, cause the one or more processors to:
        verify integrity and availability of data stored on a malfunctioning first device of a cluster to which the system belongs and determine reliability of the first device for copying data stored thereon;
        store, on the storage device, a first set of data components corresponding to the malfunctioning first device;
        determine a second set of redundancy coded data components stored on a different second device of the cluster during a period of time during which the malfunctioning first device was malfunctioning; and
        store, based at least in part on a redundancy coding scheme used to generate the second set of redundancy coded data components, a third set of redundancy coded data components on the storage device, the third set of redundancy coded data components encoded differently from the second set of redundancy coded data components.

6. The system of claim 5, wherein the instructions, when executed, further cause the one or more processors to copy the first set of data components from the malfunctioning first device to the storage device.

7. The system of claim 5, wherein the instructions, when executed, further cause the one or more processors to generate the first set of data components from other data components stored on at least one other device of the cluster.

8. The system of claim 7, wherein the instructions that generate the first set of data components, further cause the one or more processors to generate the first set of data components on a condition that the malfunctioning first device is incapable of providing the first set of data components.

9. The system of claim 5, wherein the second set of data components is generated using a different redundancy coding scheme than the first set of data components.

10. The system of claim 9, wherein the different redundancy coding scheme is based at least in part on the malfunctioning of the first device.

11. The system of claim 10, wherein the instructions, if executed, further cause the one or more processors to generate the third set of redundancy coded data components on the storage device from the second set of redundancy coded data components using a redundancy coding scheme that accounts for a presence of the system in the cluster.

12. The system of claim 5, wherein the third set of redundancy coded data components is a subset of the second set of redundancy coded data components.

13. A set of non-transitory computer-readable storage media that stores executable instructions which, when executed by one or more processors of a first computer system, cause the first computer system to:
- detect that a malfunctioning second computer system connected to the first computer system stores a first set of data components, the malfunctioning second computer system being part of a cluster to which the computer system is provisioned to join;
- verify integrity and availability of data stored on the malfunctioning second computer system and determine reliability of the second computer system for copying data stored thereon;
- store the first set of data components;
- determine that a second set of redundancy coded data components were stored on a third computer system of the cluster while the malfunctioning second computer system was malfunctioning;
- process the second set of redundancy coded data components to determine, based at least in part on a redundancy coding scheme used to generate the second set of redundancy coded data components, a third set of redundancy coded data components to store, the third set of redundancy coded data components different from the second set of redundancy coded data components; and
- store the third set of redundancy coded data components.

14. The set of non-transitory computer-readable storage media of claim 13, wherein the executable instructions further cause the first computer system to generate the first set of data components from a different set of data components stored on at least one other computer system of the cluster.

15. The set of non-transitory computer-readable storage media of claim 13, wherein the executable instructions further cause the first computer system to copy the first set of data components from the second computer system.

16. The set of non-transitory computer-readable storage media of claim 13, wherein the instructions that cause the first computer system to determine that a second set of redundancy coded data components were stored further include instructions that cause the first computer system to query a different computer system of the cluster for access information associated with the second set of redundancy coded data components.

17. The set of non-transitory computer-readable storage media of claim 13, wherein the first set of data components is encoded using a different redundancy coding scheme than the redundancy coding scheme used to generate the second set of data components.

18. The set of non-transitory computer-readable storage media of claim 17, wherein the redundancy coding scheme accounts for an inability of the second computer system to store data.

19. The set of non-transitory computer-readable storage media of claim 13, wherein the instructions that store the third set of redundancy coded data components further cause the first computer system to delete the third set of redundancy coded data components from a device of the cluster on which they are stored.

20. The set of non-transitory computer-readable storage media of claim 13, wherein the instructions that cause the first computer system to process the second set of redundancy coded data components further include instructions that cause the computer system to determine the set of redundancy coded data components based at least in part on a performance parameter associated with the cluster.

* * * * *